United States Patent
Adachi et al.

(10) Patent No.: US 7,510,803 B2
(45) Date of Patent: Mar. 31, 2009

(54) BATTERY

(75) Inventors: Momoe Adachi, Tokyo (JP); Shigeru Fujita, Tokyo (JP); Takuya Endo, Kanagawa (JP); Yasunobu Iwakoshi, Kanagawa (JP); Goro Shibamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 1047 days.

(21) Appl. No.: 10/486,635

(22) PCT Filed: Aug. 23, 2002

(86) PCT No.: PCT/JP02/08498

§ 371 (c)(1), (2), (4) Date: Feb. 11, 2004

(87) PCT Pub. No.: WO03/019713

PCT Pub. Date: Mar. 6, 2003

(65) Prior Publication Data

US 2004/0234853 A1   Nov. 25, 2004

(30) Foreign Application Priority Data

Aug. 24, 2001 (JP) ............................. 2001-254547

(51) Int. Cl.
*H01M 4/52* (2006.01)
*H01M 4/58* (2006.01)
*H01M 10/40* (2006.01)

(52) U.S. Cl. ................. 429/223; 429/231.1; 429/231.3; 429/231.8; 429/330; 429/331; 429/332

(58) Field of Classification Search ................. 429/223, 429/231.1, 231.3, 231.8, 330, 331, 332
See application file for complete search history.

(56) References Cited

U.S. PATENT DOCUMENTS 5,427,875 A   6/1995 Yamamoto
7,026,074 B2 *  4/2006 Chen et al. .................. 429/326

FOREIGN PATENT DOCUMENTS

| JP | 06-111820 | 4/1994 |
| JP | 07-325345 | 12/1995 |
| JP | 07-326345 | * 12/1995 |
| JP | 10-116631 | 5/1998 |
| JP | 10-294100 | 11/1998 |
| JP | 2000-294279 | 10/2000 |
| JP | 2001-126763 | 5/2001 |
| WO | WO 99/34471 | 8/1999 |

* cited by examiner

*Primary Examiner*—Stephen J. Kalafut
(74) *Attorney, Agent, or Firm*—Sonnenschein Nath & Rosenthal LLP

(57) ABSTRACT

A battery with a high battery voltage at charging and improved energy density is provided. A cathode (12) and an anode (14) are laminated with a separator (15) sandwiched therebetween which is impregnated with an electrolyte. The cathode (12) has a cathode active material including a lithium composite oxide which contains lithium, at least either cobalt or nickel, and oxygen. The battery voltage at charging is 4.25 V or more. The total amount of lithium carbonate and lithium sulphate in the cathode (12) to the cathode active material is 1.0 wt % or less, a concentration of protic impurities in the electrolyte, which is converted to a mass ratio of protons to the electrolyte, is 20 ppm or less, or moisture content in the electrolyte is 20 ppm mass ratio or less to the electrolyte. This inhibits metal eluting from the lithium composite oxide even at high voltages.

71 Claims, 1 Drawing Sheet

BATTERY

BACKGROUND OF THE INVENTION

The present invention relates to a battery comprising a cathode, an anode and an electrolyte, and more particularly to a battery which provides motive power using a lithium composite oxide as a cathode and lithium (Li) as a reacting species of the battery.

In recent years, many portable electric devices, such as camera-incorporated VTRs (Videotape Recorder), cellular phones, and laptop computers, become widespread, and miniaturization and weight saving thereof are developed. Concurrently, research and development has actively been advanced in order to improve an energy density of batteries and especially of secondary batteries, which are used as a portable power supply for these electric devices. Specifically, lithium secondary batteries and lithium ion secondary battery are promising, because they provide an energy density higher than ones of conventional lead batteries and conventional nickel-cadmium batteries.

As a cathode active material of the lithium secondary batteries and the lithium ion secondary batteries, lithium cobalt composite oxides containing lithium and cobalt (Co) and lithium nickel composite oxides containing lithium and nickel (Ni) are used, because these materials have various excellent properties such as a discharge capacity. However, in the lithium secondary batteries and the lithium ion secondary batteries using these lithium composite oxides, when a battery voltage is 4.25 V or more, the lithium composite oxide is degraded, and many properties such as storage stability and a charge and discharge cycle characteristic become low.

Thus, the battery voltage at charging these secondary batteries is set to 4.2 V or less.

However, developments of anodes progress every moment every day, the capacity thereof is improved, materials having a new charge and discharge profile are found, and simultaneously the voltage higher than 4.2 V has been desired. Moreover, generally, the energy densities of the lithium secondary battery and the lithium ion secondary battery depend on the battery voltage, so that the secondary batteries with the battery voltage of 4.2 V or less hardly satisfy ever-increasing demands to the energy density, which is a problem. Therefore, increasing the battery voltage is an important subject for the lithium secondary batteries and the lithium ion secondary batteries.

The present invention has been achieved to solve the above problems. It is an object of the invention to provide a battery with a high battery voltage at charging and an improved energy density.

SUMMARY OF THE INVENTION

A first battery according to the present invention comprises a cathode, an anode, and an electrolyte, wherein the cathode has a cathode active material including a lithium composite oxide which contains lithium, at least either cobalt or nickel, and oxygen, the anode has an anode active material including at least one kind selected from the group consisting of anode materials capable of insertion and extraction of lithium, and lithium metals, a battery voltage at charging is 4.25 V or more, and a total amount of lithium carbonate and lithium sulphate in the cathode to the cathode active material is 1.0 wt % or less.

A second battery according to the invention comprises a cathode, an anode, and an electrolyte, wherein the cathode has a cathode active material including a lithium composite oxide which contains lithium, at least either cobalt or nickel, and oxygen, the anode has an anode active material including at least one kind selected from the group consisting of anode materials capable of the insertion and extraction of lithium, and lithium metals, and a battery voltage at charging is 4.25 V or more, and a concentration of protic impurities in the electrolyte, which is converted to a mass ratio of protons ($H^+$) to the electrolyte, is 20 ppm or less.

A third battery according to the invention comprises a cathode, an anode, and an electrolyte, wherein the cathode has a cathode active material including a lithium composite oxide which contains lithium, at least either cobalt or nickel, and oxygen, the anode has an anode active material including at least one kind selected from the group consisting of anode materials capable of the insertion and extraction of lithium, and lithium metals, and a battery voltage at charging is 4.25 V or more, and moisture content in the electrolyte is 20 ppm mass ratio or less to the electrolyte.

In any first to third battery according to the invention, the battery voltage at charging is 4.25 V or more, and the total amount of lithium carbonate and lithium sulphate in the cathode to the cathode active material is 1.0 wt % or less, the concentration of the protic impurities in the electrolyte, which is converted to the mass ratio of the protons to the electrolyte, is 20 ppm or less, or the moisture content in the electrolyte is 20 ppm mass ratio or less to the electrolyte, which prevents a transition metal from being eluted from the lithium composite oxide even at high voltages, and provides a high energy density.

DETAILED DESCRIPTION OF THE PRESENTLY PREFERRED EMBODIMENTS

Figure 1:
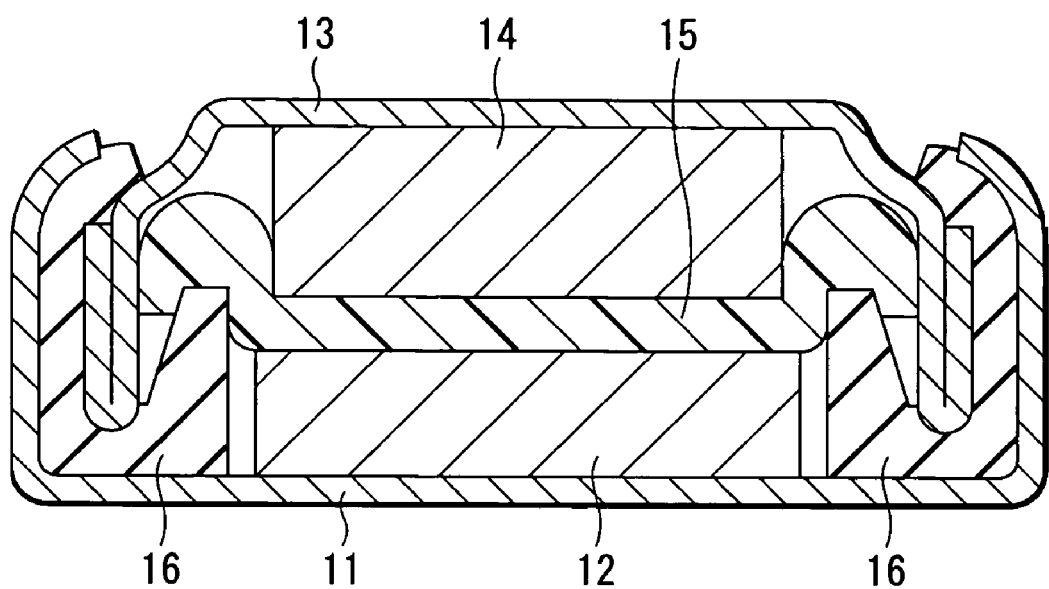
FIG. 1 is a cross sectional view of a structure of a secondary battery according to a first embodiment of the invention.

Embodiments of the present invention will be described in detail below with reference to accompanying drawings.

First Embodiment

FIG. 1 shows a cross sectional view of a secondary battery according to a first embodiment of the invention. The secondary battery is a so-called coin type and a laminate of a disk-like cathode 12 housed in a package can 11 and a disk-like anode 14 housed in a package cup 13 with a separator 15 sandwiched therebetween. Peripheral parts of the package can 11 and the package cup 13 are sealed and caulked with an insulative gasket 16.

The package can 11 and the package cup 13 are independently made of a metal such as stainless steel or aluminum (Al).

The cathode 12 is formed to contain a cathode active material, and if needed a conductive agent such as carbon black or graphite and a binder such as polyvinylidene fluoride. The cathode active material preferably contains a lithium composite oxide containing lithium, at least either cobalt or nickel, and oxygen, because this provides a high battery voltage and high qualities in invertibility, a discharge capacity, charge and discharge efficiency, and potential flatness. The lithium composite oxide can include materials expressed by a chemical formula $LiCO_aNi_bMcO_2$, for example. In the formula, M expresses at least one kind selected from the group consisting of metallic elements except for cobalt and nickel, values of a, b, and c are in a range satisfying 0<a+b, 0≦c, and a+b+c=1, and a composition ratio of lithium and oxygen may be slightly deviated from Li:O=1:2. In particular, the material preferably contains not only lithium and at least either cobalt or nickel but also at least one kind of metallic element selected from the group consisting of manganese (Mn), aluminum, magnesium (Mg), titanium (Ti), chromium (Cr), and iron (Fe). This is because containing these elements can stabilize a crystal structure, increase chemical stability, and provide high properties at high voltages.

Moreover, the materials containing both cobalt and nickel are preferable, because cobalt-containing materials are easily formed to have a single phase, and almost all nickel-containing materials have a high capacity. Among the group consisting of manganese, aluminum, magnesium, titanium, chromium, and iron, the materials preferably contain manganese and more preferably manganese and at least one kind of metallic element selected from the group except for manganese. This is because the materials containing manganese can improve a charge and discharge cycle characteristic, the materials containing manganese and at least one kind of metallic element selected from the group except for manganese can improve other battery properties such as the charge and discharge efficiency, storage stability, and the battery capacity, and cost may be reduced if a cheap material such as iron is chosen, for example.

In addition to the lithium composite oxide, the cathode 12 may contain another cathode active material. Other cathode active materials can include $LiMn_2O_4$ having a spinel crystal structure and $LiFePO_4$ having an olivine crystal structure, for example.

The anode 14 is formed to contain an anode material capable of the insertion and extraction of lithium, and if needed a binder such as polyvinylidene fluoride. In addition, in the specification, the insertion and the extraction of lithium means that lithium ions are inserted and extracted electrochemically without losing their ionicity. This includes not only existence of lithium in a complete ionic state but also existence thereof in an incomplete ionic state. These states include insertion with an electrochemical intercalation reaction of the lithium ions to graphite, for example, and as well as insertion of the lithium to an alloy containing an intermetallic compound and insertion of the lithium with formation of an alloy.

The anode materials capable of the insertion and extraction of lithium can include carbon materials such as graphite with a spacing between (002) planes of 0.340 nm or less and non-graphitizable carbon and graphitizable carbon which have a spacing between (002) planes of 0.370 nm or more, for example. These carbon materials are preferable, because they have a crystal structure exhibiting very little change during charging and discharging, and can provide a high charge and discharge capacity and an excellent charge and discharge cycle characteristic. Specifically, non-graphitizable carbon is preferable, because it can reduce volume change during charging and discharging, and improve further the charge and discharge cycle characteristic. Moreover, the graphite is preferable, because it can improve an initial capacity.

Specifically, these carbon materials can include carbonaceous materials such as pyrolytic carbons, cokes, graphite, glassy carbons, organic high molecular weight compound-fired objects, carbon fibers, and activated carbon. Among them, the cokes include pitch coke, needle coke, and petroleum coke, and the organic high molecular weight compound-fired objects mean carbonized ones obtained by firing a high molecular material such as a phenol resin or a furan resin at a suitable temperature.

The anode materials capable of the insertion and extraction of lithium can include simple substances, alloys and compounds of metallic elements and semimetal elements which can form an alloy with lithium. They are preferable, because they can provide a high energy density, and they are more preferable especially when they are used with the carbon material, because this can provide the excellent charge and discharge cycle characteristic as well as the high energy density. Moreover, the carbon materials are more preferable, because they can serve also as a conductive agent and can improve conductivity. It should be noticed that the term of the alloy in the specification include not only ones consisting of two or more kinds of metallic elements but also ones consisting of one or more kinds of metallic elements and one or more kinds of semimetal elements. Some of them have a structure of a solid solution, a eutectic (a eutectic mixture), an intermetallic compound, or coexistence of two or more of them.

These metallic elements and semimetal elements can include, for example, tin (Sn), lead (Pb), aluminum, indium (In), silicon (Si), zinc (Zn), copper (Cu), cobalt, antimony (Sb), bismuth (Bi), cadmium (Cd), magnesium, boron (B), gallium (Ga), germanium (Ge), arsenic (As), silver (Ag), hafnium (Hf), zirconium (Zr), and yttrium (Y). These alloys and compounds can include materials expressed by a chemical formula $Ma_sMb_tLi_u$ or a chemical formula $Ma_pMc_qMd_r$, for example. In these chemical formulas, Ma expresses at least one kind selected from the group consisting of metallic elements and semimetal elements which can form an alloy with lithium, Mb expresses at least one kind selected from the group consisting of metallic elements and semimetal elements except for lithium and Ma, Mc expresses at least one kind of nonmetallic elements, and Md expresses at least one kind selected from the group consisting of metallic elements and semimetal elements except for Ma. Moreover, values of s, t, u, p, q, and r are s>0, t≧0, u≧0, p>0, q>0, and r≧0, respectively.

Specifically, simple substances, alloys and compounds of group 4B metallic elements and semimetal elements in the short period of the periodic table are preferable, and silicon, tin, and alloys and compounds thereof are especially preferable. These materials may be crystalline or amorphous.

Concrete examples of these alloys and compounds include LiAl, AlSb, CuMgSb, $SiB_4$, $SiB_6$, $Mg_2Si$, $Mg_2Sn$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, $SiO_v$ (0<v≧2), $SnO_w$ (0<w≧2), $SnSiO_3$, LiSiO, and LiSnO.

The anode materials capable of the insertion and extraction of lithium can also include other metal compounds and high molecular weight materials. Other metal compounds can include oxides such as iron oxide, ruthenium oxide, and molybdenum oxide, and $LiN_3$, and the high molecular weight materials can include polyacethylene, polyaniline, and polypyrrole. Any one kind, two kinds or more of them may be mixed and used as the anode materials capable of the insertion and extraction of lithium.

The separator 15 separates the cathode 12 from the anode 14, and allows the lithium ions to pass through with preventing short circuits of electric currents due to contact between the two electrodes. The separator 15 is formed of a porous film made of a synthetic resin consisting of polytetrafluoroethylene, polypropylene, or polyethylene and of a porous film consisting of an inorganic material such as nonwoven fabric made from a ceramic, and may have a structure of a laminate of two or more kinds of these porous films.

The separator 15 is impregnated with a liquid electrolyte. The electrolyte is composed to contain a solvent and a lithium salt which is an electrolyte salt. The solvent is a material for dissolving and dissociating the electrolyte salt. It is preferable to use an aprotic solvent as the solvent. The aprotic solvents can include, for example, cyclic carbonates such as ethylene carbonate, propylene carbonate, butylene carbonate, vinyl ethylene carbonate, and vinylene carbonate, and chain carbonates such as dimethyl carbonate, diethyl carbonate, and ethyl methyl carbonate, cyclic carboxylates such as γ-butyrolactone and γ-valerolactone, chain carboxylates such as methyl acetate, methyl propionate, and methyl butyrate, and ethers such as sulfolane, tetrahydrofuran, 2-methyl tetrahydrofuran and 1,2-dimethoxyethane, and any one kind, two kinds or more of them are mixed and used. Specifically, it is preferable to mix and use the cyclic carbonate in terms of oxidation stability, and it is more preferable to mix and use the cyclic carbonate not less than 20 vol % nor more than 100 vol % in the solvent. This is because the battery properties such as the charge and discharge efficiency, the storage stability, or the charge and discharge cycle characteristic may be lowered due to oxidative decomposition of the electrolyte at a charge voltage of 4.25 V or more, if it is less than 20 vol %.

Of the cyclic carbonates, the vinylene carbonate and the vinyl ethylene carbonate are preferable, because they form a stable coating on a surface of the anode 14 in a first charging and inhibit side reactions of the electrolyte. It should be noticed that the contents of the vinylene carbonate and the vinyl ethylene carbonate in the solvent are preferably less than 10 vol %, and more preferably 5 vol % or less, because much content thereof may increase internal resistance and degrade the battery properties.

Moreover, the cyclic carboxylates are resistant to oxidation, and especially γ-butyrolactone is preferable, because it has an oxidation potential which is as much high as +5.2 V (in a case of using SCE (saturated calomel electrode) as a reference electrode), and can adequately increase the battery voltage. It should be noticed that the cyclic carboxylate is preferably mixed and used with another solvent, and using it independently is not preferable. Because it may be decomposed on the anode 14 when reduction resistance thereof is weak and this may degrade the battery properties such as the charge and discharge efficiency, the storage stability, or the charge and discharge cycle characteristic. Specifically, it preferably is mixed and used with at least either vinylene carbonate or vinyl ethylene carbonate, because an action of vinylene carbonate or vinyl ethylene carbonate inhibits the decomposition of the cyclic carboxylate on the anode 14 and extract properties of the cyclic carboxylate with relatively high oxidation resistance. In addition, it is preferable to use the cyclic carboxylate less than 50 vol %, and particularly 100/3 vol % or less in the solvent, when it is mixed and used with a solvent which has fewer actions inhibiting decomposition of the cyclic carboxylate unlike these vinylenes carbonate and vinyl ethylene carbonate.

It is preferable to mix and use the chain carbonate as the aprotic solvent, because the chain carbonates have viscosity lower than ones of the cyclic carbonates with the similar structure and this can improve the battery properties. It should be noticed that the battery properties tend to be lowered, when a large quantity such as 80 vol % or more of the chain carbonate is contained in the solvent, so that it is preferable to use the content of 80 vol % or less, and ideally, it is preferable to use the content of 66.6 vol % or less.

The lithium salts can include, for example, $LiAsF_6$, $LiPF_6$, $LiBF_4$, $LiClO_4$, $LiB(C_6H_5)_4$, $LiCH_3SO_3$, $LiCF_3SO_3$, $LiN(CF_3SO_2)_2$, $LiN(C_2F_5SO_2)_2$, $LiC(CF_3SO_2)_3$, $LiAlCl_4$, $LiSiF_6$, $LiCl$, and $LiBr$. Specifically, $LiPF_6$ is preferable, because it can provide high conductivity and is excellent also in oxidation stability, and $LiBF_4$ is preferable because of its excellent thermal stability and oxidation stability. Moreover, $LiClO_4$ is preferable, because it can provide high conductivity, and $LiN(CF_3SO_2)_2$ and $LiN(C_2F_5SO_2)_2$ are preferable, because they can provide relatively high conductivity as well as high thermal stability. Content of the lithium salt to the solvent is preferably not less than 0.6 mol/kg nor more than 2.0 mol/kg, because the content outside the above range may extremely reduce ionic conductivity and provide insufficient battery properties.

In addition, a gel-type electrolyte or a solid-type electrolyte may be used instead of the liquid electrolyte. The gel-type electrolyte has a structure where a liquid solvent is hold in a high molecular weight compound, for example. The high molecular weight compounds can include ether polymers such as polyethylene oxide and cross linked materials containing polyethylene oxide, ester-based high molecular weight compounds such as polymethacrylate, acrylate-based high molecular weight compounds, and fluoropolymers such as polyvinylidene fluoride and a copolymer of polyvinylidene fluoride and hexafluoropropylene, for example, and any one kind, two kinds or more of them are mixed and used. In particular, it is preferable to use the fluoropolymers because of their redox stability.

Moreover, the solid-type electrolytes can include organic solid electrolytes where an electrolyte salt is dispersed in a high molecular weight compound having ion conductivity, and inorganic solid electrolytes consisting of an ion-conductive ceramic, ion-conductive glass, ionic crystals, or the like, for example. As the high molecular weight compounds used in the organic solid electrolyte, ether-based high molecular weight compounds such as polyethylene oxide and cross linked materials containing polyethylene oxide, ester-based high molecular weight compounds such as polymethacrylate, and acrylate-based high molecular weight compounds are independently used, or mixtures or copolymers thereof may be used. In addition, when using the solid-type electrolyte, the separator 15 may be removed.

The secondary battery has the anode material capable of the insertion and extraction of lithium in relatively large quantity compared with that of the cathode active material, and exhibits no lithium metal precipitating on the anode 14 during the charging, that is, it is a so-called lithium ion secondary battery. In addition, a ratio of the cathode active material and the anode active material is set so that the battery voltage at charging may be 4.25 V or more, preferably 4.30 V or more, and more preferably 4.40 V or more, and this increases further the energy density. An upper limit of the battery voltage at charging depends on a variety of the cathode active material, and for example, it becomes 4.60 V or less, when the lithium composite oxide as described above is mainly contained as the cathode active material.

For the practical use of the secondary battery, it is preferable to prevent degradation of the lithium composite oxide at the battery voltage of 4.25 V or more, and to improve the storage stability and the charge and discharge cycle characteristic. The degradation of the lithium composite oxide is based on various causes, and it is considered in many cases that it results from a metal, especially a transition metal which is eluted from the lithium composite oxide, which becomes unstable at a high potential, due to lithium carbonate or lithium sulfate contained in the cathode active material as an impurity, or protic impurities or water contained in the electrolyte as an impurity. Moreover, these impurities cause not only the degradation of the lithium composite oxide but also decomposition of the electrolyte and lowering of the storage stability and the charge and discharge cycle characteristic. Furthermore, the metal eluted from the lithium composite oxide is precipitated on the anode 14 and this causes also internal short circuits. Therefore, a lower concentration of these impurities is more preferable, and the concentration is much more preferably zero.

Specifically, a total amount of lithium carbonate and lithium sulfate in the cathode 12 is preferably 1.0 wt % or less to the cathode active material. Or the concentration of the protic impurities in the electrolyte, which is converted to a mass ratio of protons to the electrolyte, is preferably 20 ppm or less. Alternatively, moisture content in the electrolyte is 20 ppm mass ratio or less to the electrolyte. Furthermore, it is more preferable to satisfy two of the three conditions, and it is much more preferable to satisfy the three, in order to obtain more effects. It should be noticed that the mass of the cathode active material for calculating the total amount of lithium carbonate and lithium sulfate in the cathode 12 contains also a total amount of lithium carbonate and lithium sulfate which are contained as the impurity.

Moreover, the protic impurities means ionic impurities of which counter ions are protons, and are sometimes called free acid component. Specifically, they include inorganic acids such as HCl, HF, HBr, $H_2SO_4$, $HNO_3$, $H_2S$, and $H_3PO_4$, and organic acids such as $HCF_3SO_2$, $HCH_3SO_2$, and $HC_2H_5SO_2$.

The secondary battery can be manufactured as follows, for example.

First, for example, the cathode active material is purified with water washing or the like so that the total amount of lithium carbonate and lithium sulfate to the cathode active material will become 1.0 wt % or less. Next, the cathode active material is mixed with the conductive agent and the binder to prepare a cathode mixture, and then the cathode mixture is compression-molded into a pellet shape to prepare the cathode 12. Alternatively, a solvent such as N-methyl-2-pyrrolidone may be added to the cathode active material, the conductive agent, and the binder, and mixed to obtain the cathode mixture, and the obtained cathode mixture is dried, and compression-molded.

Subsequently, the anode active material and the binder are mixed to prepare an anode mixture, and the anode mixture is compression-molded into a pellet shape to prepare the anode 14. Alternatively, a solvent such as N-methyl-2-pyrrolidone may be added to the anode active material and the binder, and mixed to obtain the anode mixture, and the obtained anode mixture is dried, and compression-molded.

After that, for example, the anode 14, the separator 15 which is impregnated with the electrolyte, and the cathode 12 are laminated and put in the package cup 13 and the package can 11, and they are caulked with a gasket 16. Thereby, the secondary battery shown in FIG. 1 is formed. The electrolyte used here has the protic impurities with the concentration, which is converted to the mass ratio of the protons to the electrolyte, of 20 ppm or less, or the moisture content with 20 ppm mass ratio or less to the electrolyte, and is obtained by purification with chemisorption using micro powder of aluminum oxide ($Al_2O_3$), barium oxide (BaO), magnesium oxide (MgO), activated carbon, molecular sieves, micropowdered silicon dioxide ($SiO_2$), or various metallic oxides, or the like.

The secondary battery acts as follows.

In the secondary battery, during the charging, the lithium ions are extracted from the cathode 12, and are inserted into the anode 14 via the electrolyte with which the separator 15 is impregnated. During the discharging, the lithium ions are extracted from the anode 14, and are inserted into the cathode 12 via the electrolyte with which the separator 15 impregnated, for example. Here, the battery voltage at charging is 4.25 V or more, and the total amount of lithium carbonate and lithium sulfate in the cathode 12, the concentration of the protic impurities in the electrolyte, or the moisture content is below a predetermined amount, which inhibits the elution of the metal from the lithium composite oxide even at the high voltages, and provides the high energy density.

As described above, according to the embodiment, the battery voltage at charging is 4.25 V or more, and the total amount of lithium carbonate and lithium sulphate in the cathode 12 to the cathode active material is 1.0 wt % or less, the concentration of the protic impurities in the electrolyte, which is converted to the mass ratio of the protons to the electrolyte, is 20 ppm or less, or the moisture content in the electrolyte is 20 ppm or less at a mass ratio to the electrolyte, which prevents the elution of the metal from the lithium composite oxide even at the high voltages, and provides the high energy density.

Specifically, when two or more conditions of the total amount of lithium carbonate and lithium sulphate in the cathode 12, the concentration of the protic impurities in the electrolyte, and the moisture content in the electrolyte satisfy the above ranges, more effects can be obtained.

Also, when the lithium composite oxide contains not only lithium and at least either cobalt or nickel but also at least one kind selected from the group consisting of manganese, aluminum, magnesium, titanium, chromium, and iron, the lithium composite oxide has stable crystal structure and chemical stability thereof can be improved, and the high battery properties can be obtained even at the high voltages.

Furthermore, when the solvent contains the cyclic carbonate, little oxidative decomposition is generated and the higher battery properties can be obtained.

Then when the solvent contains the cyclic carboxylate with the content less than 50 vol %, decomposition of the cyclic carboxylate on the anode 14 can be prevented, and the high battery properties can be obtained.

Furthermore, when the solvent contains vinylene carbonate or vinyl ethylene carbonate with the content less than 10 vol %, the high battery properties can be obtained without reducing the internal resistance, and when the solvent furthermore contains the cyclic carboxylate, the existence of vinylene carbonate or vinyl ethylene carbonate can extract properties of the cyclic carboxylate with relatively high oxidation resistance, and the battery properties can be improved furthermore.

In addition, the solvent containing the chain carbonate with the content less than 80 vol % can have low viscosity and improve the battery properties.

Second Embodiment

A secondary battery according to a second embodiment of the invention is a so-called lithium secondary battery where a capacity of an anode is expressed by a capacity component by precipitation and dissolution of lithium. The secondary battery has the same structure as that of the first embodiment except for the anode composed of lithium metal or the like, and can be manufactured like the first embodiment except for using lithium metallic foil as the anode, for example. Therefore, it will be here described with reference to FIG. 1 using the same signs. In addition, detailed description about the same pats is omitted.

In the secondary battery, during the charging, the lithium ions are extracted from the cathode 12, and changed into metal and are precipitated on the anode 14 via the electrolyte with which the separator 15 is impregnated, for example. During the discharging, a part of lithium metal constituting the anode 14 changes into lithium ions, is eluted, and is inserted into the cathode 12 via the electrolyte with which the separator 15 is impregnated, for example. This provides high energy density to the secondary battery. Here, the battery voltage is 4.25 V or more, and the concentration of the impurities is below the predetermined amount as described in the first embodiment, which inhibits the elution of the metal from the lithium composite oxide even at high voltages. This increases furthermore the energy density.

Thus, according to the embodiment, the capacity of the anode 14 is expressed by the capacity component by precipitation and dissolution of lithium, the battery voltage is 4.25V or more, and the total amount of lithium carbonate and lithium sulfate in the cathode 12, the concentration of the protic impurities in the electrolyte, or the moisture content is below the predetermined amount, which provides the high energy density.

Third Embodiment

According to a secondary battery of a third embodiment of the invention, a capacity of an anode includes a capacity component by insertion and extraction of lithium and a capacity component by precipitation and dissolution of lithium, and is expressed by the sum of them. The secondary battery has the same structure as that of the first embodiment except for a composition of the anode, and can similarly be manufactured. Therefore, it will be here described with reference to FIG. 1 using the same signs. In addition, detailed description about the same pats is omitted.

The anode 14 is formed to contain the anode material capable of the insertion and extraction of lithium, and if needed the binder.

The anode material capable of the insertion and extraction of lithium is relatively low compared with the cathode active material, and the lithium metal is precipitated on the anode 14 during the charging. Specifically, in a state where an open-circuit voltage is lower than an overcharge voltage, the lithium metal is precipitated on a surface of the anode material capable of the insertion and extraction of lithium, and the capacity of the anode 14 includes the capacity component by insertion and extraction of lithium and the capacity component by precipitation and dissolution of lithium, and is expressed by the sum of them as described above. Therefore, in the secondary battery, both the anode material capable of the insertion and extraction of lithium and the lithium metal function as the anode active material, and the anode material capable of the insertion and extraction of lithium serves as a base material for lithium metal precipitation. Therefore, for example, when the anode material capable of the insertion and extraction of lithium in the anode 14 is measured by $^7$Li nuclear magnetic resonance spectroscopy in a full charging state, peaks belonging to the lithium ions and the lithium metal is observed.

Here, the overcharge voltage means an open-circuit voltage in an overcharge state of the battery, and for example, a battery voltage higher than the battery voltage at the full charged battery. Here, the battery voltage at charging means an open-circuit voltage of a 'full charged' battery which is defined and described in the 'Guideline for safety assessment of lithium secondary batteries' (SBA G1101) which is one of the standards established by Japan Storage Battery Industries Association (Battery Association of Japan). That is, it means the open-circuit voltage of the battery being charged using a charging method being used for calculating a nominal capacity of each battery, a standard charging method, or a recommended charging method.

The secondary battery is the same as the conventional lithium ion secondary batteries in terms of using the anode material capable of the insertion and extraction of lithium for the anode 14, and is the same as the conventional lithium secondary batteries in terms of lithium metal precipitated on the anode 14, but it allows the lithium metal to be precipitated on the anode material capable of the insertion and extraction of lithium, which provides the following advantages.

First, the anode material capable of the insertion and extraction of lithium has generally a large surface area, and allows the lithium metal to be uniformly precipitated. Second, the lithium metal is precipitated also among grains of the anode material capable of the insertion and extraction of lithium and this generates little volume change. Third, the insertion and extraction of lithium, which is provided by the anode material capable of the insertion and extraction of lithium, also contributes to the charge and discharge capacity, so that an amount by precipitation and dissolution of lithium metal is comparatively low despite the high battery capacity. Fourth, the lithium is inserted into the anode material capable of the insertion and extraction of lithium in an early stage of the charging, so that boost charge become possible.

Thereby, the secondary battery provides the energy density higher than that of the lithium ion secondary battery, and improves further the charge and discharge cycle characteristic and a boost charge property than those of the lithium secondary battery.

Moreover, like the first embodiment, the battery voltage at charging is 4.25 V or more, and the total amount of lithium carbonate and lithium sulfate in the cathode 12, the concentration of the protic impurities in the electrolyte, or the moisture content is below the predetermined amount, which inhibits the elution of the metal from the lithium composite oxide even at the high voltages. This increases furthermore the energy density.

In the secondary battery, during the charging, the lithium ions are extracted from the cathode 12, and at first are inserted into the anode material, which is capable of the insertion and extraction of lithium and is contained in the anode 14, via the electrolyte with which the separator 15 is impregnated. Furthermore, when the charging is continued, in a state where the open-circuit voltage is lower than the overcharge voltage, the lithium metal begins to be precipitated on the surface of the anode material capable of the insertion and extraction of lithium. After that, the lithium metal precipitation on the anode 14 continues until the charging ends.

Subsequently, when the discharging is performed, at first, the lithium metal which has been precipitated on the anode 14 changes into lithium ions, is eluted, and is inserted into the cathode 12 via the electrolyte with which the separator 15 is impregnated. Furthermore, when the discharging is continued, the lithium ions, which have been inserted into the anode material capable of the insertion and extraction of lithium in the anode 14, are extracted, and inserted into the cathode 12 via the electrolyte.

Thus, according to the embodiment, the capacity of the anode includes the capacity component by insertion and extraction of lithium and the capacity component by precipitation and dissolution of lithium, and is expressed by the sum of them, which provides the energy density higher than that of the lithium ion secondary battery, and improves further the charge and discharge cycle characteristic and the boost charge property than those of the lithium secondary battery. Moreover, the battery voltage at charging is 4.25 V or more, and the total amount of lithium carbonate and lithium sulfate in the cathode 12, the concentration of the protic impurities in the electrolyte, or the moisture content is below the predetermined amount, which inhibits the elution of the metal from the lithium composite oxide even at the high voltages, and this increases furthermore the energy density.

Furthermore, concrete examples of the invention will be described in detail. In the following Examples, coin type batteries shown in FIG. 1 were produced as the lithium secondary battery where the capacity of the anode is expressed by the capacity component by precipitation and dissolution of lithium, the secondary battery where the capacity of the anode includes the capacity component by insertion and extraction of lithium and the capacity component by precipitation and dissolution of lithium and is expressed by the sum of them, and the lithium ion secondary battery where the capacity of the anode is expressed by the capacity component by insertion and extraction of lithium. Therefore, here, they will be explained with reference to FIG. 1 using the same signs.

EXAMPLES 1-1 TO 1-10

As a battery for tests, lithium secondary batteries where the capacity of the anode 14 was expressed by the capacity component by precipitation and dissolution of lithium were produced, and properties of the cathode 12 were examined.

First, lithium carbonate ($Li_2CO_3$) and cobalt carbonate ($CoCO_3$) were mixed at a ratio of $Li_2CO_3:CoCO_3=0.5:1$ (mole ratio), and fired at 900° C. in the air for 5 hours to obtain $LiCoO_2$. Subsequently, obtained $LiCoO_2$ was washed in water for purification to prepare the cathode active material. Microchemistry analysis was performed on the purified cathode active material to obtain a total amount of lithium carbonate and lithium sulfate to the cathode active material, and results are shown in Examples 1-1 to 1-10 in Tables 1-3. Then 91 mass parts of the cathode active material, 6 mass parts of graphite for the conductive agent, and 3 mass parts of polyvinylidene fluoride for the binder were mixed in N-methyl-2-pyrrolidone for the solvent, dried, and mixed again to prepare the cathode mixture. After that, the cathode mixture with a mesh-like current collector made of aluminum was compression-molded into a pellet shape to produce the cathode 12.

Furthermore, $LiPF_6$ was dissolved with content of 1.0 mol/l in a solvent where ethylene carbonate and dimethyl carbonate were mixed at a volume ratio of ethylene carbonate:dimethyl carbonate=1:1, and purified to produce a liquid electrolyte. Microchemistry analysis was performed on the electrolyte to obtain the concentration of the protic impurities and the moisture content with a mass ratio to the electrolyte, and results are shown in Examples 1-1 to 1-10 in Tables 1-3. Here, the concentration of the protic impurities was a value converted into a proton concentration.

After producing the cathode 12 and the electrolyte, the anode 14 which was formed by punching lithium foil and the separator 15 were put in this order on a center part of the package cup 13, the electrolyte was injected therein, and the package can 11 into which the cathode 12 was put was caulked with the gasket 16 to prepare the secondary battery.

Constant current and voltage charging was performed on the obtained secondary batteries of Examples 1-1 to 1-10. At that time, constant current charging was performed at a current of 0.5 mA until the voltage reached the upper limit voltage shown in Tables 1-3, and constant voltage charging was performed at an upper limit voltage shown in Tables 1-3 until the current was reduced to 0.01 mA. Subsequently, the charged battery was disassembled and the cathode 12 was removed therefrom, immersed in 20 ml of an electrolyte for preservation having the same composition as that of the electrolyte being injected into the secondary battery, and sealed.

Then, after storing in a 60° C. thermostat for 100 hours, the cathode 12 was removed from the electrolyte for preservation, and coloration of the electrolyte for preservation was observed. Results thereof are shown in Tables 1-3. In Tables 1-3, a x-indicator means that coloration was observed in large quantity, and a circle indicator means that no coloration was observed.

On the other hand, the battery was charged at the constant current and voltage in the above conditions, stored in the 60° C. thermostat for 100 hours, and then discharged at a current of 0.5 mA until the battery voltage reached 3.0 V. Then, one cycle of the charging and discharging in the above conditions was performed again and a discharge capacity thereof was obtained. Results thereof are also shown in Tables 1-3.

Secondary batteries were produced as Comparative Examples 1-1 to 1-9 for comparison with Examples 1-1 to 1-10, as well as Examples 1-1 to 1-10 except for using the cathode active material and the electrolyte which had amounts of the impurities shown in Tables 1-3. Comparative Examples 1-1 to 1-9 were treated as well as Examples 1-1 to 1-10 except for performing the constant current and voltage charging with the upper limit voltage shown in Tables 1-3, to be examined for the coloration of the electrolyte for preservation and the discharge capacity after the storing. Obtained results are shown in Tables 1-3.

As shown in Tables 1-3, the discharge capacities of Examples 1-1 to 1-5 where the upper limit voltage was set to 4.25 V were higher than those of Comparative Examples 1-1 to 1-5 where the upper limit voltage was set to 4.20 V. Moreover, the discharge capacities of Examples 1-6 and 1-7 where the upper limit voltage was set to 4.30 V were higher than those of Examples 1-1 to 1-5 where the upper limit voltage was set to 4.25 V, and the discharge capacities of Examples 1-8 to 1-10 where the upper limit voltage was set to 4.40 V were higher than those of Examples 1-6 and 1-7 where the upper limit voltage was set to 4.30 V. Here, Comparative Examples 1-1, 1-2, 1-3, 1-4, and 1-5 correspond to Examples 1-1, 1-2, 1-3, 1-4, and 1-5, respectively. This reveals that increasing the upper limit voltage can improve the energy density.

Moreover, comparing Comparative Example 1-6 and Comparative Example 1-7 where the total amount of lithium carbonate and lithium sulfate was 1.5 wt %, the concentration of the protic impurities was 25 ppm, and the moisture content was 30 ppm, the discharge capacity in Comparative Example 1-6 was 7.0 mAh, but the discharge capacity in Comparative Example 1-7 was as low as 4.8 mAh despite of the upper limit voltage being as high as 4.25 V. As shown in Table 1, the coloration was observed in the electrolyte for preservation of Comparative Example 1-7, and it is considered that this resulted from cobalt being eluted from the cathode 12. That is, when the total amount of lithium carbonate and lithium sulfate is 1.0 wt % or less, the concentration of the protic impurities is 20 ppm or less, or the moisture content is 20 ppm or less, the good chemical stability can be obtained, the excellent storage stability can be secured, and the energy density can be improved, even if the upper limit voltage is as high as 4.25 V.

Furthermore, Examples 1-8 to 1-10 reveal that lowering the concentration of the impurities can provide the excellent storage stability and increase the energy density, even if the upper limit voltage is increased.

Here, the lithium secondary batteries were produced as the battery for the tests and the properties of the cathode 12 were examined, but it is thought that the properties of the cathode 12 can be obtained regardless of the materials of the anode 14. That is, it is thought that the same effects are obtained also in the lithium ion secondary battery and the secondary battery where the capacity of the anode 14 includes the capacity component by insertion and extraction of lithium and the capacity component by precipitation and dissolution of lithium and is expressed by the sum of them as well as the Examples.

EXAMPLES 2-1 TO 2-10

Lithium ion secondary batteries where the capacity of the anode 14 was expressed by the capacity component by insertion and extraction of lithium were produced and properties thereof were examined. Here, 90 mass parts of non-graphitizable carbon for the anode active material, and 10 mass parts of polyvinylidene fluoride for the binder were mixed in N-methyl-2-pyrrolidone for the solvent and dried to prepare an anode mixture, the anode mixture with a mesh-like current collector made from nickel was compression-molded, and obtained one was used as the anode 14. A ratio of the amounts of the cathode active material and the anode active material was adjusted so that the lithium metal might not be precipitated on the anode 14 during charging. Other conditions were the same as those of Examples 1-1 to 1-10. Impurity amounts in the used cathode active materials and electrolytes are shown in Tables 4-6.

Here, the non-graphitizable carbon was produced by using petroleum pitch as a starting material, introducing a functional group containing oxygen thereinto with a ratio of 10% to 20% to form oxygen cross-links, and firing it at 1000° C. in an inert gas flow. When X-ray diffraction measurement was performed on the obtained non-graphitizable carbon, a spacing between (002) planes was 0.376 nm and true specific gravity was 1.58. The non-graphitizable carbon was ground into powder with a mean particle size of 10 μm and it was used as the anode active material.

Secondary batteries were produced as Comparative Examples 2-1 to 2-9 for comparison with Examples 2-1 to 2-10, as well as Examples 2-1 to 2-10 except for using the cathode active material and the electrolyte which had amounts of the impurities shown in Tables 4-6.

Examples 2-1 to 2-10 and Comparative Examples 2-1 to 2-9 were also treated as well as Examples 1-1 to 1-10 except for performing the constant current and voltage charging with the upper limit voltage shown in Tables 4-6, to be examined for the coloration of the electrolyte for preservation and the discharge capacity after the storing. Obtained results are shown in Tables 4-6.

As shown in Tables 4-6, the same tendency as that of the lithium secondary batteries was observed also in the lithium ion secondary batteries. This reveals that when the total amount of lithium carbonate and lithium sulfate is 1.0 wt % or less, the concentration of the protic impurities is 20 ppm or less, or the moisture content is 20 ppm or less also in the lithium ion secondary batteries, the good chemical stability can be obtained, the excellent storage stability can be secured, and the energy density can be improved, even if the upper limit voltage is as high as 4.25 V.

EXAMPLES 3-1 TO 3-10

Lithium ion secondary batteries where the capacity of the anode 14 was expressed by the capacity component by insertion and extraction of lithium were produced like Examples 2-1 to 2-10, using a copper-tin (Cu—Sn) base alloy as the anode active material, and properties thereof were examined. Impurity amounts in the used cathode active materials and electrolytes are shown in Tables 7-9. Secondary batteries were produced as Comparative Examples 3-1 to 3-9 for comparison with Examples 3-1 to 3-10, as well as Examples 3-1 to 3-10 except for using the cathode active material and the electrolyte which had amounts of the impurities shown in Tables 7-9.

Examples 3-1 to 3-10 and Comparative Examples 3-1 to 3-9 were also treated as well as Examples 1-1 to 1-10 except for performing the constant current and voltage charging with the upper limit voltage shown in Tables 7-9, to be examined for the coloration of the electrolyte for preservation and the discharge capacity after the storing. Obtained results are shown in Tables 7-9.

Tables 7-9 reveal that also in the case of using the copper-tin base alloy, when the total amount of lithium carbonate and lithium sulfate is 1.0 wt % or less, the concentration of the protic impurities is 20 ppm or less, or the moisture content is 20 ppm or less, the good chemical stability can be obtained, the excellent storage stability can be secured, and the energy density can be improved, even if the upper limit voltage is as high as 4.25 V.

EXAMPLES 4-1 TO 4-10

Lithium ion secondary batteries where the capacity of the anode 14 was expressed by the capacity component by insertion and extraction of lithium were produced like Examples 2-1 to 2-10, using $LiNiO_2$ as the cathode active material, and properties thereof were examined. Here, $LiNiO_2$ was produced by mixing lithium hydroxide ($LiOH.H_2O$) and nickel hydroxide ($Ni(OH)_2$) at a rate of $LiOH.H_2O:Ni(OH)_2=1:1$ (mole ratio), and firing the mixture at 750° C. in an oxygen atmosphere for 5 hours. Impurity amounts in the used cathode active materials and electrolytes are shown in Tables 10-12.

Secondary batteries were produced as Comparative Examples 4-1 to 4-9 for comparison with Examples 4-1 to 4-10, as well as Examples 4-1 to 4-10 except for using the cathode active material and the electrolyte which had amounts of the impurities shown in Tables 10-12.

Examples 4-1 to 4-10 and Comparative Examples 4-1 to 4-9 were also treated as well as Examples 1-1 to 1-10 except for performing the constant current and voltage charging with the upper limit voltage shown in Tables 10-12, to be examined for the coloration of the electrolyte for preservation and the discharge capacity after the storing. Obtained results are shown in Tables 10-12.

Tables 10-12 reveal that also in the case of using $LiNiO_2$ as the cathode active material, like the case of using $LiCoO_2$, when the total amount of lithium carbonate and lithium sulfate is 1.0 wt % or less, the concentration of the protic impurities is 20 ppm or less, or the moisture content is 20 ppm or less, the good chemical stability can be obtained, the excellent storage stability can be secured, and the energy density can be improved, even if the upper limit voltage is as high as 4.25 V.

EXAMPLES 5-1 TO 5-24

Secondary batteries were produced as Examples 5-1 to 5-24 and Comparative Examples 5-1 to 5-32 for comparison with the Examples, as well as Example 1-1 except for using the lithium salt shown in Tables 13-24. A mixture of $LiPF_6$ and $LiBF_4$ with an equal mole ratio was used for Examples 5-1 to 5-6 and Comparative Examples 5-1 to 5-8, a mixture of $LiPF_6$ and $LiClO_4$ with an equal mole ratio was used for Examples 5-7 to 5-12 and Comparative Examples 5-9 to 5-16, a mixture of $LiPF_6$ and $LiN(CF_3SO_2)_2$ with an equal mole ratio was used for Examples 5-13 to 5-18 and Comparative Examples 5-17 to 5-24, and a mixture of $LiPF_6$ and $LiN(C_2F_5SO_2)_2$ with an equal mole ratio was used for Examples 5-19 to 5-24 and Comparative Examples 5-25 to 5-32. Impurity amounts in the used cathode active materials and electrolytes are shown in Tables 13-24. Examples 5-1 to 5-24 and Comparative Examples 5-1 to 5-32 were also treated as well as Example 1-1 except for performing the constant current and voltage charging with the upper limit voltage shown in Tables 13-24, to be examined for the coloration of the electrolyte for preservation and the discharge capacity after the storing. Obtained results are shown in Tables 13-24. In Tables 13-24, a triangle indicator means that coloration was slightly observed.

Tables 1-3 and 13-24 reveal that regardless of kinds of the lithium salt, when the total amount of lithium carbonate and lithium sulfate is 1.0 wt % or less, the concentration of the protic impurities is 20 ppm or less, or the moisture content is 20 ppm or less, the good chemical stability can be obtained, the excellent storage stability can be secured, and the energy density can be improved, even if the upper limit voltage is as high as 4.25 V.

They reveal also that regardless of the kinds of the lithium salt, two or more conditions of the total amount of lithium carbonate and lithium sulphate, the concentration of the protic impurities, and the moisture content satisfy the above ranges, the excellent storage stability can be secured and the energy density can further be improved, even if the upper limit voltage is as high as 4.30 V or 4.40 V.

EXAMPLES 6-1 TO 6-355

Lithium ion secondary batteries where the capacity of the anode 14 was expressed by the capacity component by insertion and extraction of lithium were produced as Examples 6-1 to 6-355 and Comparative Examples 6-1 to 6-119 using a material which was obtained by dissolving $LiPF_6$ with content of 0.6 mol/kg or 1.0 mol/kg in a solvent having a composition shown in Tables 25-95 and purifying it. In Tables 25-95, DMC expresses dimethyl carbonate, EC expresses ethylene carbonate, PC expresses propylene carbonate, GBL expresses γ-butyrolactone, VEC expresses vinylethylene carbonate, VC expresses vinylene carbonate, and values in parentheses express mixing ratios (vol %) thereof. Content of $LiPF_6$ was set to 1.0 mol/kg in Examples 6-1 to 6-10 and 6-41 to 6-355, and was set to 0.6 mol/kg in Examples 6-11 to 6-40. Here, 94 wt % of $LiCoO_2$ produced like Example 1-1, 3 wt % of carbon powder for the conductive agent, 3 wt % of polyvinylidene fluoride for the binder were mixed to prepare a cathode mixture, the cathode mixture was dispersed in N-methyl-2-pyrrolidone for the solvent to prepare cathode mixture slurry, the cathode mixture slurry was uniformly applied to one side of a cathode current collector made of aluminum, and dried to form a cathode mixture layer, and obtained one was cut into a circle shape for using as the cathode 12. Moreover, 90 wt % of granular artificial graphite powder and 10 wt % of polyvinylidene fluoride were mixed to prepare an anode mixture, the anode mixture was dispersed in N-methyl-2-pyrrolidone for the solvent to prepare anode mixture slurry, the anode mixture slurry was uniformly applied to one side of an anode current collector made of copper, and dried to form an anode mixture layer, and obtained one was cut into a circle shape for using as the anode 14. When producing the cathode 12 and the anode 14, thicknesses of the cathode mixture layer and the anode mixture layer were adjusted suitably so that the sum of volumes of the cathode mixture layer and of the anode mixture layer might be constant in Examples 6-1 to 6-355. Impurity amounts in the used cathode active materials and electrolytes are shown in Tables 25-95.

Examples 6-1 to 6-355 and Comparative Examples 6-1 to 6-119 were also treated as well as Example 1-1 except for performing the constant current and voltage charging with the upper limit voltage shown in Tables 25-95, to be examined for the discharge capacity after the storing. Obtained results are shown in Tables 25-95.

Tables 25-95 reveal that regardless of compositions of the solvent, when the total amount of lithium carbonate and lithium sulfate is 1.0 wt % or less, the concentration of the protic impurities is 20 ppm or less, or the moisture content is 20 ppm or less, the excellent storage stability can be secured and the energy density can be improved, even if the upper limit voltage is as high as 4.25 V.

They reveal also that regardless of the compositions of the solvent, two or more conditions of the total amount of lithium carbonate and lithium sulphate, the concentration of the protic impurities, and the moisture content satisfy the above ranges, the excellent storage stability can be secured and the energy density can further be improved, even if the upper limit voltage is as high as 4.30 V or 4.40 V.

Moreover, comparing Tables 25 and 26 with Tables 27-95 reveals that the discharge capacities after the storing of Examples 6-11 to 6-355, where the solvent contained at least one kind of ethylene carbonate, propylene carbonate, vinyl ethylene carbonate, and vinylene carbonate as the cyclic carbonate, were higher than those of Examples 6-1 to 6-10 where the solvent contained only dimethyl carbonate as the chain carbonate. This reveals that when the solvent contains the cyclic carbonate, more excellent chemical stability can be obtained and the storage stability can be improved.

Furthermore, comparing Tables 33-47 with Tables 48-50 reveals that the discharge capacities after the storing of Examples 6-41 to 6-115, where the solvent contained dimethyl carbonate as the chain carbonate with content of 80 vol % or less, were higher than those of Examples 6-116 to 6-130 where the solvent contained the same with content of 80 vol % or more. This reveals that when the solvent contains the chain carbonate with the content of 80 vol % or less, more excellent chemical stability can be obtained and this is preferable.

In addition, comparing Tables 33-35 with Tables 51-56 and Tables 57-59 has revealed that the discharge capacities after the storing of Examples 6-41 to 6-55, where no vinyl ethylene carbonate was contained, were higher than those of Examples 6-161 to 6-175 where vinyl ethylene carbonate was contained with content of 10 vol %, and the discharge capacities after the storing of Examples 6-131 to 6-160, where vinyl ethylene carbonate was contained with content less than 10 vol %, were higher than those of Examples 6-41 to 6-55. This reveals that when the solvent contains vinyl ethylene carbonate with the content less than 10 vol %, more excellent chemical stability can be obtained and the storage stability can be improved.

Furthermore, comparing Tables 33-35 with Tables 60-65 and Tables 66-68 reveals that the discharge capacities after the storing of Examples 6-41 to 6-55, where no vinylene carbonate was contained, were higher than those of Examples 6-206 to 6-220 where vinylene carbonate was contained with content of 10 vol %, and those of Examples 6-176 to 6-205 where vinylene carbonate was contained with content less than 10 vol % were higher than those of Examples 6-41 to 6-55. This reveals that also when the solvent contains vinylene carbonate with the content less than 10 vol %, more excellent chemical stability can be obtained and the storage stability can be improved.

In addition, comparing Tables 33-35 with Tables 69-74 and Tables 75-77 reveals that the discharge capacities after the storing of Examples 6-41 to 6-55 where no γ-butyrolactone was contained and Examples 6-221 to 6-250 where γ-butyrolactone was contained with content less than 50 vol % were higher than those of Examples 6-251 to 6-265 where γ-butyrolactone was contained with content of 50 vol % or more. This reveals that when the solvent contains γ-butyrolactone with the content less than 50 vol %, more excellent chemical stability can be obtained and this is preferable. However, comparing Tables 69-74 with Tables 78-83 and Tables 69-74 with Tables 87-92 reveals that the discharge capacities after the storing of Examples 6-266 to 6-295 and Examples 6-311 to 6-340, where the solvent contained γ-butyrolactone even with the content of 50 vol % or more, were higher than those of Examples 6-41 to 6-55 where no γ-butyrolactone was contained. This reveals that when the solvent having vinyl ethylene carbonate or vinylene carbonate with the content less than 10 vol % contains γ-butyrolactone, the storage stability can be improved. It is considered that this is because actions of vinyl ethylene carbonate or vinylene carbonate inhibit decomposition of γ-butyrolactone on the surface of the anode 14, and this extracts properties of γ-butyrolactone with relatively high oxidation resistance.

EXAMPLE 7-1

A lithium secondary battery was produced like Example 1-7. Impurity concentrations thereof are shown in Table 96. A charging and discharging test was performed on the obtained secondary battery of Example 7-1, and capacity retention ratio was obtained. At that time, the charging was constant current and voltage charging where constant current charging was performed at a constant current of 1.0 mA until a battery voltage reached 4.30 V, and then constant voltage charging was performed at a constant voltage of 4.30 V until a current value was reduced to 0.01 mA. On the other hand, the discharging was a constant current discharging with a current value of 1.0 mA. Here, the capacity retention ratio was calculated as a ratio of a discharge capacity after 50 cycles to a discharge capacity after two cycles, i.e., (the discharge capacity after 50 cycles/the discharge capacity after two cycles)× 100. Obtained results are shown in Table 96.

Moreover, a lithium secondary battery as Comparative Example 7-1 for comparison with the Example was produced like Comparative Example 1-8. Impurity amounts in the cathode active material and the electrolyte are shown in Table 96. The charging and discharging test was performed also on Comparative Example 7-1 as well as the Example to obtain the discharge capacity retention ratio. Obtained results are shown in Table 96.

As shown in Table 96, according to the Example, the capacity retention ratiohigher than that of Comparative Example 7-1 was obtained. This reveals that controlling the total amount of lithium carbonate and lithium sulfate, the concentration of the protic impurities and the moisture content can improve the charge and discharge cycle characteristic.

EXAMPLE 7-2

A secondary battery, where the capacity of the anode 14 included the capacity component by insertion and extraction of lithium and the capacity component by precipitation and dissolution of lithium and was expressed by the sum of them, was produced as well as Example 2-7 except for setting the battery voltage at full charge to 4.30 V, and adjusting a ratio of amounts of the cathode active material and of the anode active material so that lithium metal might be precipitated on the anode 14 during charging. Impurity concentrations thereof are shown in Table 97.

Moreover, a lithium secondary battery as Comparative Example 7-2 for comparison with the Example was produced like the Example except for using the cathode active material and the electrolyte which have the impurity amounts shown in Table 97. The charging and discharging test was performed also on Example 7-2 and Comparative Example 7-2 like Example 7-1 to obtain the discharge capacity retention ratio. Obtained results are shown in Table 97. In Table 97, the upper limit voltage means the battery voltage at the full charge as described in the above embodiment.

As shown in Table 97, according to the Example, the capacity retention ratiohigher than that of Comparative Example 7-2 was obtained like Example 7-1. This reveals that when the concentration of the impurities is controlled also in the secondary battery where the capacity of the anode 14 includes the capacity component by insertion and extraction of lithium and the capacity component by precipitation and dissolution of lithium and was expressed by the sum of them, the charge and discharge cycle characteristic can be improved.

EXAMPLE 7-3

A secondary battery, where the capacity of the anode 14 was expressed by the capacity component by insertion and extraction of lithium was produced as well as Example 2-7. Moreover, a lithium secondary battery as Comparative Example 7-3 for comparison with the Example was produced like the Example except for using the cathode active material and the electrolyte which have the impurity amounts shown in Table 98. The charging and discharging test was performed also on Example 7-3 and Comparative Example 7-3 like Example 7-1 to obtain the discharge capacity retention ratio. Obtained results are shown in Table 98.

As shown in Table 98, according to the Example, the capacity retention ratiohigher than that of Comparative Example 7-3 was obtained like Example 7-1. This reveals that controlling the concentration of the impurities also in the lithium ion secondary battery can improve the charge and discharge cycle characteristic.

Moreover, comparing Tables 96, 97, and 98 shows that improvements of the properties of Examples 7-2 and 7-3 compared with those of the Comparative Examples were more remarkable than that of Example 7-1. This reveals that larger effects can be obtained in the secondary battery where the capacity of the anode 14 includes the capacity component by insertion and extraction of lithium and the capacity component by precipitation and dissolution of lithium and is expressed by the sum of them and in the lithium ion secondary battery compared with the lithium secondary battery.

When the secondary battery, where the capacity of the anode 14 included the capacity component by insertion and extraction of lithium and the capacity component by precipitation and dissolution of lithium and was expressed by the sum of them, was compared with the lithium ion secondary battery, where the capacity of the anode 14 was expressed by the capacity component by insertion and extraction of lithium, in terms of the discharge capacity at the time that the sum of volumes of the cathode 12 and the anode 14 was equal, the discharge capacity after one cycle (an initial discharge capacity) of the secondary battery, where the capacity of the anode 14 included the capacity component by insertion and extraction of lithium and the capacity component by precipitation and dissolution of lithium and was expressed by the sum of them, was about 15% higher than that of the lithium ion secondary battery, and the discharge capacity after 50 cycles was also higher. This means that the secondary battery, where the capacity of the anode 14 includes the capacity component by insertion and extraction of lithium and the capacity component by precipitation and dissolution of lithium and is expressed by the sum of them, is more excellent than the lithium ion secondary battery from the overall point of view.

EXAMPLES 8-1 TO 8-432

Lithium ion secondary batteries where the capacity of the anode 14 was expressed by the capacity component by insertion and extraction of lithium were produced as Examples 8-1 to 8-432 and Comparative Examples 8-1 to 8-243 for comparison with the Examples, as well as Examples 2-1 to 2-10 except for using the cathode active material having the composition and the impurities being shown in Tables 99-206. At that time, a hydroxide, an oxide, a carbonate or the like which contained composition elements of the cathode active material was used as a raw material of the cathode active material, and firing was performed at 700° C. to 1000° C. in the air atmosphere or an oxygen atmosphere. Impurity amounts of the electrolytes are shown in Tables 99-206.

The charging and discharging test was performed on the secondary batteries of Examples 8-1 to 8-432 and Comparative Examples 8-1 to 8-243 at room temperature, and the discharge capacity retention ratio after 10 cycles, 50 cycles, and 100 cycles were obtained. At that time, the charging was constant current and voltage charging where constant current charging was performed at a constant current of 1 mA till the upper limit voltage shown in Tables 99-206 and constant voltage charging was performed at the same voltage until the current value was reduced to 0.01 mA. On the other hand, the discharging was constant current discharging, and it was performed at a constant current of 0.5 mA until a closed circuit voltage reached 2.5 V. Here, the discharge capacity retention ratio after 10 cycles, 50 cycles and 100 cycles were calculated as a ratio of the discharge capacity after the corresponding cycles to the initial discharge capacity, i.e., (the discharge capacity after the corresponding cycles/the initial discharge capacity)×100. Obtained results are shown in Tables 99-206.

As shown in Tables 99-206, comparing the Comparative Examples where the upper limit voltage was set to 4.2 V and the impurity amounts were the same, the discharge capacity retention ratio thereof were almost equal. On the other hand, among Examples 8-1 to 8-432 where the upper limit voltage was set to 4.25 V, 4.30 V, 4.40 V, or 4.50 V, Examples 8-49 to 8-432 using the cathode active material, which contained not only lithium and at least either cobalt or nickel but also one kind of metallic element selected from the group consisting of manganese, aluminum, magnesium, titanium, chromium, and iron, were superior to Examples 8-1 to 8-16 using $LiCoO_2$ and Examples 8-17 to 8-32 using $LiNiO_2$.

This reveals using the cathode active material, which contains not only lithium and at least either cobalt or the nickel but also one kind of metallic element selected from the group consisting of manganese, aluminum, magnesium, titanium, chromium, and iron, can improve the charge and discharge cycle characteristic even if the upper limit voltage is 4.25 V or more.

Moreover, comparing Tables 99-106 with Tables 107-110 and Tables 127-130 with Tables 166-169 shows that the discharge capacity retention ratio of Examples 8-33 to 8-48 and Examples 8-273 to 8-288 where both cobalt and nickel were contained were superior to those of Examples 8-1 to 8-32 and Examples 8-113 to 8-128 where either cobalt or nickel was contained. This reveals that the lithium composite oxide containing both cobalt and nickel is more preferable.

Furthermore, comparing Tables 147-149 with Tables 150-169 shows that the discharge capacity retention ratio of Examples 8-193 to 8-208 where manganese was contained as a metallic element other than cobalt or nickel were superior to those of Examples 8-209 to 8-288 where another metallic element was contained. This reveals that the lithium composite oxide containing manganese is more preferable.

In addition, comparing Tables 147-149 with Tables 186-206 shows that the almost equal discharge capacity retention ratio were obtained in Examples 8-159 to 8-208 where manganese was contained as another metallic element other than cobalt or nickel, and Examples 8-353 to 8-432 where at least one kind selected from the group consisting of aluminum, magnesium, titanium, chromium, and iron was contained in addition to manganese. Moreover, the discharge capacity retention ratio of Examples. 8-321 to 8-352 where aluminum or magnesium was contained in addition to manganese were slightly superior to those of Examples 8-159 to 8-208, when the upper limit voltage was high. This reveals that when the lithium composite oxide contains manganese and at least one metallic element selected from the group consisting of aluminum and magnesium, the charge and discharge cycle characteristic can be improved and improvements of the battery properties other than the charge and discharge cycle characteristic and cost reduction can be accomplished.

Furthermore, Tables 99-206 reveal that when the concentration of the impurities is lowered, the excellent charge and discharge cycle characteristic can be obtained even if the upper limit voltage is increased.

Although the invention has been described by the foregoing embodiments and Examples, the invention is not limited to the embodiments and Examples but can be variously modified. For example, the cases where the battery voltage at charging of 4.25 V, 4.30 V, 4.40 V, or 4.50 V have concretely been described in Examples, but when the concentration of the impurities is lowered, the excellent storage stability and the excellent charge and discharge cycle characteristic can be obtained and the energy density can be increased, even if the battery voltage at charging is higher than 4.50 V.

Moreover, the coin type secondary batteries have concretely been described in the above embodiments and Examples, the invention is applicable similarly to secondary batteries with another shape such as a cylinder type, a button type, a square shape, or a shape using an external component such as a laminate film, and secondary batteries with another structure such as a wound structure. Moreover, the secondary batteries have been described in the above embodiments, but it is applicable similarly to other batteries such as primary batteries.

As described above, according to the battery of the invention, the battery voltage at charging is 4.25 V or more, and the total amount of lithium carbonate and lithium sulphate in the cathode to the cathode active material is 1.0 wt % or less, the concentration of the protic impurities in the electrolyte, which is converted to the mass ratio of the protons to the electrolyte, is 20 ppm or less, or the moisture content in the electrolyte is 20 ppm mass ratio or less to the electrolyte, which prevents the elution of the metal from the lithium composite oxide even at the high voltages, and provides the high energy density.

In particular, according to one aspect of the battery of the invention, two or more conditions of the total amount of lithium carbonate and lithium sulphate in the cathode, the concentration of the protic impurities in the electrolyte, and the moisture content in the electrolyte satisfy the predetermined ranges, so that more effects can be obtained.

Moreover, according to another aspect of the battery of the invention, the lithium composite oxide contains not only lithium and at least either cobalt or nickel but also at least one kind selected from the group consisting of manganese, aluminum, magnesium, titanium, chromium, and iron, so that the lithium composite oxide has stable crystal structure and the chemical stability can be improved, and the high battery properties can be obtained even at the high voltages.

Furthermore, according to still another aspect of the battery of the invention, the solvent contains the cyclic carbonate, so that little oxidative decomposition is generated and the higher battery properties can be obtained.

Furthermore, according to still another aspect of the battery of the invention, the solvent contains the cyclic carboxylate with the content less than 50 vol % and this can prevent the cyclic carboxylate from being decomposed on the anode 14, and provide the high battery properties.

Furthermore, according to still another aspect of the battery of the invention, the solvent contains vinylene carbonate or vinyl ethylene carbonate with the content less than 10 vol %, and this can provide the high battery properties without reducing the internal resistance, and when the solvent furthermore contains the cyclic carboxylate, the existence of vinylene carbonate or vinyl ethylene carbonate extracts properties of the cyclic carboxylate with relatively high oxidation resistance, and the battery properties can be improved furthermore.

In addition, according to still another aspect of the battery of the invention, the solvent contains the chain carbonate with the content less than 80 vol %, and this can lower the viscosity of the solvent and improve the battery properties.

Obviously many modifications and variations of the present invention are possible in the light of the above description. It is therefore to be understood that within the scope of the appended claims the invention may be practiced otherwise than as specifically described.

TABLE 1

| | cathode active material | anode active material | lithium salt | concentration of $Li_2CO_3$ + $Li_2SO_4$ (wt %) | concentration of protic impurities (ppm) | moisture content (ppm) | upper limit voltage (V) | coloration | discharge capacity (mAh) |
|---|---|---|---|---|---|---|---|---|---|
| Example 1-1 | $LiCoO_2$ | Li metal | $LiPF_6$ | 1.0 | 25 | 30 | 4.25 | ○ | 7.2 |
| Example 1-2 | $LiCoO_2$ | Li metal | $LiPF_6$ | 1.5 | 20 | 30 | 4.25 | ○ | 7.3 |
| Example 1-3 | $LiCoO_2$ | Li metal | $LiPF_6$ | 1.5 | 25 | 20 | 4.25 | ○ | 7.4 |
| Example 1-4 | $LiCoO_2$ | Li metal | $LiPF_6$ | 1.0 | 20 | 30 | 4.25 | ○ | 7.6 |
| Example 1-5 | $LiCoO_2$ | Li metal | $LiPF_6$ | 1.0 | 20 | 20 | 4.25 | ○ | 7.7 |
| Comparative Example 1-1 | $LiCoO_2$ | Li metal | $LiPF_6$ | 1.0 | 25 | 30 | 4.20 | ○ | 7.0 |
| Comparative Example 1-2 | $LiCoO_2$ | Li metal | $LiPF_6$ | 1.5 | 20 | 30 | 4.20 | ○ | 7.1 |
| Comparative Example 1-3 | $LiCoO_2$ | Li metal | $LiPF_6$ | 1.5 | 25 | 20 | 4.20 | ○ | 7.1 |
| Comparative Example 1-4 | $LiCoO_2$ | Li metal | $LiPF_6$ | 1.0 | 20 | 30 | 4.20 | ○ | 7.2 |
| Comparative Example 1-5 | $LiCoO_2$ | Li metal | $LiPF_6$ | 1.0 | 20 | 20 | 4.20 | ○ | 7.2 |
| Comparative Example 1-6 | $LiCoO_2$ | Li metal | $LiPF_6$ | 1.5 | 25 | 30 | 4.20 | ○ | 7.0 |
| Comparative Example 1-7 | $LiCoO_2$ | Li metal | $LiPF_6$ | 1.5 | 25 | 30 | 4.25 | X | 4.8 |

TABLE 2

| | cathode active material | anode active material | lithium salt | concentration of $Li_2CO_3$ + $Li_2SO_4$ (wt %) | concentration of protic impurities (ppm) | moisture content (ppm) | upper limit voltage (V) | coloration | discharge capacity (mAh) |
|---|---|---|---|---|---|---|---|---|---|
| Example 1-6 | $LiCoO_2$ | Li metal | $LiPF_6$ | 1.0 | 20 | 30 | 4.30 | ○ | 7.8 |
| Example 1-7 | $LiCoO_2$ | Li metal | $LiPF_6$ | 1.0 | 20 | 20 | 4.30 | ○ | 8.2 |
| Comparative Example 1-8 | $LiCoO_2$ | Li metal | $LiPF_6$ | 1.5 | 25 | 30 | 4.30 | x | 4.0 |

TABLE 3

| | cathode active material | anode active material | lithium salt | concentration of $Li_2CO_3$ + $Li_2SO_4$ (wt %) | concentration of protic impurities (ppm) | moisture content (ppm) | upper limit voltage (V) | coloration | discharge capacity (mAh) |
|---|---|---|---|---|---|---|---|---|---|
| Example 1-8 | $LiCoO_2$ | Li metal | $LiPF_6$ | 0.5 | 20 | 20 | 4.40 | ○ | 8.9 |
| Example 1-9 | $LiCoO_2$ | Li metal | $LiPF_6$ | 1.0 | 20 | 20 | 4.40 | ○ | 8.8 |

TABLE 3-continued

| | cathode active material | anode active material | lithium salt | concentration of Li$_2$CO$_3$ + Li$_2$SO$_4$ (wt %) | concentration of protic impurities (ppm) | moisture content (ppm) | upper limit voltage (V) | coloration | discharge capacity (mAh) |
|---|---|---|---|---|---|---|---|---|---|
| Example 1-10 | LiCoO$_2$ | Li metal | LiPF$_6$ | 1.0 | 20 | 30 | 4.40 | ○ | 8.4 |
| Comparative Example 1-9 | LiCoO$_2$ | Li metal | LiPF$_6$ | 1.5 | 25 | 30 | 4.40 | x | 4.0 |

TABLE 4

| | cathode active material | anode active material | lithium salt | concentration of Li$_2$CO$_3$ + Li$_2$SO$_4$ (wt %) | concentration of protic impurities (ppm) | moisture content (ppm) | upper limit voltage (V) | coloration | discharge capacity (mAh) |
|---|---|---|---|---|---|---|---|---|---|
| Example 2-1 | LiCoO$_2$ | non-graphitizable carbon | LiPF$_6$ | 1.0 | 25 | 30 | 4.25 | ○ | 7.0 |
| Example 2-2 | LiCoO$_2$ | non-graphitizable carbon | LiPF$_6$ | 1.5 | 20 | 30 | 4.25 | ○ | 7.1 |
| Example 2-3 | LiCoO$_2$ | non-graphitizable carbon | LiPF$_6$ | 1.5 | 25 | 20 | 4.25 | ○ | 7.1 |
| Example 2-4 | LiCoO$_2$ | non-graphitizable carbon | LiPF$_6$ | 1.0 | 20 | 30 | 4.25 | ○ | 7.2 |
| Example 2-5 | LiCoO$_2$ | non-graphitizable carbon | LiPF$_6$ | 1.0 | 20 | 20 | 4.25 | ○ | 7.3 |
| Comparative Example 2-1 | LiCoO$_2$ | non-graphitizable carbon | LiPF$_6$ | 1.0 | 25 | 30 | 4.20 | ○ | 6.7 |
| Comparative Example 2-2 | LiCoO$_2$ | non-graphitizable carbon | LiPF$_6$ | 1.5 | 20 | 30 | 4.20 | ○ | 6.9 |
| Comparative Example 2-3 | LiCoO$_2$ | non-graphitizable carbon | LiPF$_6$ | 1.5 | 25 | 20 | 4.20 | ○ | 6.9 |
| Comparative Example 2-4 | LiCoO$_2$ | non-graphitizable carbon | LiPF$_6$ | 1.0 | 20 | 30 | 4.20 | ○ | 7.0 |
| Comparative Example 2-5 | LiCoO$_2$ | non-graphitizable carbon | LiPF$_6$ | 1.0 | 20 | 20 | 4.20 | ○ | 7.1 |
| Comparative Example 2-6 | LiCoO$_2$ | non-graphitizable carbon | LiPF$_6$ | 1.5 | 25 | 30 | 4.20 | ○ | 6.7 |
| Comparative Example 2-7 | LiCoO$_2$ | non-graphitizable carbon | LiPF$_6$ | 1.5 | 25 | 30 | 4.25 | x | 4.9 |

TABLE 5

| | cathode active material | anode active material | lithium salt | concentration of Li$_2$CO$_3$ + Li$_2$SO$_4$ (wt %) | concentration of protic impurities (ppm) | moisture content (ppm) | upper limit voltage (V) | coloration | discharge capacity (mAh) |
|---|---|---|---|---|---|---|---|---|---|
| Example 2-6 | LiCoO$_2$ | non-graphitizable carbon | LiPF$_6$ | 1.0 | 20 | 30 | 4.30 | ○ | 7.5 |
| Example 2-7 | LiCoO$_2$ | non-graphitizable carbon | LiPF$_6$ | 1.0 | 20 | 20 | 4.30 | ○ | 7.8 |
| Comparative Example 2-8 | LiCoO$_2$ | non-graphitizable carbon | LiPF$_6$ | 1.5 | 25 | 30 | 4.30 | X | 4.5 |

TABLE 6

| | cathode active material | anode active material | lithium salt | concentration of Li$_2$CO$_3$ + Li$_2$SO$_4$ (wt %) | concentration of protic impurities (ppm) | moisture content (ppm) | upper limit voltage (V) | coloration | discharge capacity (mAh) |
|---|---|---|---|---|---|---|---|---|---|
| Example 2-8 | LiCoO$_2$ | non-graphitizable carbon | LiPF$_6$ | 0.5 | 20 | 20 | 4.40 | ○ | 8.3 |
| Example 2-9 | LiCoO$_2$ | non-graphitizable carbon | LiPF$_6$ | 1.0 | 20 | 20 | 4.40 | ○ | 8.2 |
| Example 2-10 | LiCoO$_2$ | non-graphitizable carbon | LiPF$_6$ | 1.0 | 20 | 30 | 4.40 | ○ | 7.9 |
| Comparative Example 2-9 | LiCoO$_2$ | non-graphitizable carbon | LiPF$_6$ | 1.5 | 25 | 30 | 4.40 | x | 4.0 |

TABLE 7

| | cathode active material | anode active material | lithium salt | concentration of $Li_2CO_3$ + $Li_2SO_4$ (wt %) | concentration of protic impurities (ppm) | moisture content (ppm) | upper limit voltage (V) | coloration | discharge capacity (mAh) |
|---|---|---|---|---|---|---|---|---|---|
| Example 3-1 | $LiCoO_2$ | Cu—Sn | $LiPF_6$ | 1 | 25 | 30 | 4.25 | ○ | 7.5 |
| Example 3-2 | $LiCoO_2$ | Cu—Sn | $LiPF_6$ | 1.5 | 20 | 30 | 4.25 | ○ | 7.6 |
| Example 3-3 | $LiCoO_2$ | Cu—Sn | $LiPF_6$ | 1.5 | 25 | 20 | 4.25 | ○ | 7.7 |
| Example 3-4 | $LiCoO_2$ | Cu—Sn | $LiPF_6$ | 1.0 | 20 | 30 | 4.25 | ○ | 7.9 |
| Example 3-5 | $LiCoO_2$ | Cu—Sn | $LiPF_6$ | 1.0 | 20 | 20 | 4.25 | ○ | 8.0 |
| Comparative Example 3-1 | $LiCoO_2$ | Cu—Sn | $LiPF_6$ | 1.0 | 25 | 30 | 4.20 | ○ | 7.1 |
| Comparative Example 3-2 | $LiCoO_2$ | Cu—Sn | $LiPF_6$ | 1.5 | 20 | 30 | 4.20 | ○ | 7.2 |
| Comparative Example 3-3 | $LiCoO_2$ | Cu—Sn | $LiPF_6$ | 1.5 | 25 | 20 | 4.20 | ○ | 7.2 |
| Comparative Example 3-4 | $LiCoO_2$ | Cu—Sn | $LiPF_6$ | 1.0 | 20 | 30 | 4.20 | ○ | 7.4 |
| Comparative Example 3-5 | $LiCoO_2$ | Cu—Sn | $LiPF_6$ | 1.0 | 20 | 20 | 4.20 | ○ | 7.4 |
| Comparative Example 3-6 | $LiCoO_2$ | Cu—Sn | $LiPF_6$ | 1.5 | 25 | 30 | 4.20 | ○ | 7.1 |
| Comparative Example 3-7 | $LiCoO_2$ | Cu—Sn | $LiPF_6$ | 1.5 | 25 | 30 | 4.25 | x | 4.8 |

TABLE 8

| | cathode active material | anode active material | lithium salt | concentration of $Li_2CO_3$ + $Li_2SO_4$ (wt %) | concentration of protic impurities (ppm) | moisture content (ppm) | upper limit voltage (V) | coloration | discharge capacity (mAh) |
|---|---|---|---|---|---|---|---|---|---|
| Example 3-6 | $LiCoO_2$ | Cu—Sn | $LiPF_6$ | 1.0 | 20 | 30 | 4.30 | ○ | 8.2 |
| Example 3-7 | $LiCoO_2$ | Cu—Sn | $LiPF_6$ | 1.0 | 20 | 20 | 4.30 | ○ | 8.4 |
| Comparative Example 3-8 | $LiCoO_2$ | Cu—Sn | $LiPF_6$ | 1.5 | 25 | 30 | 4.30 | x | 4.2 |

TABLE 9

| | cathode active material | anode active material | lithium salt | concentration of $Li_2CO_3$ + $Li_2SO_4$ (wt %) | concentration of protic impurities (ppm) | moisture content (ppm) | upper limit voltage (V) | coloration | discharge capacity (mAh) |
|---|---|---|---|---|---|---|---|---|---|
| Example 3-8 | $LiCoO_2$ | Cu—Sn | $LiPF_6$ | 0.5 | 20 | 20 | 4.40 | ○ | 8.5 |
| Example 3-9 | $LiCoO_2$ | Cu—Sn | $LiPF_6$ | 1.0 | 20 | 20 | 4.40 | ○ | 8.5 |
| Example 3-10 | $LiCoO_2$ | Cu—Sn | $LiPF_6$ | 1.0 | 20 | 30 | 4.40 | ○ | 8.2 |
| Comparative Example 3-9 | $LiCoO_2$ | Cu—Sn | $LiPF_6$ | 1.5 | 25 | 30 | 4.40 | x | 4.0 |

TABLE 10

| | cathode active material | anode active material | lithium salt | concentration of $Li_2CO_3$ + $Li_2SO_4$ (wt %) | concentration of protic impurities (ppm) | moisture content (ppm) | upper limit voltage (V) | coloration | discharge capacity (mAh) |
|---|---|---|---|---|---|---|---|---|---|
| Example 4-1 | $LiNiO_2$ | Cu—Sn | $LiPF_6$ | 1 | 25 | 30 | 4.25 | ○ | 8.2 |
| Example 4-2 | $LiNiO_2$ | Cu—Sn | $LiPF_6$ | 1.5 | 20 | 30 | 4.25 | ○ | 8.3 |
| Example 4-3 | $LiNiO_2$ | Cu—Sn | $LiPF_6$ | 1.5 | 25 | 20 | 4.25 | ○ | 8.4 |
| Example 4-4 | $LiNiO_2$ | Cu—Sn | $LiPF_6$ | 1 | 20 | 30 | 4.25 | ○ | 8.6 |
| Example 4-5 | $LiNiO_2$ | Cu—Sn | $LiPF_6$ | 1 | 20 | 20 | 4.25 | ○ | 8.7 |
| Comparative Example 4-1 | $LiNiO_2$ | Cu—Sn | $LiPF_6$ | 1 | 25 | 30 | 4.2 | ○ | 7.8 |
| Comparative Example 4-2 | $LiNiO_2$ | Cu—Sn | $LiPF_6$ | 1.5 | 20 | 30 | 4.2 | ○ | 8.0 |
| Comparative Example 4-3 | $LiNiO_2$ | Cu—Sn | $LiPF_6$ | 1.5 | 25 | 20 | 4.2 | ○ | 8.0 |
| Comparative Example 4-4 | $LiNiO_2$ | Cu—Sn | $LiPF_6$ | 1 | 20 | 30 | 4.2 | ○ | 8.1 |

TABLE 10-continued

|  | cathode active material | anode active material | lithium salt | concentration of Li$_2$CO$_3$ + Li$_2$SO$_4$ (wt %) | concentration of protic impurities (ppm) | moisture content (ppm) | upper limit voltage (V) | coloration | discharge capacity (mAh) |
| --- | --- | --- | --- | --- | --- | --- | --- | --- | --- |
| Comparative Example 4-5 | LiNiO$_2$ | Cu—Sn | LiPF$_6$ | 1 | 20 | 20 | 4.2 | ○ | 8.1 |
| Comparative Example 4-6 | LiNiO$_2$ | Cu—Sn | LiPF$_6$ | 1.5 | 25 | 30 | 4.2 | ○ | 7.8 |
| Comparative Example 4-7 | LiNiO$_2$ | Cu—Sn | LiPF$_6$ | 1.5 | 25 | 30 | 4.25 | x | 5.0 |

TABLE 11

|  | cathode active material | anode active material | lithium salt | concentration of Li$_2$CO$_3$ + Li$_2$SO$_4$ (wt %) | concentration of protic impurities (ppm) | moisture content (ppm) | upper limit voltage (V) | coloration | discharge capacity (mAh) |
| --- | --- | --- | --- | --- | --- | --- | --- | --- | --- |
| Example 4-6 | LiNiO$_2$ | Cu—Sn | LiPF$_6$ | 1 | 20 | 30 | 4.3 | ○ | 8.7 |
| Example 4-7 | LiNiO$_2$ | Cu—Sn | LiPF$_6$ | 1 | 20 | 20 | 4.3 | ○ | 8.8 |
| Comparative Example 4-8 | LiNiO$_2$ | Cu—Sn | LiPF$_6$ | 1.5 | 25 | 30 | 4.3 | x | 4.4 |

TABLE 12

|  | cathode active material | anode active material | lithium salt | concentration of Li$_2$CO$_3$ + Li$_2$SO$_4$ (wt %) | concentration of protic impurities (ppm) | moisture content (ppm) | upper limit voltage (V) | coloration | discharge capacity (mAh) |
| --- | --- | --- | --- | --- | --- | --- | --- | --- | --- |
| Example 4-8 | LiNiO$_2$ | Cu—Sn | LiPF$_6$ | 0.5 | 20 | 20 | 4.4 | ○ | 8.9 |
| Example 4-9 | LiNiO$_2$ | Cu—Sn | LiPF$_6$ | 1 | 20 | 20 | 4.4 | ○ | 8.9 |
| Example 4-10 | LiNiO$_2$ | Cu—Sn | LiPF$_6$ | 1 | 20 | 30 | 4.4 | ○ | 8.8 |

TABLE 13

|  | cathode active material | anode active material | lithium salt | concentration of Li$_2$CO$_3$ + Li$_2$SO$_4$ (wt %) | concentration of protic impurities (ppm) | moisture content (ppm) | upper limit voltage (V) | coloration | discharge capacity (mAh) |
| --- | --- | --- | --- | --- | --- | --- | --- | --- | --- |
| Example 5-1 | LiCoO$_2$ | Li metal | LiPF$_6$ LiBF$_4$ | 1.0 | 25 | 30 | 4.25 | ○ | 7.2 |
| Example 5-2 | LiCoO$_2$ | Li metal | LiPF$_6$ LiBF$_4$ | 1.5 | 20 | 30 | 4.25 | ○ | 7.6 |
| Example 5-3 | LiCoO$_2$ | Li metal | LiPF$_6$ LiBF$_4$ | 1.5 | 25 | 20 | 4.25 | ○ | 7.5 |
| Example 5-4 | LiCoO$_2$ | Li metal | LiPF$_6$ LiBF$_4$ | 1.0 | 20 | 20 | 4.25 | ○ | 7.7 |
| Comparative Example 5-1 | LiCoO$_2$ | Li metal | LiPF$_6$ LiBF$_4$ | 1.0 | 25 | 30 | 4.20 | ○ | 7.1 |
| Comparative Example 5-2 | LiCoO$_2$ | Li metal | LiPF$_6$ LiBF$_4$ | 1.5 | 20 | 30 | 4.20 | ○ | 7.1 |
| Comparative Example 5-3 | LiCoO$_2$ | Li metal | LiPF$_6$ LiBF$_4$ | 1.5 | 25 | 20 | 4.20 | ○ | 7.1 |
| Comparative Example 5-4 | LiCoO$_2$ | Li metal | LiPF$_6$ LiBF$_4$ | 1.0 | 20 | 20 | 4.20 | ○ | 7.2 |
| Comparative Example 5-5 | LiCoO$_2$ | Li metal | LiPF$_6$ LiBF$_4$ | 1.5 | 25 | 30 | 4.20 | ○ | 7.1 |
| Comparative Example 5-6 | LiCoO$_2$ | Li metal | LiPF$_6$ LiBF$_4$ | 1.5 | 25 | 30 | 4.25 | Δ | 6.8 |

TABLE 14

| | cathode active material | anode active material | lithium salt | concentration of Li$_2$CO$_3$ + Li$_2$SO$_4$ (wt %) | concentration of protic impurities (ppm) | moisture content (ppm) | upper limit voltage (V) | coloration | discharge capacity (mAh) |
|---|---|---|---|---|---|---|---|---|---|
| Example 5-5 | LiCoO$_2$ | Li metal | LiPF$_6$ LiBF$_4$ | 1.0 | 20 | 20 | 4.30 | ○ | 8.0 |
| Comparative Example 5-7 | LiCoO$_2$ | Li metal | LiPF$_6$ LiBF$_4$ | 1.5 | 25 | 30 | 4.30 | x | 4.3 |

TABLE 15

| | cathode active material | anode active material | lithium salt | concentration of Li$_2$CO$_3$ + Li$_2$SO$_4$ (wt %) | concentration of protic impurities (ppm) | moisture content (ppm) | upper limit voltage (V) | coloration | discharge capacity (mAh) |
|---|---|---|---|---|---|---|---|---|---|
| Example 5-6 | LiCoO$_2$ | Li metal | LiPF$_6$ LiBF$_4$ | 1.0 | 20 | 20 | 4.40 | ○ | 8.7 |
| Comparative Example 5-8 | LiCoO$_2$ | Li metal | LiPF$_6$ LiBF$_4$ | 1.5 | 25 | 30 | 4.40 | x | 4.5 |

TABLE 16

| | cathode active material | anode active material | lithium salt | concentration of Li$_2$CO$_3$ + Li$_2$SO$_4$ (wt %) | concentration of protic impurities (ppm) | moisture content (ppm) | upper limit voltage (V) | coloration | discharge capacity (mAh) |
|---|---|---|---|---|---|---|---|---|---|
| Example 5-7 | LiCoO$_2$ | Li metal | LiPF$_6$ LiClO$_4$ | 1.0 | 25 | 30 | 4.25 | ○ | 7.5 |
| Example 5-8 | LiCoO$_2$ | Li metal | LiPF$_6$ LiClO$_4$ | 1.5 | 20 | 30 | 4.25 | ○ | 7.8 |
| Example 5-9 | LiCoO$_2$ | Li metal | LiPF$_6$ LiClO$_4$ | 1.0 | 25 | 20 | 4.25 | ○ | 7.6 |
| Example 5-10 | LiCoO$_2$ | Li metal | LiPF$_6$ LiClO$_4$ | 1.0 | 20 | 20 | 4.25 | ○ | 7.9 |
| Comparative Example 5-9 | LiCoO$_2$ | Li metal | LiPF$_6$ LiClO$_4$ | 1.0 | 25 | 30 | 4.20 | ○ | 7.2 |
| Comparative Example 5-10 | LiCoO$_2$ | Li metal | LiPF$_6$ LiClO$_4$ | 1.5 | 20 | 30 | 4.20 | ○ | 7.2 |
| Comparative Example 5-11 | LiCoO$_2$ | Li metal | LiPF$_6$ LiClO$_4$ | 1.0 | 25 | 20 | 4.20 | ○ | 7.2 |
| Comparative Example 5-12 | LiCoO$_2$ | Li metal | LiPF$_6$ LiClO$_4$ | 1.0 | 20 | 20 | 4.20 | ○ | 7.4 |
| Comparative Example 5-13 | LiCoO$_2$ | Li metal | LiPF$_6$ LiClO$_4$ | 1.5 | 25 | 30 | 4.20 | ○ | 7.1 |
| Comparative Example 5-14 | LiCoO$_2$ | Li metal | LiPF$_6$ LiClO$_4$ | 1.5 | 25 | 30 | 4.25 | x | 5.4 |

TABLE 17

| | cathode active material | anode active material | lithium salt | concentration of Li$_2$CO$_3$ + Li$_2$SO$_4$ (wt %) | concentration of protic impurities (ppm) | moisture content (ppm) | upper limit voltage (V) | coloration | discharge capacity (mAh) |
|---|---|---|---|---|---|---|---|---|---|
| Example 5-11 | LiCoO$_2$ | Li metal | LiPF$_6$ LiClO$_4$ | 1.0 | 20 | 20 | 4.30 | ○ | 8.1 |
| Comparative Example 5-15 | LiCoO$_2$ | Li metal | LiPF$_6$ LiClO$_4$ | 1.5 | 25 | 30 | 4.30 | x | 5.0 |

TABLE 18

| | cathode active material | anode active material | lithium salt | concentration of $Li_2CO_3$ + $Li_2SO_4$ (wt %) | concentration of protic impurities (ppm) | moisture content (ppm) | upper limit voltage (V) | coloration | discharge capacity (mAh) |
|---|---|---|---|---|---|---|---|---|---|
| Example 5-12 | $LiCoO_2$ | Li metal | $LiPF_6$ $LiClO_4$ | 1.0 | 20 | 20 | 4.40 | ○ | 8.7 |
| Comparative Example 5-16 | $LiCoO_2$ | Li metal | $LiPF_6$ $LiClO_4$ | 1.5 | 25 | 30 | 4.40 | x | 4.4 |

TABLE 19

| | cathode active material | anode active material | lithium salt | concentration of $Li_2CO_3$ + $Li_2SO_4$ (wt %) | concentration of protic impurities (ppm) | moisture content (ppm) | upper limit voltage (V) | coloration | discharge capacity (mAh) |
|---|---|---|---|---|---|---|---|---|---|
| Example 5-13 | $LiCoO_2$ | Li metal | $LiPF_6$ $LiN(CF_3SO_2)_2$ | 1.0 | 25 | 30 | 4.25 | ○ | 7.8 |
| Example 5-14 | $LiCoO_2$ | Li metal | $LiPF_6$ $LiN(CF_3SO_2)_2$ | 1.5 | 20 | 30 | 4.25 | ○ | 7.9 |
| Example 5-15 | $LiCoO_2$ | Li metal | $LiPF_6$ $LiN(CF_3SO_2)_2$ | 1.0 | 25 | 20 | 4.25 | ○ | 8.0 |
| Example 5-16 | $LiCoO_2$ | Li metal | $LiPF_6$ $LiN(CF_3SO_2)_2$ | 1.0 | 20 | 20 | 4.25 | ○ | 8.1 |
| Comparative Example 5-17 | $LiCoO_2$ | Li metal | $LiPF_6$ $LiN(CF_3SO_2)_2$ | 1.0 | 25 | 30 | 4.20 | ○ | 7.5 |
| Comparative Example 5-18 | $LiCoO_2$ | Li metal | $LiPF_6$ $LiN(CF_3SO_2)_2$ | 1.5 | 20 | 30 | 4.20 | ○ | 7.5 |
| Comparative Example 5-19 | $LiCoO_2$ | Li metal | $LiPF_6$ $LiN(CF_3SO_2)_2$ | 1.0 | 25 | 20 | 4.20 | ○ | 7.5 |
| Comparative Example 5-20 | $LiCoO_2$ | Li metal | $LiPF_6$ $LiN(CF_3SO_2)_2$ | 1.0 | 20 | 20 | 4.20 | ○ | 7.6 |
| Comparative Example 5-21 | $LiCoO_2$ | Li metal | $LiPF_6$ $LiN(CF_3SO_2)_2$ | 1.5 | 25 | 30 | 4.20 | ○ | 7.4 |
| Comparative Example 5-22 | $LiCoO_2$ | Li metal | $LiPF_6$ $LiN(CF_3SO_2)_2$ | 1.5 | 25 | 30 | 4.25 | Δ | 6.9 |

TABLE 20

| | cathode active material | anode active material | lithium salt | concentration of $Li_2CO_3$ + $Li_2SO_4$ (wt %) | concentration of protic impurities (ppm) | moisture content (ppm) | upper limit voltage (V) | coloration | discharge capacity (mAh) |
|---|---|---|---|---|---|---|---|---|---|
| Example 5-17 | $LiCoO_2$ | Li metal | $LiPF_6$ $LiN(CF_3SO_2)_2$ | 1.0 | 20 | 20 | 4.30 | ○ | 8.6 |
| Comparative Example 5-23 | $LiCoO_2$ | Li metal | $LiPF_6$ $LiN(CF_3SO_2)_2$ | 1.5 | 25 | 30 | 4.30 | x | 5.6 |

TABLE 21

| | cathode active material | anode active material | lithium salt | concentration of $Li_2CO_3$ + $Li_2SO_4$ (wt %) | concentration of protic impurities (ppm) | moisture content (ppm) | upper limit voltage (V) | coloration | discharge capacity (mAh) |
|---|---|---|---|---|---|---|---|---|---|
| Example 5-18 | $LiCoO_2$ | Li metal | $LiPF_6$ $LiN(CF_3SO_2)_2$ | 1.0 | 20 | 20 | 4.40 | ○ | 8.8 |
| Comparative Example 5-24 | $LiCoO_2$ | Li metal | $LiPF_6$ $LiN(CF_3SO_2)_2$ | 1.5 | 25 | 30 | 4.40 | x | 5.3 |

TABLE 22

| | cathode active material | anode active material | lithium salt | concentration of $Li_2CO_3$ + $Li_2SO_4$ (wt %) | concentration of protic impurities (ppm) | moisture content (ppm) | upper limit voltage (V) | coloration | discharge capacity (mAh) |
|---|---|---|---|---|---|---|---|---|---|
| Example 5-19 | $LiCoO_2$ | Li metal | $LiPF_6$ $LiN(C_2F_5O_2)_2$ | 1.0 | 25 | 30 | 4.25 | ○ | 7.7 |
| Example 5-20 | $LiCoO_2$ | Li metal | $LiPF_6$ $LiN(C_2F_5O_2)_2$ | 1.5 | 20 | 30 | 4.25 | ○ | 7.8 |
| Example 5-21 | $LiCoO_2$ | Li metal | $LiPF_6$ $LiN(C_2F_5O_2)_2$ | 1.0 | 25 | 20 | 4.25 | ○ | 7.9 |
| Example 5-22 | $LiCoO_2$ | Li metal | $LiPF_6$ $LiN(C_2F_5O_2)_2$ | 1.0 | 20 | 20 | 4.25 | ○ | 7.9 |
| Comparative Example 5-25 | $LiCoO_2$ | Li metal | $LiPF_6$ $LiN(C_2F_5O_2)_2$ | 1.0 | 25 | 30 | 4.20 | ○ | 7.2 |
| Comparative Example 5-26 | $LiCoO_2$ | Li metal | $LiPF_6$ $LiN(C_2F_5O_2)_2$ | 1.5 | 20 | 30 | 4.20 | ○ | 7.3 |
| Comparative Example 5-27 | $LiCoO_2$ | Li metal | $LiPF_6$ $LiN(C_2F_5O_2)_2$ | 1.0 | 25 | 20 | 4.20 | ○ | 7.3 |
| Comparative Example 5-28 | $LiCoO_2$ | Li metal | $LiPF_6$ $LiN(C_2F_5O_2)_2$ | 1.0 | 20 | 20 | 4.20 | ○ | 7.3 |
| Comparative Example 5-29 | $LiCoO_2$ | Li metal | $LiPF_6$ $LiN(C_2F_5O_2)_2$ | 1.5 | 25 | 30 | 4.20 | ○ | 7.2 |
| Comparative Example 5-30 | $LiCoO_2$ | Li metal | $LiPF_6$ $LiN(C_2F_5O_2)_2$ | 1.5 | 25 | 30 | 4.25 | Δ | 6.4 |

TABLE 23

| | cathode active material | anode active material | lithium salt | concentration of $Li_2CO_3$ + $Li_2SO_4$ (wt %) | concentration of protic impurities (ppm) | moisture content (ppm) | upper limit voltage (V) | coloration | discharge capacity (mAh) |
|---|---|---|---|---|---|---|---|---|---|
| Example 5-23 | $LiCoO_2$ | Li metal | $LiPF_6$ $LiN(C_2F_5O_2)_2$ | 1.0 | 20 | 20 | 4.30 | ○ | 8.3 |
| Comparative Example 5-31 | $LiCoO_2$ | Li metal | $LiPF_6$ $LiN(C_2F_5O_2)_2$ | 1.5 | 25 | 30 | 4.30 | x | 5.0 |

TABLE 24

| | cathode active material | anode active material | lithium salt | concentration of $Li_2CO_3$ + $Li_2SO_4$ (wt %) | concentration of protic impurities (ppm) | moisture content (ppm) | upper limit voltage (V) | coloration | discharge capacity (mAh) |
|---|---|---|---|---|---|---|---|---|---|
| Example 5-24 | $LiCoO_2$ | Li metal | $LiPF_6$ $LiN(C_2F_5O_2)_2$ | 1.0 | 20 | 20 | 4.40 | ○ | 8.9 |
| Comparative Example 5-32 | $LiCoO_2$ | Li metal | $LiPF_6$ $LiN(C_2F_5O_2)_2$ | 1.5 | 25 | 30 | 4.40 | x | 5.9 |

TABLE 25

| | nonaqueous solvent | concentration of $Li_2CO_3$ + $Li_2SO_4$ (wt %) | concentration of protic impurities (ppm) | moisture content (ppm) | upper limit voltage (V) | discharge capacity (mAh) |
|---|---|---|---|---|---|---|
| Example 6-1 | DMC | 1.0 | 25 | 30 | 4.25 | 6.0 |
| Example 6-2 | DMC | 1.5 | 20 | 30 | 4.25 | 6.0 |
| Example 6-3 | DMC | 1.5 | 25 | 20 | 4.25 | 6.0 |
| Example 6-4 | DMC | 1.0 | 20 | 30 | 4.25 | 6.1 |
| Example 6-5 | DMC | 1.0 | 20 | 20 | 4.25 | 6.2 |
| Comparative Example 6-1 | DMC | 1.0 | 20 | 20 | 4.20 | 5.8 |
| Comparative Example 6-2 | DMC | 1.5 | 25 | 30 | 4.20 | 5.7 |
| Comparative Example 6-3 | DMC | 1.5 | 25 | 30 | 4.25 | 3.7 |

TABLE 26

|  | nonaqueous solvent | concentration of Li$_2$CO$_3$ + Li$_2$SO$_4$ (wt %) | concentration of protic impurities (ppm) | moisture content (ppm) | upper limit voltage (V) | discharge capacity (mAh) |
| --- | --- | --- | --- | --- | --- | --- |
| Example 6-6 | DMC | 1.0 | 25 | 30 | 4.30 | 6.2 |
| Example 6-7 | DMC | 1.5 | 20 | 30 | 4.30 | 6.3 |
| Example 6-8 | DMC | 1.5 | 25 | 20 | 4.30 | 6.2 |
| Example 6-9 | DMC | 1.0 | 20 | 30 | 4.30 | 6.4 |
| Example 6-10 | DMC | 1.0 | 20 | 20 | 4.30 | 6.5 |
| Comparative Example 6-4 | DMC | 1.5 | 25 | 30 | 4.30 | 3.9 |

TABLE 27

|  | nonaqueous solvent | concentration of Li$_2$CO$_3$ + Li$_2$SO$_4$ (wt %) | concentration of protic impurities (ppm) | moisture content (ppm) | upper limit voltage (V) | discharge capacity (mAh) |
| --- | --- | --- | --- | --- | --- | --- |
| Example 6-11 | EC:PC (50:50) | 1.0 | 25 | 30 | 4.25 | 7.0 |
| Example 6-12 | EC:PC (50:50) | 1.5 | 20 | 30 | 4.25 | 7.0 |
| Example 6-13 | EC:PC (50:50) | 1.5 | 25 | 20 | 4.25 | 7.0 |
| Example 6-14 | EC:PC (50:50) | 1.0 | 20 | 30 | 4.25 | 7.1 |
| Example 6-15 | EC:PC (50:50) | 1.0 | 20 | 20 | 4.25 | 7.1 |
| Comparative Example 6-5 | EC:PC (50:50) | 1.0 | 20 | 20 | 4.20 | 6.9 |
| Comparative Example 6-6 | EC:PC (50:50) | 1.5 | 25 | 30 | 4.20 | 6.8 |
| Comparative Example 6-7 | EC:PC (50:50) | 1.5 | 25 | 30 | 4.25 | 4.3 |

TABLE 28

|  | nonaqueous solvent | concentration of Li$_2$CO$_3$ + Li$_2$SO$_4$ (wt %) | concentration of protic impurities (ppm) | moisture content (ppm) | upper limit voltage (V) | discharge capacity (mAh) |
| --- | --- | --- | --- | --- | --- | --- |
| Example 6-16 | EC:PC (50:50) | 1.0 | 25 | 30 | 4.30 | 7.2 |
| Example 6-17 | EC:PC (50:50) | 1.5 | 20 | 30 | 4.30 | 7.2 |
| Example 6-18 | EC:PC (50:50) | 1.5 | 25 | 20 | 4.30 | 7.2 |
| Example 6-19 | EC:PC (50:50) | 1.0 | 20 | 30 | 4.30 | 7.3 |
| Example 6-20 | EC:PC (50:50) | 1.0 | 20 | 20 | 4.30 | 7.4 |
| Comparative Example 6-8 | EC:PC (50:50) | 1.5 | 25 | 30 | 4.30 | 4.0 |

TABLE 29

|  | nonaqueous solvent | Concentration of Li$_2$CO$_3$ + Li$_2$SO$_4$ (wt %) | concentration of protic impurities (ppm) | moisture content (ppm) | upper limit voltage (V) | discharge capacity (mAh) |
| --- | --- | --- | --- | --- | --- | --- |
| Example 6-21 | EC:PC (50:50) | 1.0 | 25 | 30 | 4.40 | 7.4 |
| Example 6-22 | EC:PC (50:50) | 1.5 | 20 | 30 | 4.40 | 7.4 |
| Example 6-23 | EC:PC (50:50) | 1.5 | 25 | 20 | 4.40 | 7.4 |
| Example 6-24 | EC:PC (50:50) | 1.0 | 20 | 30 | 4.40 | 7.5 |
| Example 6-25 | EC:PC (50:50) | 1.0 | 20 | 20 | 4.40 | 7.6 |
| Comparative Example 6-9 | EC:PC (50:50) | 1.5 | 25 | 30 | 4.40 | 4.0 |

TABLE 30

|  | nonaqueous solvent | concentration of Li$_2$CO$_3$ + Li$_2$SO$_4$ (wt %) | concentration of protic impurities (ppm) | moisture content (ppm) | upper limit voltage (V) | discharge capacity (mAh) |
| --- | --- | --- | --- | --- | --- | --- |
| Example 6-26 | EC:PC (200/3:100/3) | 1.0 | 25 | 30 | 4.25 | 7.1 |
| Example 6-27 | EC:PC (200/3:100/3) | 1.5 | 20 | 30 | 4.25 | 7.0 |
| Example 6-28 | EC:PC (200/3:100/3) | 1.5 | 25 | 20 | 4.25 | 7.0 |
| Example 6-29 | EC:PC (200/3:100/3) | 1.0 | 20 | 30 | 4.25 | 7.1 |
| Example 6-30 | EC:PC (200/3:100/3) | 1.0 | 20 | 20 | 4.25 | 7.1 |
| Comparative Example 6-10 | EC:PC (200/3:100/3) | 1.0 | 20 | 20 | 4.20 | 6.9 |

TABLE 30-continued

|  | nonaqueous solvent | concentration of Li$_2$CO$_3$ + Li$_2$SO$_4$ (wt %) | concentration of protic impurities (ppm) | moisture content (ppm) | upper limit voltage (V) | discharge capacity (mAh) |
| --- | --- | --- | --- | --- | --- | --- |
| Comparative Example 6-11 | EC:PC (200/3:100/3) | 1.5 | 25 | 30 | 4.20 | 6.7 |
| Comparative Example 6-12 | EC:PC (200/3:100/3) | 1.5 | 25 | 30 | 4.25 | 4.2 |

TABLE 31

|  | nonaqueous solvent | concentration of Li$_2$CO$_3$ + Li$_2$SO$_4$ (wt %) | concentration of protic impurities (ppm) | moisture content (ppm) | upper limit voltage (V) | discharge capacity (mAh) |
| --- | --- | --- | --- | --- | --- | --- |
| Example 6-31 | EC:PC (200/3:100/3) | 1.0 | 25 | 30 | 4.30 | 7.2 |
| Example 6-32 | EC:PC (200/3:100/3) | 1.5 | 20 | 30 | 4.30 | 7.2 |
| Example 6-33 | EC:PC (200/3:100/3) | 1.5 | 25 | 20 | 4.30 | 7.2 |
| Example 6-34 | EC:PC (200/3:100/3) | 1.0 | 20 | 30 | 4.30 | 7.3 |
| Example 6-35 | EC:PC (200/3:100/3) | 1.0 | 20 | 20 | 4.30 | 7.4 |
| Comparative Example 6-13 | EC:PC (200/3:100/3) | 1.5 | 25 | 30 | 4.30 | 4.0 |

TABLE 32

|  | nonaqueous solvent | Concentration of Li2CO$_3$ + Li2SO$_4$ (wt %) | concentration of protic impurities (ppm) | moisture content (ppm) | upper limit voltage (V) | discharge capacity (mAh) |
| --- | --- | --- | --- | --- | --- | --- |
| Example 6-36 | EC:PC (200/3:100/3) | 1.0 | 25 | 30 | 4.40 | 7.5 |
| Example 6-37 | EC:PC (200/3:100/3) | 1.5 | 20 | 30 | 4.40 | 7.4 |
| Example 6-38 | EC:PC (200/3:100/3) | 1.5 | 25 | 20 | 4.40 | 7.4 |
| Example 6-39 | EC:PC (200/3:100/3) | 1.0 | 20 | 30 | 4.40 | 7.5 |
| Example 6-40 | EC:PC (200/3:100/3) | 1.0 | 20 | 20 | 4.40 | 7.7 |
| Comparative Example 6-14 | EC:PC (200/3:100/3) | 1.5 | 25 | 30 | 4.40 | 3.8 |

TABLE 33

|  | nonaqueous solvent | concentration of Li$_2$CO$_3$ + Li$_2$SO$_4$ (wt %) | concentration of protic impurities (ppm) | moisture content (ppm) | upper limit voltage (V) | discharge capacity (mAh) |
| --- | --- | --- | --- | --- | --- | --- |
| Example 6-41 | EC:DMC (50:50) | 1.0 | 25 | 30 | 4.25 | 7.2 |
| Example 6-42 | EC:DMC (50:50) | 1.5 | 20 | 30 | 4.25 | 7.2 |
| Example 6-43 | EC:DMC (50:50) | 1.5 | 25 | 20 | 4.25 | 7.2 |
| Example 6-44 | EC:DMC (50:50) | 1.0 | 20 | 30 | 4.25 | 7.2 |
| Example 6-45 | EC:DMC (50:50) | 1.0 | 20 | 20 | 4.25 | 7.3 |
| Comparative Example 6-15 | EC:DMC (50:50) | 1.0 | 20 | 20 | 4.20 | 7.0 |
| Comparative Example 6-16 | EC:DMC (50:50) | 1.5 | 25 | 30 | 4.20 | 6.9 |
| Comparative Example 6-17 | EC:DMC (50:50) | 1.5 | 25 | 30 | 4.25 | 4.5 |

TABLE 34

|  | nonaqueous solvent | concentration of Li$_2$CO$_3$ + Li$_2$SO$_4$ (wt %) | concentration of protic impurities (ppm) | moisture content (ppm) | upper limit voltage (V) | discharge capacity (mAh) |
| --- | --- | --- | --- | --- | --- | --- |
| Example 6-46 | EC:DMC (50:50) | 1.0 | 25 | 30 | 4.30 | 7.4 |
| Example 6-47 | EC:DMC (50:50) | 1.5 | 20 | 30 | 4.30 | 7.4 |
| Example 6-48 | EC:DMC (50:50) | 1.5 | 25 | 20 | 4.30 | 7.4 |
| Example 6-49 | EC:DMC (50:50) | 1.0 | 20 | 30 | 4.30 | 7.5 |
| Example 6-50 | EC:DMC (50:50) | 1.0 | 20 | 20 | 4.30 | 7.6 |
| Comparative Example 6-18 | EC:DMC (50:50) | 1.5 | 25 | 30 | 4.30 | 4.0 |

TABLE 35

| | nonaqueous solvent | concentration of $Li_2CO_3 + Li_2SO_4$ (wt %) | concentration of protic impurities (ppm) | moisture content (ppm) | upper limit voltage (V) | discharge capacity (mAh) |
|---|---|---|---|---|---|---|
| Example 6-51 | EC:DMC (50:50) | 1.0 | 25 | 30 | 4.40 | 7.6 |
| Example 6-52 | EC:DMC (50:50) | 1.5 | 20 | 30 | 4.40 | 7.6 |
| Example 6-53 | EC:DMC (50:50) | 1.5 | 25 | 20 | 4.40 | 7.6 |
| Example 6-54 | EC:DMC (50:50) | 1.0 | 20 | 30 | 4.40 | 7.7 |
| Example 6-55 | EC:DMC (50:50) | 1.0 | 20 | 20 | 4.40 | 7.8 |
| Comparative Example 6-19 | EC:DMC (50:50) | 1.5 | 25 | 30 | 4.40 | 4.1 |

TABLE 36

| | nonaqueous solvent | concentration of $Li_2CO_3 + Li_2SO_4$ (wt %) | concentration of protic impurities (ppm) | moisture content (ppm) | upper limit voltage (V) | discharge capacity (mAh) |
|---|---|---|---|---|---|---|
| Example 6-56 | EC:PC:DMC (40:40:20) | 1.0 | 25 | 30 | 4.25 | 7.0 |
| Example 6-57 | EC:PC:DMC (40:40:20) | 1.5 | 20 | 30 | 4.25 | 7.0 |
| Example 6-58 | EC:PC:DMC (40:40:20) | 1.5 | 25 | 20 | 4.25 | 7.0 |
| Example 6-59 | EC:PC:DMC (40:40:20) | 1.0 | 20 | 30 | 4.25 | 7.1 |
| Example 6-60 | EC:PC:DMC (40:40:20) | 1.0 | 20 | 20 | 4.25 | 7.1 |
| Comparative Example 6-20 | EC:PC:DMC (40:40:20) | 1.0 | 20 | 20 | 4.20 | 6.9 |
| Comparative Example 6-21 | EC:PC:DMC (40:40:20) | 1.5 | 25 | 30 | 4.20 | 6.7 |
| Comparative Example 6-22 | EC:PC:DMC (40:40:20) | 1.5 | 25 | 30 | 4.25 | 4.2 |

TABLE 37

| | nonaqueous solvent | concentration of $Li_2CO_3 + Li_2SO_4$ (wt %) | concentration of protic impurities (ppm) | moisture content (ppm) | upper limit voltage (V) | discharge capacity (mAh) |
|---|---|---|---|---|---|---|
| Example 6-61 | EC:PC:DMC (40:40:20) | 1.0 | 25 | 30 | 4.30 | 7.2 |
| Example 6-62 | EC:PC:DMC (40:40:20) | 1.5 | 20 | 30 | 4.30 | 7.2 |
| Example 6-63 | EC:PC:DMC (40:40:20) | 1.5 | 25 | 20 | 4.30 | 7.2 |
| Example 6-64 | EC:PC:DMC (40:40:20) | 1.0 | 20 | 30 | 4.30 | 7.3 |
| Example 6-65 | EC:PC:DMC (40:40:20) | 1.0 | 20 | 20 | 4.30 | 7.4 |
| Comparative Example 6-23 | EC:PC:DMC (40:40:20) | 1.5 | 25 | 30 | 4.30 | 4.0 |

TABLE 38

| | nonaqueous solvent | concentration of $Li_2CO_3 + Li_2SO_4$ (wt %) | concentration of protic impurities (ppm) | moisture content (ppm) | upper limit voltage (V) | discharge capacity (mAh) |
|---|---|---|---|---|---|---|
| Example 6-66 | EC:PC:DMC (40:40:20) | 1.0 | 25 | 30 | 4.40 | 7.5 |
| Example 6-67 | EC:PC:DMC (40:40:20) | 1.5 | 20 | 30 | 4.40 | 7.4 |
| Example 6-68 | EC:PC:DMC (40:40:20) | 1.5 | 25 | 20 | 4.40 | 7.4 |
| Example 6-69 | EC:PC:DMC (40:40:20) | 1.0 | 20 | 30 | 4.40 | 7.6 |
| Example 6-70 | EC:PC:DMC (40:40:20) | 1.0 | 20 | 20 | 4.40 | 7.7 |
| Comparative Example 6-24 | EC:PC:DMC (40:40:20) | 1.5 | 25 | 30 | 4.40 | 3.9 |

TABLE 39

| | nonaqueous solvent | concentration of $Li_2CO_3 + Li_2SO_4$ (wt %) | concentration of protic impurities (ppm) | moisture content (ppm) | upper limit voltage (V) | discharge capacity (mAh) |
|---|---|---|---|---|---|---|
| Example 6-71 | EC:PC:DMC (25:25:50) | 1.0 | 25 | 30 | 4.25 | 7.2 |
| Example 6-72 | EC:PC:DMC (25:25:50) | 1.5 | 20 | 30 | 4.25 | 7.2 |
| Example 6-73 | EC:PC:DMC (25:25:50) | 1.5 | 25 | 20 | 4.25 | 7.2 |
| Example 6-74 | EC:PC:DMC (25:25:50) | 1.0 | 20 | 30 | 4.25 | 7.2 |
| Example 6-75 | EC:PC:DMC (25:25:50) | 1.0 | 20 | 20 | 4.25 | 7.3 |
| Comparative Example 6-25 | EC:PC:DMC (25:25:50) | 1.0 | 20 | 20 | 4.20 | 7.0 |

TABLE 39-continued

|  | nonaqueous solvent | concentration of Li$_2$CO$_3$ + Li$_2$SO$_4$ (wt %) | concentration of protic impurities (ppm) | moisture content (ppm) | upper limit voltage (V) | discharge capacity (mAh) |
| --- | --- | --- | --- | --- | --- | --- |
| Comparative Example 6-26 | EC:PC:DMC (25:25:50) | 1.5 | 25 | 30 | 4.20 | 6.9 |
| Comparative Example 6-27 | EC:PC:DMC (25:25:50) | 1.5 | 25 | 30 | 4.25 | 4.5 |

TABLE 40

|  | nonaqueous solvent | concentration of Li$_2$CO$_3$ + Li$_2$SO$_4$ (wt %) | concentration of protic impurities (ppm) | moisture content (ppm) | upper limit voltage (V) | discharge capacity (mAh) |
| --- | --- | --- | --- | --- | --- | --- |
| Example 6-76 | EC:PC:DMC (25:25:50) | 1.0 | 25 | 30 | 4.30 | 7.4 |
| Example 6-77 | EC:PC:DMC (25:25:50) | 1.5 | 20 | 30 | 4.30 | 7.4 |
| Example 6-78 | EC:PC:DMC (25:25:50) | 1.5 | 25 | 20 | 4.30 | 7.4 |
| Example 6-79 | EC:PC:DMC (25:25:50) | 1.0 | 20 | 30 | 4.30 | 7.5 |
| Example 6-80 | EC:PC:DMC (25:25:50) | 1.0 | 20 | 20 | 4.30 | 7.6 |
| Comparative Example 6-28 | EC:PC:DMC (25:25:50) | 1.5 | 25 | 30 | 4.30 | 4.1 |

TABLE 41

|  | nonaqueous solvent | concentration of Li$_2$CO$_3$ + Li$_2$SO$_4$ (wt %) | concentration of protic impurities (ppm) | moisture content (ppm) | upper limit voltage (V) | discharge capacity (mAh) |
| --- | --- | --- | --- | --- | --- | --- |
| Example 6-81 | EC:PC:DMC (25:25:50) | 1.0 | 25 | 30 | 4.40 | 7.6 |
| Example 6-82 | EC:PC:DMC (25:25:50) | 1.5 | 20 | 30 | 4.40 | 7.5 |
| Example 6-83 | EC:PC:DMC (25:25:50) | 1.5 | 25 | 20 | 4.40 | 7.6 |
| Example 6-84 | EC:PC:DMC (25:25:50) | 1.0 | 20 | 30 | 4.40 | 7.7 |
| Example 6-85 | EC:PC:DMC (25:25:50) | 1.0 | 20 | 20 | 4.40 | 7.8 |
| Comparative Example 6-29 | EC:PC:DMC (25:25:50) | 1.5 | 25 | 30 | 4.40 | 4.1 |

TABLE 42

|  | nonaqueous solvent | concentration of Li$_2$CO$_3$ + Li$_2$SO$_4$ (wt %) | concentration of protic impurities (ppm) | moisture content (ppm) | upper limit voltage (V) | discharge capacity (mAh) |
| --- | --- | --- | --- | --- | --- | --- |
| Example 6-86 | EC:PC:DMC (50/3:50/3:200/3) | 1.0 | 25 | 30 | 4.25 | 7.1 |
| Example 6-87 | EC:PC:DMC (50/3:50/3:200/3) | 1.5 | 20 | 30 | 4.25 | 7.0 |
| Example 6-88 | EC:PC:DMC (50/3:50/3:200/3) | 1.5 | 25 | 20 | 4.25 | 7.0 |
| Example 6-89 | EC:PC:DMC (50/3:50/3:200/3) | 1.0 | 20 | 30 | 4.25 | 7.1 |
| Example 6-90 | EC:PC:DMC (50/3:50/3:200/3) | 1.0 | 20 | 20 | 4.25 | 7.1 |
| Comparative Example 6-30 | EC:PC:DMC (50/3:50/3:200/3) | 1.0 | 20 | 20 | 4.20 | 6.9 |
| Comparative Example 6-31 | EC:PC:DMC (50/3:50/3:200/3) | 1.5 | 25 | 30 | 4.20 | 6.8 |
| Comparative Example 6-32 | EC:PC:DMC (50/3:50/3:200/3) | 1.5 | 25 | 30 | 4.25 | 4.2 |

TABLE 43

|  | nonaqueous solvent | concentration of Li$_2$CO$_3$ + Li$_2$SO$_4$ (wt %) | concentration of protic impurities (ppm) | moisture content (ppm) | upper limit voltage (V) | discharge capacity (mAh) |
| --- | --- | --- | --- | --- | --- | --- |
| Example 6-91 | EC:PC:DMC (50/3:50/3:200/3) | 1.0 | 25 | 30 | 4.30 | 7.2 |
| Example 6-92 | EC:PC:DMC (50/3:50/3:200/3) | 1.5 | 20 | 30 | 4.30 | 7.2 |
| Example 6-93 | EC:PC:DMC (50/3:50/3:200/3) | 1.5 | 25 | 20 | 4.30 | 7.2 |
| Example 6-94 | EC:PC:DMC (50/3:50/3:200/3) | 1.0 | 20 | 30 | 4.30 | 7.3 |
| Example 6-95 | EC:PC:DMC (50/3:50/3:200/3) | 1.0 | 20 | 20 | 4.30 | 7.4 |
| Comparative Example 6-33 | EC:PC:DMC (50/3:50/3:200/3) | 1.5 | 25 | 30 | 4.30 | 4.0 |

TABLE 44

|  | nonaqueous solvent | concentration of Li$_2$CO$_3$ + Li$_2$SO$_4$ (wt %) | concentration of protic impurities (ppm) | moisture content (ppm) | upper limit voltage (V) | discharge capacity (mAh) |
| --- | --- | --- | --- | --- | --- | --- |
| Example 6-96 | EC:PC:DMC (50/3:50/3:200/3) | 1.0 | 25 | 30 | 4.40 | 7.4 |
| Example 6-97 | EC:PC:DMC (50/3:50/3:200/3) | 1.5 | 20 | 30 | 4.40 | 7.4 |
| Example 6-98 | EC:PC:DMC (50/3:50/3:200/3) | 1.5 | 25 | 20 | 4.40 | 7.4 |
| Example 6-99 | EC:PC:DMC (50/3:50/3:200/3) | 1.0 | 20 | 30 | 4.40 | 7.5 |
| Example 6-100 | EC:PC:DMC (50/3:50/3:200/3) | 1.0 | 20 | 20 | 4.40 | 7.6 |
| Comparative Example 6-34 | EC:PC:DMC (50/3:50/3:200/3) | 1.5 | 25 | 30 | 4.40 | 3.9 |

TABLE 45

|  | nonaqueous solvent | concentration of Li$_2$CO$_3$ + Li$_2$SO$_4$ (wt %) | concentration of protic impurities (ppm) | moisture content (ppm) | upper limit voltage (V) | discharge capacity (mAh) |
| --- | --- | --- | --- | --- | --- | --- |
| Example 6-101 | EC:PC:DMC (10:10:80) | 1.0 | 25 | 30 | 4.25 | 7.0 |
| Example 6-102 | EC:PC:DMC (10:10:80) | 1.5 | 20 | 30 | 4.25 | 7.0 |
| Example 6-103 | EC:PC:DMC (10:10:80) | 1.5 | 25 | 20 | 4.25 | 7.0 |
| Example 6-104 | EC:PC:DMC (10:10:80) | 1.0 | 20 | 30 | 4.25 | 7.1 |
| Example 6-105 | EC:PC:DMC (10:10:80) | 1.0 | 20 | 20 | 4.25 | 7.1 |
| Comparative Example 6-35 | EC:PC:DMC (10:10:80) | 1.0 | 20 | 20 | 4.20 | 6.8 |
| Comparative Example 6-36 | EC:PC:DMC (10:10:80) | 1.5 | 25 | 30 | 4.20 | 6.7 |
| Comparative Example 6-37 | EC:PC:DMC (10:10:80) | 1.5 | 25 | 30 | 4.25 | 4.3 |

TABLE 46

|  | nonaqueous solvent | concentration of Li$_2$CO$_3$ + Li$_2$SO$_4$ (wt %) | concentration of protic impurities (ppm) | moisture content (ppm) | upper limit voltage (V) | discharge capacity (mAh) |
| --- | --- | --- | --- | --- | --- | --- |
| Example 6-106 | EC:PC:DMC (10:10:80) | 1.0 | 25 | 30 | 4.30 | 7.2 |
| Example 6-107 | EC:PC:DMC (10:10:80) | 1.5 | 20 | 30 | 4.30 | 7.2 |
| Example 6-108 | EC:PC:DMC (10:10:80) | 1.5 | 25 | 20 | 4.30 | 7.2 |
| Example 6-109 | EC:PC:PMC (10:10:80) | 1.0 | 20 | 30 | 4.30 | 7.2 |
| Example 6-110 | EC:PC:DMC (10:10:80) | 1.0 | 20 | 20 | 4.30 | 7.4 |
| Comparative Example 6-38 | EC:PC:DMC (10:10:80) | 1.5 | 25 | 30 | 4.30 | 4.0 |

TABLE 47

|  | nonaqueous solvent | concentration of Li$_2$CO$_3$ + Li$_2$SO$_4$ (wt %) | concentration of protic impurities (ppm) | moisture content (ppm) | upper limit voltage (V) | discharge capacity (mAh) |
| --- | --- | --- | --- | --- | --- | --- |
| Example 6-111 | EC:PC:DMC (10:10:80) | 1.0 | 25 | 30 | 4.40 | 7.3 |
| Example 6-112 | EC:PC:DMC (10:10:80) | 1.5 | 20 | 30 | 4.40 | 7.2 |
| Example 6-113 | EC:PC:DMC (10:10:80) | 1.5 | 25 | 20 | 4.40 | 7.2 |
| Example 6-114 | EC:PC:DMC (10:10:80) | 1.0 | 20 | 30 | 4.40 | 7.5 |
| Example 6-115 | EC:PC:DMC (10:10:80) | 1.0 | 20 | 20 | 4.40 | 7.6 |
| Comparative Example 6-39 | EC:PC:DMC (10:10:80) | 1.5 | 25 | 30 | 4.40 | 3.8 |

TABLE 48

|  | nonaqueous solvent | concentration of Li$_2$CO$_3$ + Li$_2$SO$_4$ (wt %) | concentration of protic impurities (ppm) | moisture content (ppm) | upper limit voltage (V) | discharge capacity (mAh) |
| --- | --- | --- | --- | --- | --- | --- |
| Example 6-116 | EC:PC:DMC (5:5:90) | 1.0 | 25 | 30 | 4.25 | 6.3 |
| Example 6-117 | EC:PC:DMC (5:5:90) | 1.5 | 20 | 30 | 4.25 | 6.3 |
| Example 6-118 | EC:PC:DMC (5:5:90) | 1.5 | 25 | 20 | 4.25 | 6.3 |
| Example 6-119 | EC:PC:DMC (5:5:90) | 1.0 | 20 | 30 | 4.25 | 6.4 |
| Example 6-120 | EC:PC:DMC (5:5:90) | 1.0 | 20 | 20 | 4.25 | 6.6 |
| Comparative Example 6-40 | EC:PC:DMC (5:5:90) | 1.0 | 20 | 20 | 4.20 | 6.1 |

TABLE 48-continued

|  | nonaqueous solvent | concentration of Li$_2$CO$_3$ + Li$_2$SO$_4$ (wt %) | concentration of protic impurities (ppm) | moisture content (ppm) | upper limit voltage (V) | discharge capacity (mAh) |
|---|---|---|---|---|---|---|
| Comparative Example 6-41 | EC:PC:DMC (5:5:90) | 1.5 | 25 | 30 | 4.20 | 6.0 |
| Comparative Example 6-42 | EC:PC:DMC (5:5:90) | 1.5 | 25 | 30 | 4.25 | 5.0 |

TABLE 49

|  | nonaqueous solvent | concentration of Li$_2$CO$_3$ + Li$_2$SO$_4$ (wt %) | concentration of protic impurities (ppm) | moisture content (ppm) | upper limit voltage (V) | discharge capacity (mAh) |
|---|---|---|---|---|---|---|
| Example 6-121 | EC:PC:DMC (5:5:90) | 1.0 | 25 | 30 | 4.30 | 6.5 |
| Example 6-122 | EC:PC:DMC (5:5:90) | 1.5 | 20 | 30 | 4.30 | 6.6 |
| Example 6-123 | EC:PC:DMC (5:5:90) | 1.5 | 25 | 20 | 4.30 | 6.5 |
| Example 6-124 | EC:PC:DMC (5:5:90) | 1.0 | 20 | 30 | 4.30 | 6.7 |
| Example 6-125 | EC:PC:DMC (5:5:90) | 1.0 | 20 | 20 | 4.30 | 6.8 |
| Comparative Example 6-43 | EC:PC:DMC (5:5:90) | 1.5 | 25 | 30 | 4.30 | 4.2 |

TABLE 50

|  | nonaqueous solvent | concentration of Li$_2$CO$_3$ + Li$_2$SO$_4$ (wt %) | concentration of protic impurities (ppm) | moisture content (ppm) | upper limit voltage (V) | discharge capacity (mAh) |
|---|---|---|---|---|---|---|
| Example 6-126 | EC:PC:DMC (5:5:90) | 1.0 | 25 | 30 | 4.40 | 6.6 |
| Example 6-127 | EC:PC:DMC (5:5:90) | 1.5 | 20 | 30 | 4.40 | 6.7 |
| Example 6-128 | EC:PC:DMC (5:5:90) | 1.5 | 25 | 20 | 4.40 | 6.7 |
| Example 6-129 | EC:PC:DMC (5:5:90) | 1.0 | 20 | 30 | 4.40 | 6.8 |
| Example 6-130 | EC:PC:DMC (5:5:90) | 1.0 | 20 | 20 | 4.40 | 7.0 |
| Comparative Example 6-44 | EC:PC:DMC (5:5:90) | 1.5 | 25 | 30 | 4.40 | 3.9 |

TABLE 51

|  | nonaqueous solvent | concentration of Li$_2$CO$_3$ + Li$_2$SO$_4$ (wt %) | concentration of protic impurities (ppm) | moisture content (ppm) | upper limit voltage (V) | discharge capacity (mAh) |
|---|---|---|---|---|---|---|
| Example 6-131 | EC:DMC:VEC (49:49:2) | 1.0 | 25 | 30 | 4.25 | 7.3 |
| Example 6-132 | EC:DMC:VEC (49:49:2) | 1.5 | 20 | 30 | 4.25 | 7.3 |
| Example 6-133 | EC:DMC:VEC (49:49:2) | 1.5 | 25 | 20 | 4.25 | 7.3 |
| Example 6-134 | EC:DMC:VEC (49:49:2) | 1.0 | 20 | 30 | 4.25 | 7.3 |
| Example 6-135 | EC:DMC:VEC (49:49:2) | 1.0 | 20 | 20 | 4.25 | 7.4 |
| Comparative Example 6-45 | EC:DMC:VEC (49:49:2) | 1.0 | 20 | 20 | 4.20 | 7.2 |
| Comparative Example 6-46 | EC:DMC:VEC (49:49:2) | 1.5 | 25 | 30 | 4.20 | 7.1 |
| Comparative Example 6-47 | EC:DMC:VEC (49:49:2) | 1.5 | 25 | 30 | 4.25 | 4.6 |

TABLE 52

|  | nonaqueous solvent | concentration of Li$_2$CO$_3$ + Li$_2$SO$_4$ (wt %) | concentration of protic impurities (ppm) | moisture content (ppm) | upper limit voltage (V) | discharge capacity (mAh) |
|---|---|---|---|---|---|---|
| Example 6-136 | EC:DMC:VEC (49:49:2) | 1.0 | 25 | 30 | 4.30 | 7.5 |
| Example 6-137 | EC:DMC:VEC (49:49:2) | 1.5 | 20 | 30 | 4.30 | 7.5 |
| Example 6-138 | EC:DMC:VEC (49:49:2) | 1.5 | 25 | 20 | 4.30 | 7.5 |
| Example 6-139 | EC:DMC:VEC (49:49:2) | 1.0 | 20 | 30 | 4.30 | 7.6 |
| Example 6-140 | EC:DMC:VEC (49:49:2) | 1.0 | 20 | 20 | 4.30 | 7.7 |
| Comparative Example 6-48 | EC:DMC:VEC (49:49:2) | 1.5 | 25 | 30 | 4.30 | 4.1 |

TABLE 53

| | nonaqueous solvent | concentration of $Li_2CO_3 + Li_2SO_4$ (wt %) | concentration of protic impurities (ppm) | moisture content (ppm) | upper limit voltage (V) | discharge capacity (mAh) |
|---|---|---|---|---|---|---|
| Example 6-141 | EC:DMC:VEC (49:49:2) | 1.0 | 25 | 30 | 4.40 | 7.7 |
| Example 6-142 | EC:DMC:VEC (49:49:2) | 1.5 | 20 | 30 | 4.40 | 7.7 |
| Example 6-143 | EC:DMC:VEC (49:49:2) | 1.5 | 25 | 20 | 4.40 | 7.7 |
| Example 6-144 | EC:DMC:VEC (49:49:2) | 1.0 | 20 | 30 | 4.40 | 7.8 |
| Example 6-145 | EC:DMC:VEC (49:49:2) | 1.0 | 20 | 20 | 4.40 | 7.9 |
| Comparative Example 6-49 | EC:DMC:VEC (49:49:2) | 1.5 | 25 | 30 | 4.40 | 4.2 |

TABLE 54

| | nonaqueous solvent | concentration of $Li_2CO_3 + Li_2SO_4$ (wt %) | concentration of protic impurities (ppm) | moisture content (ppm) | upper limit voltage (V) | discharge capacity (mAh) |
|---|---|---|---|---|---|---|
| Example 6-146 | EC:DMC:VEC (47.5:47.5:5) | 1.0 | 25 | 30 | 4.25 | 7.3 |
| Example 6-147 | EC:DMC:VEC (47.5:47.5:5) | 1.5 | 20 | 30 | 4.25 | 7.3 |
| Example 6-148 | EC:DMC:VEC (47.5:47.5:5) | 1.5 | 25 | 20 | 4.25 | 7.3 |
| Example 6-149 | EC:DMC:VEC (47.5:47.5:5) | 1.0 | 20 | 30 | 4.25 | 7.3 |
| Example 6-150 | EC:DMC:VEC (47.5:47.5:5) | 1.0 | 20 | 20 | 4.25 | 7.4 |
| Comparative Example 6-50 | EC:DMC:VEC (47.5:47.5:5) | 1.0 | 20 | 20 | 4.20 | 7.2 |
| Comparative Example 6-51 | EC:DMC:VEC (47.5:47.5:5) | 1.5 | 25 | 30 | 4.20 | 7.1 |
| Comparative Example 6-52 | EC:DMC:VEC (47.5:47.5:5) | 1.5 | 25 | 30 | 4.25 | 4.5 |

TABLE 55

| | nonaqueous solvent | concentration of $Li_2CO_3 + Li_2SO_4$ (wt %) | concentration of protic impurities (ppm) | moisture content (ppm) | upper limit voltage (V) | discharge capacity (mAh) |
|---|---|---|---|---|---|---|
| Example 6-151 | EC:DMC:VEC (47.5:47.5:5) | 1.0 | 25 | 30 | 4.30 | 7.5 |
| Example 6-152 | EC:DMC:VEC (47.5:47.5:5) | 1.5 | 20 | 30 | 4.30 | 7.4 |
| Example 6-153 | EC:DMC:VEC (47.5:47.5:5) | 1.5 | 25 | 20 | 4.30 | 7.5 |
| Example 6-154 | EC:DMC:VEC (47.5:47.5:5) | 1.0 | 20 | 30 | 4.30 | 7.6 |
| Example 6-155 | EC:DMC:VEC (47.5:47.5:5) | 1.0 | 20 | 20 | 4.30 | 7.7 |
| Comparative Example 6-53 | EC:DMC:VEC (47.5:47.5:5) | 1.5 | 25 | 30 | 4.30 | 4.1 |

TABLE 56

| | nonaqueous solvent | concentration of $Li_2CO_3 + Li_2SO_4$ (wt %) | concentration of protic impurities (ppm) | moisture content (ppm) | upper limit voltage (V) | discharge capacity (mAh) |
|---|---|---|---|---|---|---|
| Example 6-156 | EC:DMC:VEC (47.5:47.5:5) | 1.0 | 25 | 30 | 4.40 | 7.7 |
| Example 6-157 | EC:DMC:VEC (47.5:47.5:5) | 1.5 | 20 | 30 | 4.40 | 7.6 |
| Example 6-158 | EC:DMC:VEC (47.5:47.5:5) | 1.5 | 25 | 20 | 4.40 | 7.7 |
| Example 6-159 | EC:DMC:VEC (47.5:47.5:5) | 1.0 | 20 | 30 | 4.40 | 7.8 |
| Example 6-160 | EC:DMC:VEC (47.5:47.5:5) | 1.0 | 20 | 20 | 4.40 | 7.9 |
| Comparative Example 6-54 | EC:DMC:VEC (47.5:47.5:5) | 1.5 | 25 | 30 | 4.40 | 4.2 |

TABLE 57

| | nonaqueous solvent | concentration of $Li_2CO_3 + Li_2SO_4$ (wt %) | concentration of protic impurities (ppm) | moisture content (ppm) | upper limit voltage (V) | discharge capacity (mAh) |
|---|---|---|---|---|---|---|
| Example 6-161 | EC:DMC:VEC (45:45:10) | 1.0 | 25 | 30 | 4.25 | 7.1 |
| Example 6-162 | EC:DMC:VEC (45:45:10) | 1.5 | 20 | 30 | 4.25 | 7.1 |
| Example 6-163 | EC:DMC:VEC (45:45:10) | 1.5 | 25 | 20 | 4.25 | 7.1 |
| Example 6-164 | EC:DMC:VEC (45:45:10) | 1.0 | 20 | 30 | 4.25 | 7.1 |
| Example 6-165 | EC:DMC:VEC (45:45:10) | 1.0 | 20 | 20 | 4.25 | 7.2 |
| Comparative Example 6-55 | EC:DMC:VEC (45:45:10) | 1.0 | 20 | 20 | 4.20 | 7.0 |

TABLE 57-continued

|  | nonaqueous solvent | concentration of Li$_2$CO$_3$ + Li$_2$SO$_4$ (wt %) | concentration of protic impurities (ppm) | moisture content (ppm) | upper limit voltage (V) | discharge capacity (mAh) |
| --- | --- | --- | --- | --- | --- | --- |
| Comparative Example 6-56 | EC:DMC:VEC (45:45:10) | 1.5 | 25 | 30 | 4.20 | 6.9 |
| Comparative Example 6-57 | EC:DMC:VEC (45:45:10) | 1.5 | 25 | 30 | 4.25 | 4.3 |

TABLE 58

|  | nonaqueous solvent | concentration of Li$_2$CO$_3$ + Li$_2$SO$_4$ (wt %) | concentration of protic impurities (ppm) | moisture content (ppm) | upper limit voltage (V) | discharge capacity (mAh) |
| --- | --- | --- | --- | --- | --- | --- |
| Example 6-166 | EC:DMC:VEC (45:45:10) | 1.0 | 25 | 30 | 4.30 | 7.3 |
| Example 6-167 | EC:DMC:VEC (45:45:10) | 1.5 | 20 | 30 | 4.30 | 7.3 |
| Example 6-168 | EC:DMC:VEC (45:45:10) | 1.5 | 25 | 20 | 4.30 | 7.3 |
| Example 6-169 | EC:DMC:VEC (45:45:10) | 1.0 | 20 | 30 | 4.30 | 7.4 |
| Example 6-170 | EC:DMC:VEC (45:45:10) | 1.0 | 20 | 20 | 4.30 | 7.5 |
| Comparative Example 6-58 | EC:DMC:VEC (45:45:10) | 1.5 | 25 | 30 | 4.30 | 3.9 |

TABLE 59

|  | nonaqueous solvent | concentration of Li$_2$CO$_3$ + Li$_2$SO$_4$ (wt %) | concentration of protic impurities (ppm) | moisture content (ppm) | upper limit voltage (V) | discharge capacity (mAh) |
| --- | --- | --- | --- | --- | --- | --- |
| Example 6-171 | EC:DMC:VEC (45:45:10) | 1.0 | 25 | 30 | 4.40 | 7.5 |
| Example 6-172 | EC:DMC:VEC (45:45:10) | 1.5 | 20 | 30 | 4.40 | 7.4 |
| Example 6-173 | EC:DMC:VEC (45:45:10) | 1.5 | 25 | 20 | 4.40 | 7.5 |
| Example 6-174 | EC:DMC:VEC (45:45:10) | 1.0 | 20 | 30 | 4.40 | 7.6 |
| Example 6-175 | EC:DMC:VEC (45:45:10) | 1.0 | 20 | 20 | 4.40 | 7.7 |
| Comparative Example 6-59 | EC:DMC:VEC (45:45:10) | 1.5 | 25 | 30 | 4.40 | 4.0 |

TABLE 60

|  | nonaqueous solvent | concentration of Li$_2$CO$_3$ + Li$_2$SO$_4$ (wt %) | concentration of protic impurities (ppm) | moisture content (ppm) | upper limit voltage (V) | discharge capacity (mAh) |
| --- | --- | --- | --- | --- | --- | --- |
| Example 6-176 | EC:DMC:VC (49:49:2) | 1.0 | 25 | 30 | 4.25 | 7.3 |
| Example 6-177 | EC:DMC:VC (49:49:2) | 1.5 | 20 | 30 | 4.25 | 7.2 |
| Example 6-178 | EC:DMC:VC (49:49:2) | 1.5 | 25 | 20 | 4.25 | 7.2 |
| Example 6-179 | EC:DMC:VC (49:49:2) | 1.0 | 20 | 30 | 4.25 | 7.3 |
| Example 6-180 | EC:DMC:VC (49:49:2) | 1.0 | 20 | 20 | 4.25 | 7.4 |
| Comparative Example 6-60 | EC:DMC:VC (49:49:2) | 1.0 | 20 | 20 | 4.20 | 7.2 |
| Comparative Example 6-61 | EC:DMC:VC (49:49:2) | 1.5 | 25 | 30 | 4.20 | 7.1 |
| Comparative Example 6-62 | EC:DMC:VC (49:49:2) | 1.5 | 25 | 30 | 4.25 | 4.6 |

TABLE 61

|  | nonaqueous solvent | concentration of Li$_2$CO$_3$ + Li$_2$SO$_4$ (wt %) | concentration of protic impurities (ppm) | moisture content (ppm) | upper limit voltage (V) | discharge capacity (mAh) |
| --- | --- | --- | --- | --- | --- | --- |
| Example 6-181 | EC:DMC:VC (49:49:2) | 1.0 | 25 | 30 | 4.30 | 7.5 |
| Example 6-182 | EC:DMC:VC (49:49:2) | 1.5 | 20 | 30 | 4.30 | 7.4 |
| Example 6-183 | EC:DMC:VC (49:49:2) | 1.5 | 25 | 20 | 4.30 | 7.4 |
| Example 6-184 | EC:DMC:VC (49:49:2) | 1.0 | 20 | 30 | 4.30 | 7.5 |
| Example 6-185 | EC:DMC:VC (49:49:2) | 1.0 | 20 | 20 | 4.30 | 7.7 |
| Comparative Example 6-63 | EC:DMC:VC (49:49:2) | 1.5 | 25 | 30 | 4.30 | 4.1 |

TABLE 62

| | nonaqueous solvent | concentration of Li$_2$CO$_3$ + Li$_2$SO$_4$ (wt %) | concentration of protic impurities (ppm) | moisture content (ppm) | upper limit voltage (V) | discharge capacity (mAh) |
|---|---|---|---|---|---|---|
| Example 6-186 | EC:DMC:VC (49:49:2) | 1.0 | 25 | 30 | 4.40 | 7.7 |
| Example 6-187 | EC:DMC:VC (49:49:2) | 1.5 | 20 | 30 | 4.40 | 7.6 |
| Example 6-188 | EC:DMC:VC (49:49:2) | 1.5 | 25 | 20 | 4.40 | 7.6 |
| Example 6-189 | EC:DMC:VC (49:49:2) | 1.0 | 20 | 30 | 4.40 | 7.7 |
| Example 6-190 | EC:DMC:VC (49:49:2) | 1.0 | 20 | 20 | 4.40 | 7.9 |
| Comparative Example 6-64 | EC:DMC:VC (49:49:2) | 1.5 | 25 | 30 | 4.40 | 4.2 |

TABLE 63

| | nonaqueous solvent | concentration of Li$_2$CO$_3$ + Li$_2$SO$_4$ (wt %) | concentration of protic impurities (ppm) | moisture content (ppm) | upper limit voltage (V) | discharge capacity (mAh) |
|---|---|---|---|---|---|---|
| Example 6-191 | EC:DMC:VC (47.5:47.5:5) | 1.0 | 25 | 30 | 4.25 | 7.3 |
| Example 6-192 | EC:DMC:VC (47.5:47.5:5) | 1.5 | 20 | 30 | 4.25 | 7.3 |
| Example 6-193 | EC:DMC:VC (47.5:47.5:5) | 1.5 | 25 | 20 | 4.25 | 7.3 |
| Example 6-194 | EC:DMC:VC (47.5:47.5:5) | 1.0 | 20 | 30 | 4.25 | 7.3 |
| Example 6-195 | EC:DMC:VC (47.5:47.5:5) | 1.0 | 20 | 20 | 4.25 | 7.4 |
| Comparative Example 6-65 | EC:DMC:VC (47.5:47.5:5) | 1.0 | 20 | 20 | 4.20 | 7.1 |
| Comparative Example 6-66 | EC:DMC:VC (47.5:47.5:5) | 1.5 | 25 | 30 | 4.20 | 7.0 |
| Comparative Example 6-67 | EC:DMC:VC (47.5:47.5:5) | 1.5 | 25 | 30 | 4.25 | 4.5 |

TABLE 64

| | nonaqueous solvent | concentration of Li$_2$CO$_3$ + Li$_2$SO$_4$ (wt %) | concentration of protic impurities (ppm) | moisture content (ppm) | upper limit voltage (V) | discharge capacity (mAh) |
|---|---|---|---|---|---|---|
| Example 6-196 | EC:DMC:VC (47.5:47.5:5) | 1.0 | 25 | 30 | 4.30 | 7.5 |
| Example 6-197 | EC:DMC:VC (47.5:47.5:5) | 1.5 | 20 | 30 | 4.30 | 7.5 |
| Example 6-198 | EC:DMC:VC (47.5:47.5:5) | 1.5 | 25 | 20 | 4.30 | 7.5 |
| Example 6-199 | EC:DMC:VC (47.5:47.5:5) | 1.0 | 20 | 30 | 4.30 | 7.6 |
| Example 6-200 | EC:DMC:VC (47.5:47.5:5) | 1.0 | 20 | 20 | 4.30 | 7.7 |
| Comparative Example 6-68 | EC:DMC:VC (47.5:47.5:5) | 1.5 | 25 | 30 | 4.30 | 4.1 |

TABLE 65

| | nonaqueous solvent | concentration of Li$_2$CO$_3$ + Li$_2$SO$_4$ (wt %) | concentration of protic impurities (ppm) | moisture content (ppm) | upper limit voltage (V) | discharge capacity (mAh) |
|---|---|---|---|---|---|---|
| Example 6-201 | EC:DMC:VC (47.5:47.5:5) | 1.0 | 25 | 30 | 4.40 | 7.7 |
| Example 6-202 | EC:DMC:VC (47.5:47.5:5) | 1.5 | 20 | 30 | 4.40 | 7.7 |
| Example 6-203 | EC:DMC:VC (47.5:47.5:5) | 1.5 | 25 | 20 | 4.40 | 7.7 |
| Example 6-204 | EC:DMC:VC (47.5:47.5:5) | 1.0 | 20 | 30 | 4.40 | 7.7 |
| Example 6-205 | EC:DMC:VC (47.5:47.5:5) | 1.0 | 20 | 20 | 4.40 | 7.8 |
| Comparative Example 6-69 | EC:DMC:VC (47.5:47.5:5) | 1.5 | 25 | 30 | 4.40 | 4.1 |

TABLE 66

| | nonaqueous solvent | concentration of Li$_2$CO$_3$ + Li$_2$SO$_4$ (wt %) | concentration of protic impurities (ppm) | moisture content (ppm) | upper limit voltage (V) | discharge capacity (mAh) |
|---|---|---|---|---|---|---|
| Example 6-206 | EC:DMC:VC (45:45:10) | 1.0 | 25 | 30 | 4.25 | 7.1 |
| Example 6-207 | EC:DMC:VC (45:45:10) | 1.5 | 20 | 30 | 4.25 | 7.1 |
| Example 6-208 | EC:DMC:VC (45:45:10) | 1.5 | 25 | 20 | 4.25 | 7.1 |
| Example 6-209 | EC:DMC:VC (45:45:10) | 1.0 | 20 | 30 | 4.25 | 7.1 |
| Example 6-210 | EC:DMC:VC (45:45:10) | 1.0 | 20 | 20 | 4.25 | 7.2 |
| Comparative Example 6-70 | EC:DMC:VC (45:45:10) | 1.0 | 20 | 20 | 4.20 | 7.0 |

TABLE 66-continued

|  | nonaqueous solvent | concentration of Li$_2$CO$_3$ + Li$_2$SO$_4$ (wt %) | concentration of protic impurities (ppm) | moisture content (ppm) | upper limit voltage (V) | discharge capacity (mAh) |
|---|---|---|---|---|---|---|
| Comparative Example 6-71 | EC:DMC:VC (45:45:10) | 1.5 | 25 | 30 | 4.20 | 6.9 |
| Comparative Example 6-72 | EC:DMC:VC (45:45:10) | 1.5 | 25 | 30 | 4.25 | 4.4 |

TABLE 67

|  | nonaqueous solvent | concentration of Li$_2$CO$_3$ + Li$_2$SO$_4$ (wt %) | concentration of protic impurities (ppm) | moisture content (ppm) | upper limit voltage (V) | discharge capacity (mAh) |
|---|---|---|---|---|---|---|
| Example 6-211 | EC:DMC:VC (45:45:10) | 1.0 | 25 | 30 | 4.30 | 7.3 |
| Example 6-212 | EC:DMC:VC (45:45:10) | 1.5 | 20 | 30 | 4.30 | 7.3 |
| Example 6-213 | EC:DMC:VC (45:45:10) | 1.5 | 25 | 20 | 4.30 | 7.3 |
| Example 6-214 | EC:DMC:VC (45:45:10) | 1.0 | 20 | 30 | 4.30 | 7.4 |
| Example 6-215 | EC:DMC:VC (45:45:10) | 1.0 | 20 | 20 | 4.30 | 7.5 |
| Comparative Example 6-73 | EC:DMC:VC (45:45:10) | 1.5 | 25 | 30 | 4.30 | 3.9 |

TABLE 68

|  | nonaqueous solvent | concentration of Li$_2$CO$_3$ + Li$_2$SO$_4$ (wt %) | concentration of protic impurities (ppm) | moisture content (ppm) | upper limit voltage (V) | discharge capacity (mAh) |
|---|---|---|---|---|---|---|
| Example 6-216 | EC:DMC:VC (45:45:10) | 1.0 | 25 | 30 | 4.40 | 7.5 |
| Example 6-217 | EC:DMC:VC (45:45:10) | 1.5 | 20 | 30 | 4.40 | 7.4 |
| Example 6-218 | EC:DMC:VC (45:45:10) | 1.5 | 25 | 20 | 4.40 | 7.5 |
| Example 6-219 | EC:DMC:VC (45:45:10) | 1.0 | 20 | 30 | 4.40 | 7.6 |
| Example 6-220 | EC:DMC:VC (45:45:10) | 1.0 | 20 | 20 | 4.40 | 7.7 |
| Comparative Example 6-74 | EC:DMC:VC (45:45:10) | 1.5 | 25 | 30 | 4.40 | 4.0 |

TABLE 69

|  | nonaqueous solvent | concentration of Li$_2$CO$_3$ + Li$_2$SO$_4$ (wt %) | concentration of protic impurities (ppm) | moisture content (ppm) | upper limit voltage (V) | discharge capacity (mAh) |
|---|---|---|---|---|---|---|
| Example 6-221 | EC:DMC:GBL (40:40:20) | 1.0 | 25 | 30 | 4.25 | 7.0 |
| Example 6-222 | EC:DMC:GBL (40:40:20) | 1.5 | 20 | 30 | 4.25 | 7.0 |
| Example 6-223 | EC:DMC:GBL (40:40:20) | 1.5 | 25 | 20 | 4.25 | 7.0 |
| Example 6-224 | EC:DMC:GBL (40:40:20) | 1.0 | 20 | 30 | 4.25 | 7.1 |
| Example 6-225 | EC:DMC:GBL (40:40:20) | 1.0 | 20 | 20 | 4.25 | 7.1 |
| Comparative Example 6-75 | EC:DMC:GBL (40:40:20) | 1.0 | 20 | 20 | 4.20 | 6.8 |
| Comparative Example 6-76 | EC:DMC:GBL (40:40:20) | 1.5 | 25 | 30 | 4.20 | 6.7 |
| Comparative Example 6-77 | EC:DMC:GBL (40:40:20) | 1.5 | 25 | 30 | 4.25 | 4.3 |

TABLE 70

|  | nonaqueous solvent | concentration of Li$_2$CO$_3$ + Li$_2$SO$_4$ (wt %) | concentration of protic impurities (ppm) | moisture content (ppm) | upper limit voltage (V) | discharge capacity (mAh) |
|---|---|---|---|---|---|---|
| Example 6-226 | EC:DMC:GBL (40:40:20) | 1.0 | 25 | 30 | 4.30 | 7.2 |
| Example 6-227 | EC:DMC:GBL (40:40:20) | 1.5 | 20 | 30 | 4.30 | 7.1 |
| Example 6-228 | EC:DMC:GBL (40:40:20) | 1.5 | 25 | 20 | 4.30 | 7.1 |
| Example 6-229 | EC:DMC:GBL (40:40:20) | 1.0 | 20 | 30 | 4.30 | 7.3 |
| Example 6-230 | EC:DMC:GBL (40:40:20) | 1.0 | 20 | 20 | 4.30 | 7.4 |
| Comparative Example 6-78 | EC:DMC:GBL (40:40:20) | 1.5 | 25 | 30 | 4.30 | 4.0 |

TABLE 71

| | nonaqueous solvent | concentration of $Li_2CO_3 + Li_2SO_4$ (wt %) | concentration of protic impurities (ppm) | moisture content (ppm) | upper limit voltage (V) | discharge capacity (mAh) |
|---|---|---|---|---|---|---|
| Example 6-231 | EC:DMC:GBL (40:40:20) | 1.0 | 25 | 30 | 4.40 | 7.4 |
| Example 6-232 | EC:DMC:GBL (40:40:20) | 1.5 | 20 | 30 | 4.40 | 7.3 |
| Example 6-233 | EC:DMC:GBL (40:40:20) | 1.5 | 25 | 20 | 4.40 | 7.3 |
| Example 6-234 | EC:DMC:GBL (40:40:20) | 1.0 | 20 | 30 | 4.40 | 7.5 |
| Example 6-235 | EC:DMC:GBL (40:40:20) | 1.0 | 20 | 20 | 4.40 | 7.6 |
| Comparative Example 6-79 | EC:DMC:GBL (40:40:20) | 1.5 | 25 | 30 | 4.40 | 4.1 |

TABLE 72

| | nonaqueous solvent | concentration of $Li_2CO_3 + Li_2SO_4$ (wt %) | concentration of protic impurities (ppm) | moisture content (ppm) | upper limit voltage (V) | discharge capacity (mAh) |
|---|---|---|---|---|---|---|
| Example 6-236 | EC:DMC:GBL (100/3:100/3:100/3) | 1.0 | 25 | 30 | 4.25 | 7.0 |
| Example 6-237 | EC:DMC:GBL (100/3:100/3:100/3) | 1.5 | 20 | 30 | 4.25 | 7.0 |
| Example 6-238 | EC:DMC:GBL (100/3:100/3:100/3) | 1.5 | 25 | 20 | 4.25 | 7.0 |
| Example 6-239 | EC:DMC:GBL (100/3:100/3:100/3) | 1.0 | 20 | 30 | 4.25 | 7.1 |
| Example 6-240 | EC:DMC:GBL (100/3:100/3:100/3) | 1.0 | 20 | 20 | 4.25 | 7.1 |
| Comparative Example 6-80 | EC:DMC:GBL (100/3:100/3:100/3) | 1.0 | 20 | 20 | 4.20 | 6.9 |
| Comparative Example 6-81 | EC:DMC:GBL (100/3:100/3:100/3) | 1.5 | 25 | 30 | 4.20 | 6.7 |
| Comparative Example 6-82 | EC:DMC:GBL (100/3:100/3:100/3) | 1.5 | 25 | 30 | 4.25 | 4.2 |

TABLE 73

| | nonaqueous solvent | concentration of $Li_2CO_3 + Li_2SO_4$ (wt %) | concentration of protic impurities (ppm) | moisture content (ppm) | upper limit voltage (V) | discharge capacity (mAh) |
|---|---|---|---|---|---|---|
| Example 6-241 | EC:DMC:GBL (100/3:100/3:100/3) | 1.0 | 25 | 30 | 4.30 | 7.2 |
| Example 6-242 | EC:DMC:GBL (100/3:100/3:100/3) | 1.5 | 20 | 30 | 4.30 | 7.1 |
| Example 6-243 | EC:DMC:GBL (100/3:100/3:100/3) | 1.5 | 25 | 20 | 4.30 | 7.1 |
| Example 6-244 | EC:DMC:GBL (100/3:100/3:100/3) | 1.0 | 20 | 30 | 4.30 | 7.3 |
| Example 6-245 | EC:DMC:GBL (100/3:100/3:100/3) | 1.0 | 20 | 20 | 4.30 | 7.4 |
| Comparative Example 6-83 | EC:DMC:GBL (100/3:100/3:100/3) | 1.5 | 25 | 30 | 4.30 | 4.1 |

TABLE 74

| | nonaqueous solvent | concentration of $Li_2CO_3 + Li_2SO_4$ (wt %) | concentration of protic impurities (ppm) | moisture content (ppm) | upper limit voltage (V) | discharge capacity (mAh) |
|---|---|---|---|---|---|---|
| Example 6-246 | EC:DMC:GBL (100/3:100/3:100/3) | 1.0 | 25 | 30 | 4.40 | 7.3 |
| Example 6-247 | EC:DMC:GBL (100/3:100/3:100/3) | 1.5 | 20 | 30 | 4.40 | 7.3 |
| Example 6-248 | EC:DMC:GBL (100/3:100/3:100/3) | 1.5 | 25 | 20 | 4.40 | 7.3 |
| Example 6-249 | EC:DMC:GBL (100/3:100/3:100/3) | 1.0 | 20 | 30 | 4.40 | 7.4 |
| Example 6-250 | EC:DMC:GBL (100/3:100/3:100/3) | 1.0 | 20 | 20 | 4.40 | 7.6 |
| Comparative Example 6-84 | EC:DMC:GBL (100/3:100/3:100/3) | 1.5 | 25 | 30 | 4.40 | 3.9 |

TABLE 75

| | nonaqueous solvent | concentration of $Li_2CO_3 + Li_2SO_4$ (wt %) | concentration of protic impurities (ppm) | moisture content (ppm) | upper limit voltage (V) | discharge capacity (mAh) |
|---|---|---|---|---|---|---|
| Example 6-251 | EC:DMC:GBL (25:25:50) | 1.0 | 25 | 30 | 4.25 | 6.2 |
| Example 6-252 | EC:DMC:GBL (25:25:50) | 1.5 | 20 | 30 | 4.25 | 6.2 |
| Example 6-253 | EC:DMC:GBL (25:25:50) | 1.5 | 25 | 20 | 4.25 | 6.2 |
| Example 6-254 | EC:DMC:GBL (25:25:50) | 1.0 | 20 | 30 | 4.25 | 6.3 |
| Example 6-255 | EC:DMC:GBL (25:25:50) | 1.0 | 20 | 20 | 4.25 | 6.4 |

TABLE 75-continued

|  | nonaqueous solvent | concentration of $Li_2CO_3 + Li_2SO_4$ (wt %) | concentration of protic impurities (ppm) | moisture content (ppm) | upper limit voltage (V) | discharge capacity (mAh) |
| --- | --- | --- | --- | --- | --- | --- |
| Comparative Example 6-85 | EC:DMC:GBL (25:25:50) | 1.0 | 20 | 20 | 4.20 | 6.0 |
| Comparative Example 6-86 | EC:DMC:GBL (25:25:50) | 1.5 | 25 | 30 | 4.20 | 5.9 |
| Comparative Example 6-87 | EC:DMC:GBL (25:25:50) | 1.5 | 25 | 30 | 4.25 | 3.9 |

TABLE 76

|  | nonaqueous solvent | concentration of $Li_2CO_3 + Li_2SO_4$ (wt %) | concentration of protic impurities (ppm) | moisture content (ppm) | upper limit voltage (V) | discharge capacity (mAh) |
| --- | --- | --- | --- | --- | --- | --- |
| Example 6-256 | EC:DMC:GBL (25:25:50) | 1.0 | 25 | 30 | 4.30 | 6.4 |
| Example 6-257 | EC:DMC:GBL (25:25:50) | 1.5 | 20 | 30 | 4.30 | 6.5 |
| Example 6-258 | EC:DMC:GBL (25:25:50) | 1.5 | 25 | 20 | 4.30 | 6.5 |
| Example 6-259 | EC:DMC:GBL (25:25:50) | 1.0 | 20 | 30 | 4.30 | 6.6 |
| Example 6-260 | EC:DMC:GBL (25:25:50) | 1.0 | 20 | 20 | 4.30 | 6.7 |
| Comparative Example 6-88 | EC:DMC:GBL (25:25:50) | 1.5 | 25 | 30 | 4.30 | 4.0 |

TABLE 77

|  | nonaqueous solvent | concentration of $Li_2CO_3 + Li_2SO_4$ (wt %) | concentration of protic impurities (ppm) | moisture content (ppm) | upper limit voltage (V) | discharge capacity (mAh) |
| --- | --- | --- | --- | --- | --- | --- |
| Example 6-261 | EC:DMC:GBL (25:25:50) | 1.0 | 25 | 30 | 4.40 | 7.2 |
| Example 6-262 | EC:DMC:GBL (25:25:50) | 1.5 | 20 | 30 | 4.40 | 7.2 |
| Example 6-263 | EC:DMC:GBL (25:25:50) | 1.5 | 25 | 20 | 4.40 | 7.2 |
| Example 6-264 | EC:DMC:GBL (25:25:50) | 1.0 | 20 | 30 | 4.40 | 7.3 |
| Example 6-265 | EC:DMC:GBL (25:25:50) | 1.0 | 20 | 20 | 4.40 | 7.4 |
| Comparative Example 6-89 | EC:DMC:GBL (25:25:50) | 1.5 | 25 | 30 | 4.40 | 3.8 |

TABLE 78

|  | nonaqueous solvent | concentration of $Li_2CO_3 + Li_2SO_4$ (wt %) | concentration of protic impurities (ppm) | moisture content (ppm) | upper limit voltage (V) | discharge capacity (mAh) |
| --- | --- | --- | --- | --- | --- | --- |
| Example 6-266 | EC:DMC:GBL:VEC (19.6:19.6:58.8:2) | 1.0 | 25 | 30 | 4.25 | 7.3 |
| Example 6-267 | EC:DMC:GBL:VEC (19.6:19.6:58.8:2) | 1.5 | 20 | 30 | 4.25 | 7.3 |
| Example 6-268 | EC:DMC:GBL:VEC (19.6:19.6:58.8:2) | 1.5 | 25 | 20 | 4.25 | 7.3 |
| Example 6-269 | EC:DMC:GBL:VEC (19.6:19.6:58.8:2) | 1.0 | 20 | 30 | 4.25 | 7.3 |
| Example 6-270 | EC:DMC:GBL:VEC (19.6:19.6:58.8:2) | 1.0 | 20 | 20 | 4.25 | 7.4 |
| Comparative Example 6-90 | EC:DMC:GBL:VEC (19.6:19.6:58.8:2) | 1.0 | 20 | 20 | 4.20 | 7.2 |
| Comparative Example 6-91 | EC:DMC:GBL:VEC (19.6:19.6:58.8:2) | 1.5 | 25 | 30 | 4.20 | 7.1 |
| Comparative Example 6-92 | EC:DMC:GBL:VEC (19.6:19.6:58.8:2) | 1.5 | 25 | 30 | 4.25 | 4.6 |

TABLE 79

|  | nonaqueous solvent | concentration of $Li_2CO_3 + Li_2SO_4$ (wt %) | concentration of protic impurities (ppm) | moisture content (ppm) | upper limit voltage (V) | discharge capacity (mAh) |
| --- | --- | --- | --- | --- | --- | --- |
| Example 6-271 | EC:DMC:GBL:VEC (19.6:19.6:58.8:2) | 1.0 | 25 | 30 | 4.30 | 7.5 |
| Example 6-272 | EC:DMC:GBL:VEC (19.6:19.6:58.8:2) | 1.5 | 20 | 30 | 4.30 | 7.5 |
| Example 6-273 | EC:DMC:GBL:VEC (19.6:19.6:58.8:2) | 1.5 | 25 | 20 | 4.30 | 7.5 |
| Example 6-274 | EC:DMC:GBL:VEC (19.6:19.6:58.8:2) | 1.0 | 20 | 30 | 4.30 | 7.6 |
| Example 6-275 | EC:DMC:GBL:VEC (19.6:19.6:58.8:2) | 1.0 | 20 | 20 | 4.30 | 7.7 |
| Comparative Example 6-93 | EC:DMC:GBL:VEC (19.6:19.6:58.8:2) | 1.5 | 25 | 30 | 4.30 | 4.2 |

TABLE 80

| | nonaqueous solvent | concentration of $Li_2CO_3 + Li_2SO_4$ (wt %) | concentration of protic impurities (ppm) | moisture content (ppm) | upper limit voltage (V) | discharge capacity (mAh) |
|---|---|---|---|---|---|---|
| Example 6-276 | EC:DMC:GBL:VEC (19.6:19.6:58.8:2) | 1.0 | 25 | 30 | 4.40 | 7.7 |
| Example 6-277 | EC:DMC:GBL:VEC (19.6:19.6:58.8:2) | 1.5 | 20 | 30 | 4.40 | 7.6 |
| Example 6-278 | EC:DMC:GBL:VEC (19.6:19.6:58.8:2) | 1.5 | 25 | 20 | 4.40 | 7.7 |
| Example 6-279 | EC:DMC:GBL:VEC (19.6:19.6:58.8:2) | 1.0 | 20 | 30 | 4.40 | 7.8 |
| Example 6-280 | EC:DMC:GBL:VEC (19.6:19.6:58.8:2) | 1.0 | 20 | 20 | 4.40 | 7.9 |
| Comparative Example 6-94 | EC:DMC:GBL:VEC (19.6:19.6:58.8:2) | 1.5 | 25 | 30 | 4.40 | 4.3 |

TABLE 81

| | nonaqueous solvent (volume %) | concentration of $Li_2CO_3 + Li_2SO_4$ (wt %) | concentration of protic impurities (ppm) | moisture content (ppm) | upper limit voltage (V) | discharge capacity (mAh) |
|---|---|---|---|---|---|---|
| Example 6-281 | EC:DMC:GBL:VEC (19:19:57:5) | 1.0 | 25 | 30 | 4.25 | 7.3 |
| Example 6-282 | EC:DMC:GBL:VEC (19:19:57:5) | 1.5 | 20 | 30 | 4.25 | 7.3 |
| Example 6-283 | EC:DMC:GBL:VEC (19:19:57:5) | 1.5 | 25 | 20 | 4.25 | 7.3 |
| Example 6-284 | EC:DMC:GBL:VEC (19:19:57:5) | 1.0 | 20 | 30 | 4.25 | 7.3 |
| Example 6-285 | EC:DMC:GBL:VEC (19:19:57:5) | 1.0 | 20 | 20 | 4.25 | 7.4 |
| Comparative Example 6-95 | EC:DMC:GBL:VEC (19:19:57:5) | 1.0 | 20 | 20 | 4.20 | 7.2 |
| Comparative Example 6-96 | EC:DMC:GBL:VEC (19:19:57:5) | 1.5 | 25 | 30 | 4.20 | 7.1 |
| Comparative Example 6-97 | EC:DMC:GBL:VEC (19:19:57:5) | 1.5 | 25 | 30 | 4.25 | 4.5 |

TABLE 82

| | nonaqueous solvent (volume %) | concentration of $Li_2CO_3 + Li_2SO_4$ (wt %) | concentration of protic impurities (ppm) | moisture content (ppm) | upper limit voltage (V) | discharge capacity (mAh) |
|---|---|---|---|---|---|---|
| Example 6-286 | EC:DMC:GBL:VEC (19:19:57:5) | 1.0 | 25 | 30 | 4.30 | 7.5 |
| Example 6-287 | EC:DMC:GBL:VEC (19:19:57:5) | 1.5 | 20 | 30 | 4.30 | 7.4 |
| Example 6-288 | EC:DMC:GBL:VEC (19:19:57:5) | 1.5 | 25 | 20 | 4.30 | 7.5 |
| Example 6-289 | EC:DMC:GBL:VEC (19:19:57:5) | 1.0 | 20 | 30 | 4.30 | 7.6 |
| Example 6-290 | EC:DMC:GBL:VEC (19:19:57:5) | 1.0 | 20 | 20 | 4.30 | 7.7 |
| Comparative Example 6-98 | EC:DMC:GBL:VEC (19:19:57:5) | 1.5 | 25 | 30 | 4.30 | 4.1 |

TABLE 83

| | nonaqueous solvent (volume %) | concentration of $Li_2CO_3 + Li_2SO_4$ (wt %) | concentration of protic impurities (ppm) | moisture content (ppm) | upper limit voltage (V) | discharge capacity (mAh) |
|---|---|---|---|---|---|---|
| Example 6-291 | EC:DMC:GBL:VEC (19:19:57:5) | 1.0 | 25 | 30 | 4.40 | 7.7 |
| Example 6-292 | EC:DMC:GBL:VEC (19:19:57:5) | 1.5 | 20 | 30 | 4.40 | 7.7 |
| Example 6-293 | EC:DMC:GBL:VEC (19:19:57:5) | 1.5 | 25 | 20 | 4.40 | 7.7 |
| Example 6-294 | EC:DMC:GBL:VEC (19:19:57:5) | 1.0 | 20 | 30 | 4.40 | 7.8 |
| Example 6-295 | EC:DMC:GBL:VEC (19:19:57:5) | 1.0 | 20 | 20 | 4.40 | 7.9 |
| Comparative Example 6-99 | EC:DMC:GBL:VEC (19:19:57:5) | 1.5 | 25 | 30 | 4.40 | 4.2 |

TABLE 84

| | nonaqueous solvent (volume %) | concentration of $Li_2CO_3 + Li_2SO_4$ (wt %) | concentration of protic impurities (ppm) | moisture content (ppm) | upper limit voltage (V) | discharge capacity (mAh) |
|---|---|---|---|---|---|---|
| Example 6-296 | EC:DMC:GBL:VEC (18:18:54:10) | 1.0 | 25 | 30 | 4.25 | 7.2 |
| Example 6-297 | EC:DMC:GBL:VEC (18:18:54:10) | 1.5 | 20 | 30 | 4.25 | 7.2 |
| Example 6-298 | EC:DMC:GBL:VEC (18:18:54:10) | 1.5 | 25 | 20 | 4.25 | 7.2 |
| Example 6-299 | EC:DMC:GBL:VEC (18:18:54:10) | 1.0 | 20 | 30 | 4.25 | 7.2 |
| Example 6-300 | EC:DMC:GBL:VEC (18:18:54:10) | 1.0 | 20 | 20 | 4.25 | 7.3 |

TABLE 84-continued

|  | nonaqueous solvent (volume %) | concentration of $Li_2CO_3 + Li_2SO_4$ (wt %) | concentration of protic impurities (ppm) | moisture content (ppm) | upper limit voltage (V) | discharge capacity (mAh) |
|---|---|---|---|---|---|---|
| Comparative Example 6-100 | EC:DMC:GBL:VEC (18:18:54:10) | 1.0 | 20 | 20 | 4.20 | 7.0 |
| Comparative Example 6-101 | EC:DMC:GBL:VEC (18:18:54:10) | 1.5 | 25 | 30 | 4.20 | 6.9 |
| Comparative Example 6-102 | EC:DMC:GBL:VEC (18:18:54:10) | 1.5 | 25 | 30 | 4.25 | 4.2 |

TABLE 85

|  | nonaqueous solvent (volume %) | concentration of $Li_2CO_3 + Li_2SO_4$ (wt %) | concentration of protic impurities (ppm) | moisture content (ppm) | upper limit voltage (V) | discharge capacity (mAh) |
|---|---|---|---|---|---|---|
| Example 6-301 | EC:DMC:GBL:VEC (18:18:54:10) | 1.0 | 25 | 30 | 4.30 | 7.4 |
| Example 6-302 | EC:DMC:GBL:VEC (18:18:54:10) | 1.5 | 20 | 30 | 4.30 | 7.3 |
| Example 6-303 | EC:DMC:GBL:VEC (18:18:54:10) | 1.5 | 25 | 20 | 4.30 | 7.3 |
| Example 6-304 | EC:DMC:GBL:VEC (18:18:54:10) | 1.0 | 20 | 30 | 4.30 | 7.4 |
| Example 6-305 | EC:DMC:GBL:VEC (18:18:54:10) | 1.0 | 20 | 20 | 4.30 | 7.5 |
| Comparative Example 6-103 | EC:DMC:GBL:VEC (18:18:54:10) | 1.5 | 25 | 30 | 4.30 | 4.0 |

TABLE 86

|  | nonaqueous solvent | concentration of $Li_2CO_3 + Li_2SO_4$ (wt %) | concentration of protic impurities (ppm) | moisture content (ppm) | upper limit voltage (V) | discharge capacity (mAh) |
|---|---|---|---|---|---|---|
| Example 6-306 | EC:DMC:GBL:VEC (18:18:54:10) | 1.0 | 25 | 30 | 4.40 | 7.5 |
| Example 6-307 | EC:DMC:GBL:VEC (18:18:54:10) | 1.5 | 20 | 30 | 4.40 | 7.5 |
| Example 6-308 | EC:DMC:GBL:VEC (18:18:54:10) | 1.5 | 25 | 20 | 4.40 | 7.5 |
| Example 6-309 | EC:DMC:GBL:VEC (18:18:54:10) | 1.0 | 20 | 30 | 4.40 | 7.5 |
| Example 6-310 | EC:DMC:GBL:VEC (18:18:54:10) | 1.0 | 20 | 20 | 4.40 | 7.6 |
| Comparative Example 6-104 | EC:DMC:GBL:VEC (18:18:54:10) | 1.5 | 25 | 30 | 4.40 | 4.0 |

TABLE 87

|  | nonaqueous solvent (volume %) | concentration of $Li_2CO_3 + Li_2SO_4$ (wt %) | concentration of protic impurities (ppm) | moisture content (ppm) | upper limit voltage (V) | discharge capacity (mAh) |
|---|---|---|---|---|---|---|
| Example 6-311 | EC:DMC:GBL:VC (19.6:19.6:58.8:2) | 1.0 | 25 | 30 | 4.25 | 7.3 |
| Example 6-312 | EC:DMC:GBL:VC (19.6:19.6:58.8:2) | 1.5 | 20 | 30 | 4.25 | 7.2 |
| Example 6-313 | EC:DMC:GBL:VC (19.6:19.6:58.8:2) | 1.5 | 25 | 20 | 4.25 | 7.2 |
| Example 6-314 | EC:DMC:GBL:VC (19.6:19.6:58.8:2) | 1.0 | 20 | 30 | 4.25 | 7.3 |
| Example 6-315 | EC:DMC:GBL:VC (19.6:19.6:58.8:2) | 1.0 | 20 | 20 | 4.25 | 7.4 |
| Comparative Example 6-105 | EC:DMC:GBL:VC (19.6:19.6:58.8:2) | 1.0 | 20 | 20 | 4.20 | 7.2 |
| Comparative Example 6-106 | EC:DMC:GBL:VC (19.6:19.6:58.8:2) | 1.5 | 25 | 30 | 4.20 | 7.1 |
| Comparative Example 6-107 | EC:DMC:GBL:VC (19.6:19.6:58.8:2) | 1.5 | 25 | 30 | 4.25 | 4.6 |

TABLE 88

|  | nonaqueous solvent (volume %) | concentration of $Li_2CO_3 + Li_2SO_4$ (wt %) | concentration of protic impurities (ppm) | moisture content (ppm) | upper limit voltage (V) | discharge capacity (mAh) |
|---|---|---|---|---|---|---|
| Example 6-316 | EC:DMC:GBL:VC (19.6:19.6:58.8:2) | 1.0 | 25 | 30 | 4.30 | 7.5 |
| Example 6-317 | EC:DMC:GBL:VC (19.6:19.6:58.8:2) | 1.5 | 20 | 30 | 4.30 | 7.4 |
| Example 6-318 | EC:DMC:GBL:VC (19.6:19.6:58.8:2) | 1.5 | 25 | 20 | 4.30 | 7.4 |
| Example 6-319 | EC:DMC:GBL:VC (19.6:19.6:58.8:2) | 1.0 | 20 | 30 | 4.30 | 7.5 |
| Example 6-320 | EC:DMC:GBL:VC (19.6:19.6:58.8:2) | 1.0 | 20 | 20 | 4.30 | 7.7 |
| Comparative Example 6-108 | EC:DMC:GBL:VC (19.6:19.6:58.8:2) | 1.5 | 25 | 30 | 4.30 | 4.1 |

TABLE 89

|  | nonaqueous solvent (volume %) | concentration of $Li_2CO_3 + Li_2SO_4$ (wt %) | concentration of protic impurities (ppm) | moisture content (ppm) | upper limit voltage (V) | discharge capacity (mAh) |
|---|---|---|---|---|---|---|
| Example 6-321 | EC:DMC:GBL:VC (19.6:19.6:58.8:2) | 1.0 | 25 | 30 | 4.40 | 7.7 |
| Example 6-322 | EC:DMC:GBL:VC (19.6:19.6:58.8:2) | 1.5 | 20 | 30 | 4.40 | 7.6 |
| Example 6-323 | EC:DMC:GBL:VC (19.6:19.6:58.8:2) | 1.5 | 25 | 20 | 4.40 | 7.6 |
| Example 6-324 | EC:DMC:GBL:VC (19.6:19.6:58.8:2) | 1.0 | 20 | 30 | 4.40 | 7.7 |
| Example 6-325 | EC:DMC:GBL:VC (19.6:19.6:58.8:2) | 1.0 | 20 | 20 | 4.40 | 7.9 |
| Comparative Example 6-109 | EC:DMC:GBL:VC (19.6:19.6:58.8:2) | 1.5 | 25 | 30 | 4.40 | 4.2 |

TABLE 90

|  | nonaqueous solvent (volume %) | concentration of $Li_2CO_3 + Li_2SO_4$ (wt %) | concentration of protic impurities (ppm) | moisture content (ppm) | upper limit voltage (V) | discharge capacity (mAh) |
|---|---|---|---|---|---|---|
| Example 6-326 | EC:DMC:GBL:VC (19:19:57:5) | 1.0 | 25 | 30 | 4.25 | 7.3 |
| Example 6-327 | EC:DMC:GBL:VC (19:19:57:5) | 1.5 | 20 | 30 | 4.25 | 7.3 |
| Example 6-328 | EC:DMC:GBL:VC (19:19:57:5) | 1.5 | 25 | 20 | 4.25 | 7.3 |
| Example 6-329 | EC:DMC:GBL:VC (19:19:57:5) | 1.0 | 20 | 30 | 4.25 | 7.3 |
| Example 6-330 | EC:DMC:GBL:VC (19:19:57:5) | 1.0 | 20 | 20 | 4.25 | 7.4 |
| Comparative Example 6-110 | EC:DMC:GBL:VC (19:19:57:5) | 1.0 | 20 | 20 | 4.20 | 7.1 |
| Comparative Example 6-111 | EC:DMC:GBL:VC (19:19:57:5) | 1.5 | 25 | 30 | 4.20 | 7.0 |
| Comparative Example 6-112 | EC:DMC:GBL:VC (19:19:57:5) | 1.5 | 25 | 30 | 4.25 | 4.5 |

TABLE 91

|  | nonaqueous solvent (volume %) | concentration of $Li_2CO_3 + Li_2SO_4$ (wt %) | concentration of protic impurities (ppm) | moisture content (ppm) | upper limit voltage (V) | discharge capacity (mAh) |
|---|---|---|---|---|---|---|
| Example 6-331 | EC:DMC:GBL:VC (19:19:57:5) | 1.0 | 25 | 30 | 4.30 | 7.5 |
| Example 6-332 | EC:DMC:GBL:VC (19:19:57:5) | 1.5 | 20 | 30 | 4.30 | 7.5 |
| Example 6-333 | EC:DMC:GBL:VC (19:19:57:5) | 1.5 | 25 | 20 | 4.30 | 7.5 |
| Example 6-334 | EC:DMC:GBL:VC (19:19:57:5) | 1.0 | 20 | 30 | 4.30 | 7.6 |
| Example 6-335 | EC:DMC:GBL:VC (19:19:57:5) | 1.0 | 20 | 20 | 4.30 | 7.7 |
| Comparative Example 6-113 | EC:DMC:GBL:VC (19:19:57:5) | 1.5 | 25 | 30 | 4.30 | 4.1 |

TABLE 92

|  | nonaqueous solvent (volume %) | concentration of $Li_2CO_3 + Li_2SO_4$ (wt %) | concentration of protic impurities (ppm) | moisture content (ppm) | upper limit voltage (V) | discharge capacity (mAh) |
|---|---|---|---|---|---|---|
| Example 6-336 | EC:DMC:GBL:VC (19:19:57:5) | 1.0 | 25 | 30 | 4.40 | 7.7 |
| Example 6-337 | EC:DMC:GBL:VC (19:19:57:5) | 1.5 | 20 | 30 | 4.40 | 7.7 |
| Example 6-338 | EC:DMC:GBL:VC (19:19:57:5) | 1.5 | 25 | 20 | 4.40 | 7.7 |
| Example 6-339 | EC:DMC:GBL:VC (19:19:57:5) | 1.0 | 20 | 30 | 4.40 | 7.7 |
| Example 6-340 | EC:DMC:GBL:VC (19:19:57:5) | 1.0 | 20 | 20 | 4.40 | 7.8 |
| Comparative Example 6-114 | EC:DMC:GBL:VC (19:19:57:5) | 1.5 | 25 | 30 | 4.40 | 4.1 |

TABLE 93

|  | nonaqueous solvent (volume %) | concentration of $Li_2CO_3 + Li_2SO_4$ (wt %) | concentration of protic impurities (ppm) | moisture content (ppm) | upper limit voltage (V) | discharge capacity (mAh) |
|---|---|---|---|---|---|---|
| Example 6-341 | EC:DMC:GBL:VC (18:18:54:10) | 1.0 | 25 | 30 | 4.25 | 7.2 |
| Example 6-342 | EC:DMC:GBL:VC (18:18:54:10) | 1.5 | 20 | 30 | 4.25 | 7.2 |
| Example 6-343 | EC:DMC:GBL:VC (18:18:54:10) | 1.5 | 25 | 20 | 4.25 | 7.2 |
| Example 6-344 | EC:DMC:GBL:VC (18:18:54:10) | 1.0 | 20 | 30 | 4.25 | 7.2 |

TABLE 93-continued

|  | nonaqueous solvent (volume %) | concentration of Li$_2$CO$_3$ + Li$_2$SO$_4$ (wt %) | concentration of protic impurities (ppm) | moisture content (ppm) | upper limit voltage (V) | discharge capacity (mAh) |
| --- | --- | --- | --- | --- | --- | --- |
| Example 6-345 | EC:DMC:GBL:VC (18:18:54:10) | 1.0 | 20 | 20 | 4.25 | 7.3 |
| Comparative Example 6-115 | EC:DMC:GBL:VC (18:18:54:10) | 1.0 | 20 | 20 | 4.20 | 6.9 |
| Comparative Example 6-116 | EC:DMC:GBL:VC (18:18:54:10) | 1.5 | 25 | 30 | 4.20 | 6.9 |
| Comparative Example 6-117 | EC:DMC:GBL:VC (18:18:54:10) | 1.5 | 25 | 30 | 4.25 | 4.5 |

TABLE 94

|  | nonaqueous solvent (volume %) | concentration of Li$_2$CO$_3$ + Li$_2$SO$_4$ (wt %) | concentration of protic impurities (ppm) | moisture content (ppm) | upper limit voltage (V) | discharge capacity (mAh) |
| --- | --- | --- | --- | --- | --- | --- |
| Example 6-346 | EC:DMC:GBL:VC (18:18:54:10) | 1.0 | 25 | 30 | 4.30 | 7.4 |
| Example 6-347 | EC:DMC:GBL:VC (18:18:54:10) | 1.5 | 20 | 30 | 4.30 | 7.3 |
| Example 6-348 | EC:DMC:GBL:VC (18:18:54:10) | 1.5 | 25 | 20 | 4.30 | 7.3 |
| Example 6-349 | EC:DMC:GBL:VC (18:18:54:10) | 1.0 | 20 | 30 | 4.30 | 7.3 |
| Example 6-350 | EC:DMC:GBL:VC (18:18:54:10) | 1.0 | 20 | 20 | 4.30 | 7.5 |
| Comparative Example 6-118 | EC:DMC:GBL:VC (18:18:54:10) | 1.5 | 25 | 30 | 4.30 | 4.0 |

TABLE 95

|  | nonaqueous solvent (volume %) | concentration of Li$_2$CO$_3$ + Li$_2$SO$_4$ (wt %) | concentration of protic impurities (ppm) | moisture content (ppm) | upper limit voltage (V) | discharge capacity (mAh) |
| --- | --- | --- | --- | --- | --- | --- |
| Example 6-351 | EC:DMC:GBL:VC (18:18:54:10) | 1.0 | 25 | 30 | 4.40 | 7.5 |
| Example 6-352 | EC:DMC:GBL:VC (18:18:54:10) | 1.5 | 20 | 30 | 4.40 | 7.4 |
| Example 6-353 | EC:DMC:GBL:VC (18:18:54:10) | 1.5 | 25 | 20 | 4.40 | 7.5 |
| Example 6-354 | EC:DMC:GBL:VC (18:18:54:10) | 1.0 | 20 | 30 | 4.40 | 7.6 |
| Example 6-355 | EC:DMC:GBL:VC (18:18:54:10) | 1.0 | 20 | 20 | 4.40 | 7.6 |
| Comparative Example 6-119 | EC:DMC:GBL:VC (18:18:54:10) | 1.5 | 25 | 30 | 4.40 | 4.0 |

TABLE 96

|  | cathode active material | anode active material | lithium salt | concentration of Li$_2$CO$_3$ + Li$_2$SO$_4$ (wt %) | concentration of protic impurities (ppm) | moisture content (ppm) | upper limit voltage (V) | discharge capacity retention ratio (%) |
| --- | --- | --- | --- | --- | --- | --- | --- | --- |
| Example 7-1 | LiCoO$_2$ | Li metal | LiPF$_6$ | 1.0 | 20 | 20 | 4.30 | 55 |
| Comparative Example 7-1 | LiCoO$_2$ | Li metal | LiPF$_6$ | 1.5 | 25 | 30 | 4.30 | 53 |

TABLE 97

|  | cathode active material | anode active material | lithium salt | concentration of Li$_2$CO$_3$ + Li$_2$SO$_4$ (wt %) | concentration of protic impurities (ppm) | moisture content (ppm) | upper limit voltage (V) | discharge capacity retention ratio (%) |
| --- | --- | --- | --- | --- | --- | --- | --- | --- |
| Example 7-2 | LiCoO$_2$ | non-graphitizable carbon | LiPF$_6$ | 1.0 | 20 | 20 | 4.30 | 84 |
| Comparative Example 7-2 | LiCoO$_2$ | non-graphitizable carbon | LiPF$_6$ | 1.5 | 25 | 30 | 4.30 | 79 |

TABLE 98

| | cathode active material | anode active material | lithium salt | concentration of Li$_2$CO$_3$ + Li$_2$SO$_4$ (wt %) | concentration of protic impurities (ppm) | moisture content (ppm) | upper limit voltage (V) | discharge capacity retention ratio (%) |
|---|---|---|---|---|---|---|---|---|
| Example 7-3 | LiCoO$_2$ | non-graphitizable carbon | LiPF$_6$ | 1.0 | 20 | 20 | 4.30 | 96 |
| Comparative Example 7-3 | LiCoO$_2$ | non-graphitizable carbon | LiPF$_6$ | 1.5 | 25 | 30 | 4.30 | 90 |

TABLE 99

| | cathode active material | concentration of Li$_2$CO$_3$ + Li$_2$SO$_4$ (wt %) | concentration of protic impurities (ppm) | moisture content (ppm) | upper limit voltage (V) | discharge capacity retention ratio (%) | | |
|---|---|---|---|---|---|---|---|---|
| | | | | | | 10 cycles | 50 cycles | 100 cycles |
| Example 8-1 | LiCoO$_2$ | 1.0 | 20 | 20 | 4.25 | 98.5 | 94.8 | 91.0 |
| Example 8-2 | LiCoO$_2$ | 1.5 | 20 | 20 | 4.25 | 98.3 | 94.1 | 90.2 |
| Example 8-3 | LiCoO$_2$ | 1.0 | 25 | 20 | 4.25 | 98.4 | 94.0 | 90.0 |
| Example 8-4 | LiCoO$_2$ | 1.0 | 20 | 30 | 4.25 | 98.3 | 94.0 | 89.9 |
| Comparative Example 8-1 | LiCoO$_2$ | 1.0 | 20 | 20 | 4.20 | 98.9 | 96.5 | 93.0 |
| Comparative Example 8-2 | LiCoO$_2$ | 1.5 | 20 | 20 | 4.20 | 98.8 | 96.4 | 93.1 |
| Comparative Example 8-3 | LiCoO$_2$ | 1.0 | 25 | 20 | 4.20 | 98.7 | 96.0 | 92.1 |
| Comparative Example 8-4 | LiCoO$_2$ | 1.0 | 20 | 30 | 4.20 | 98.7 | 96.0 | 92.0 |
| Comparative Example 8-5 | LiCoO$_2$ | 1.5 | 25 | 30 | 4.20 | 98.0 | 95.5 | 91.5 |
| Comparative Example 8-6 | LiCoO$_2$ | 1.5 | 25 | 30 | 4.25 | 98.2 | 93.2 | 88.2 |

TABLE 100

| | cathode active material | concentration of Li$_2$CO$_3$ + Li$_2$SO$_4$ (wt %) | concentration of protic impurities (ppm) | moisture content (ppm) | upper limit voltage (V) | discharge capacity retention ratio (%) | | |
|---|---|---|---|---|---|---|---|---|
| | | | | | | 10 cycles | 50 cycles | 100 cycles |
| Example 8-5 | LiCoO$_2$ | 1.0 | 20 | 20 | 4.30 | 98.4 | 94.8 | 91.0 |
| Example 8-6 | LiCoO$_2$ | 1.5 | 20 | 20 | 4.30 | 98.2 | 94.0 | 90.1 |
| Example 8-7 | LiCoO$_2$ | 1.0 | 25 | 20 | 4.30 | 98.2 | 94.0 | 90.0 |
| Example 8-8 | LiCoO$_2$ | 1.0 | 20 | 30 | 4.30 | 98.2 | 94.0 | 89.8 |
| Comparative Example 8-7 | LiCoO$_2$ | 1.5 | 25 | 30 | 4.30 | 98.1 | 93.1 | 88.1 |

TABLE 101

| | cathode active material | concentration of Li$_2$CO$_3$ + Li$_2$SO$_4$ (wt %) | concentration of protic impurities (ppm) | moisture content (ppm) | upper limit voltage (V) | discharge capacity retention ratio (%) | | |
|---|---|---|---|---|---|---|---|---|
| | | | | | | 10 cycles | 50 cycles | 100 cycles |
| Example 8-9 | LiCoO$_2$ | 1.0 | 20 | 20 | 4.40 | 96.4 | 89.4 | 86.3 |
| Example 8-10 | LiCoO$_2$ | 1.5 | 20 | 20 | 4.40 | 95.1 | 88.1 | 82.2 |
| Example 8-11 | LiCoO$_2$ | 1.0 | 25 | 20 | 4.40 | 95.6 | 89.1 | 83.8 |
| Example 8-12 | LiCoO$_2$ | 1.0 | 20 | 30 | 4.40 | 95.6 | 89.3 | 83.5 |
| Comparative Example 8-8 | LiCoO$_2$ | 1.5 | 25 | 30 | 4.40 | 93.0 | 87.1 | 78.7 |

TABLE 102

| | cathode active material | concentration of Li$_2$CO$_3$ + Li$_2$SO$_4$ (wt %) | concentration of protic impurities (ppm) | moisture content (ppm) | upper limit voltage (V) | discharge capacity retention ratio (%) | | |
|---|---|---|---|---|---|---|---|---|
| | | | | | | 10 cycles | 50 cycles | 100 cycles |
| Example 8-13 | LiCoO$_2$ | 1.0 | 20 | 20 | 4.50 | 92.4 | 86.4 | 76.3 |
| Example 8-14 | LiCoO$_2$ | 1.5 | 20 | 20 | 4.50 | 90.1 | 83.1 | 71.2 |
| Example 8-15 | LiCoO$_2$ | 1.0 | 25 | 20 | 4.50 | 90.0 | 83.2 | 71.0 |

TABLE 102-continued

|  | cathode active material | concentration of Li$_2$CO$_3$ + Li$_2$SO$_4$ (wt %) | concentration of protic impurities (ppm) | moisture content (ppm) | upper limit voltage (V) | discharge capacity retention ratio (%) | | |
| --- | --- | --- | --- | --- | --- | --- | --- | --- |
|  |  |  |  |  |  | 10 cycles | 50 cycles | 100 cycles |
| Example 8-16 | LiCoO$_2$ | 1.0 | 20 | 30 | 4.50 | 89.9 | 83.3 | 70.8 |
| Comparative Example 8-9 | LiCoO$_2$ | 1.5 | 25 | 30 | 4.50 | 88.8 | 82.1 | 68.7 |

TABLE 103

|  | cathode active material | concentration of Li$_2$CO$_3$ + Li$_2$SO$_4$ (wt %) | concentration of protic impurities (ppm) | moisture content (ppm) | upper limit voltage (V) | discharge capacity retention ratio (%) | | |
| --- | --- | --- | --- | --- | --- | --- | --- | --- |
|  |  |  |  |  |  | 10 cycles | 50 cycles | 100 cycles |
| Example 8-17 | LiNiO$_2$ | 1.0 | 20 | 20 | 4.25 | 95.0 | 93.2 | 90.5 |
| Example 8-18 | LiNiO$_2$ | 1.5 | 20 | 20 | 4.25 | 95.0 | 92.8 | 89.6 |
| Example 8-19 | LiNiO$_2$ | 1.0 | 25 | 20 | 4.25 | 95.0 | 92.7 | 89.5 |
| Example 8-20 | LiNiO$_2$ | 1.0 | 20 | 30 | 4.25 | 94.9 | 92.6 | 89.2 |
| Comparative Example 8-10 | LiNiO$_2$ | 1.0 | 20 | 20 | 4.20 | 95.0 | 93.5 | 920 |
| Comparative Example 8-11 | LiNiO$_2$ | 1.5 | 20 | 20 | 4.20 | 95.0 | 93.6 | 92.0 |
| Comparative Example 8-12 | LiNiO$_2$ | 1.0 | 25 | 20 | 4.20 | 94.9 | 93.3 | 91.9 |
| Comparative Example 8-13 | LiNiO$_2$ | 1.0 | 20 | 30 | 4.20 | 94.9 | 93.2 | 91.8 |
| Comparative Example 8-14 | LiNiO$_2$ | 1.5 | 25 | 30 | 4.20 | 94.5 | 92.8 | 90.2 |
| Comparative Example 8-15 | LiNiO$_2$ | 1.5 | 25 | 30 | 4.25 | 94.6 | 91.6 | 87.6 |

TABLE 104

|  | cathode active material | concentration of Li$_2$CO$_3$ + Li$_2$SO$_4$ (wt %) | concentration of protic impurities (ppm) | moisture content (ppm) | upper limit voltage (V) | discharge capacity retention ratio (%) | | |
| --- | --- | --- | --- | --- | --- | --- | --- | --- |
|  |  |  |  |  |  | 10 cycles | 50 cycles | 100 cycles |
| Example 8-21 | LiNiO$_2$ | 1.0 | 20 | 20 | 4.30 | 94.9 | 930 | 90.3 |
| Example 8-22 | LiNiO$_2$ | 1.5 | 20 | 20 | 4.30 | 94.8 | 92.5 | 89.5 |
| Example 8-23 | LiNiO$_2$ | 1.0 | 25 | 20 | 4.30 | 94.8 | 92.4 | 89.5 |
| Example 8-24 | LiNiO$_2$ | 1.0 | 20 | 30 | 4.30 | 94.8 | 92.4 | 89.1 |
| Comparative Example 8-16 | LiNiO$_2$ | 1.5 | 25 | 30 | 4.30 | 94.4 | 91.4 | 87.5 |

TABLE 105

|  | cathode active material | concentration of Li$_2$CO$_3$ + Li$_2$SO$_4$ (wt %) | concentration of protic impurities (ppm) | moisture content (ppm) | upper limit voltage (V) | discharge capacity retention ratio (%) | | |
| --- | --- | --- | --- | --- | --- | --- | --- | --- |
|  |  |  |  |  |  | 10 cycles | 50 cycles | 100 cycles |
| Example 8-25 | LiNiO$_2$ | 1.0 | 20 | 20 | 4.40 | 94.2 | 86.2 | 82.6 |
| Example 8-26 | LiNiO$_2$ | 1.5 | 20 | 20 | 4.40 | 93.5 | 83.9 | 81.1 |
| Example 8-27 | LiNiO$_2$ | 1.0 | 25 | 20 | 4.40 | 94.0 | 85.1 | 81.8 |
| Example 8-28 | LiNiO$_2$ | 1.0 | 20 | 30 | 4.40 | 93.9 | 85.3 | 81.2 |
| Comparative Example 8-17 | LiNiO$_2$ | 1.5 | 25 | 30 | 4.40 | 93.0 | 83.3 | 76.9 |

TABLE 106

|  | cathode active material | concentration of Li$_2$CO$_3$ + Li$_2$SO$_4$ (wt %) | concentration of protic impurities (ppm) | moisture content (ppm) | upper limit voltage (V) | discharge capacity retention ratio (%) | | |
| --- | --- | --- | --- | --- | --- | --- | --- | --- |
|  |  |  |  |  |  | 10 cycles | 50 cycles | 100 cycles |
| Example 8-29 | LiNiO$_2$ | 1.0 | 20 | 20 | 4.50 | 90.2 | 84.2 | 70.6 |
| Example 8-30 | LiNiO$_2$ | 1.5 | 20 | 20 | 4.50 | 88.8 | 81.9 | 70.1 |
| Example 8-31 | LiNiO$_2$ | 1.0 | 25 | 20 | 4.50 | 89.2 | 82.1 | 69.8 |
| Example 8-32 | LiNiO$_2$ | 1.0 | 20 | 30 | 4.50 | 89.4 | 82.3 | 70.0 |
| Comparative Example 8-18 | LiNiO$_2$ | 1.5 | 25 | 30 | 4.50 | 85.1 | 80.3 | 66.9 |

TABLE 107

| | cathode active material | concentration of $Li_2CO_3 + Li_2SO_4$ (wt %) | concentration of protic impurities (ppm) | moisture content (ppm) | upper limit voltage (V) | discharge capacity retention ratio (%) | | |
|---|---|---|---|---|---|---|---|---|
| | | | | | | 10 cycles | 50 cycles | 100 cycles |
| Example 8-33 | $LiCo_{0.9}Ni_{0.1}O_2$ | 1.0 | 20 | 20 | 4.25 | 99.0 | 96.0 | 93.1 |
| Example 8-34 | $LiCo_{0.9}Ni_{0.1}O_2$ | 1.5 | 20 | 20 | 4.25 | 98.7 | 95.1 | 92.0 |
| Example 8-35 | $LiCo_{0.9}Ni_{0.1}O_2$ | 1.0 | 25 | 20 | 4.25 | 98.7 | 95.2 | 92.0 |
| Example 8-36 | $LiCo_{0.9}Ni_{0.1}O_2$ | 1.0 | 20 | 30 | 4.25 | 98.8 | 95.1 | 92.0 |
| Comparative Example 8-19 | $LiCo_{0.9}Ni_{0.1}O_2$ | 1.0 | 20 | 20 | 4.20 | 99.0 | 96.2 | 93.2 |
| Comparative Example 8-20 | $LiCo_{0.9}Ni_{0.1}O_2$ | 1.5 | 20 | 20 | 4.20 | 99.0 | 96.1 | 93.3 |
| Comparative Example 8-21 | $LiCo_{0.9}Ni_{0.1}O_2$ | 1.0 | 25 | 20 | 4.20 | 99.0 | 96.0 | 93.2 |
| Comparative Example 8-22 | $LiCo_{0.9}Ni_{0.1}O_2$ | 1.0 | 20 | 30 | 4.20 | 99.0 | 96.1 | 93.1 |
| Comparative Example 8-23 | $LiCo_{0.9}Ni_{0.1}O_2$ | 1.5 | 25 | 30 | 4.20 | 98.8 | 95.9 | 92.7 |
| Comparative Example 8-24 | $LiCo_{0.9}Ni_{0.1}O_2$ | 1.5 | 25 | 30 | 4.25 | 98.5 | 94.9 | 91.2 |

TABLE 108

| | cathode active material | concentration of $Li_2CO_3 + Li_2SO_4$ (wt %) | concentration of protic impurities (ppm) | moisture content (ppm) | upper limit voltage (V) | discharge capacity retention ratio (%) | | |
|---|---|---|---|---|---|---|---|---|
| | | | | | | 10 cycles | 50 cycles | 100 cycles |
| Example 8-37 | $LiCo_{0.9}Ni_{0.1}O_2$ | 1.0 | 20 | 20 | 4.30 | 99.0 | 96.0 | 93.0 |
| Example 8-38 | $LiCo_{0.9}Ni_{0.1}O_2$ | 1.5 | 20 | 20 | 4.30 | 98.7 | 95.0 | 92.0 |
| Example 8-39 | $LiCo_{0.9}Ni_{0.1}O_2$ | 1.0 | 25 | 20 | 4.30 | 98.6 | 95.1 | 92.0 |
| Example 8-40 | $LiCo_{0.9}Ni_{0.1}O_2$ | 1.0 | 20 | 30 | 4.30 | 98.6 | 95.0 | 92.0 |
| Comparative Example 8-25 | $LiCo_{0.9}Ni_{0.1}O_2$ | 1.5 | 25 | 30 | 4.30 | 98.3 | 94.7 | 91.0 |

TABLE 109

| | cathode active material | concentration of $Li_2CO_3 + Li_2SO_4$ (wt %) | concentration of protic impurities (ppm) | moisture content (ppm) | upper limit voltage (V) | discharge capacity retention ratio (%) | | |
|---|---|---|---|---|---|---|---|---|
| | | | | | | 10 cycles | 50 cycles | 100 cycles |
| Example 8-41 | $LiCo_{0.9}Ni_{0.1}O_2$ | 1.0 | 20 | 20 | 4.40 | 96.5 | 93.0 | 88.7 |
| Example 8-42 | $LiCo_{0.9}Ni_{0.1}O_2$ | 1.5 | 20 | 20 | 4.40 | 94.3 | 92.5 | 86.6 |
| Example 8-43 | $LiCo_{0.9}Ni_{0.1}O_2$ | 1.0 | 25 | 20 | 4.40 | 94.5 | 92.7 | 87.7 |
| Example 8-44 | $LiCo_{0.9}Ni_{0.1}O_2$ | 1.0 | 20 | 30 | 4.40 | 95.1 | 92.9 | 88.1 |
| Comparative Example 8-26 | $LiCo_{0.9}Ni_{0.1}O_2$ | 1.5 | 25 | 30 | 4.40 | 93.0 | 90.0 | 79.2 |

TABLE 110

| | cathode active material | concentration of $Li_2CO_3 + Li_2SO_4$ (wt %) | concentration of protic impurities (ppm) | moisture content (ppm) | upper limit voltage (V) | discharge capacity retention ratio (%) | | |
|---|---|---|---|---|---|---|---|---|
| | | | | | | 10 cycles | 50 cycles | 100 cycles |
| Example 8-45 | $LiCo_{0.9}Ni_{0.1}O_2$ | 1.0 | 20 | 20 | 4.50 | 94.5 | 89.0 | 82.7 |
| Example 8-46 | $LiCo_{0.9}Ni_{0.1}O_2$ | 1.5 | 20 | 20 | 4.50 | 91.3 | 87.5 | 76.6 |
| Example 8-47 | $LiCo_{0.9}Ni_{0.1}O_2$ | 1.0 | 25 | 20 | 4.50 | 92.5 | 88.7 | 77.7 |
| Example 8-48 | $LiCo_{0.9}Ni_{0.1}O_2$ | 1.0 | 20 | 30 | 4.50 | 93.1 | 88.9 | 78.1 |
| Comparative Example 8-27 | $LiCo_{0.9}Ni_{0.1}O_2$ | 1.5 | 25 | 30 | 4.50 | 91.0 | 87.0 | 72.2 |

TABLE 111

| | cathode active material | concentration of $Li_2CO_3 + Li_2SO_4$ (wt %) | concentration of protic impurities (ppm) | moisture content (ppm) | upper limit voltage (V) | discharge capacity retention ratio (%) | | |
|---|---|---|---|---|---|---|---|---|
| | | | | | | 10 cycles | 50 cycles | 100 cycles |
| Example 8-49 | $LiCo_{0.8}Ni_{0.15}Al_{0.05}O_2$ | 1.0 | 20 | 20 | 4.25 | 99.0 | 96.2 | 92.5 |
| Example 8-50 | $LiCo_{0.8}Ni_{0.15}Al_{0.05}O_2$ | 1.5 | 20 | 20 | 4.25 | 98.6 | 95.3 | 91.2 |
| Example 8-51 | $LiCo_{0.8}Ni_{0.15}Al_{0.05}O_2$ | 1.0 | 25 | 20 | 4.25 | 98.6 | 95.3 | 91.3 |

TABLE 111-continued

| | cathode active material | concentration of Li$_2$CO$_3$ + Li$_2$SO$_4$ (wt %) | concentration of protic impurities (ppm) | moisture content (ppm) | upper limit voltage (V) | discharge capacity retention ratio (%) | | |
|---|---|---|---|---|---|---|---|---|
| | | | | | | 10 cycles | 50 cycles | 100 cycles |
| Example 8-52 | LiCo$_{0.8}$Ni$_{0.15}$Al$_{0.05}$O$_2$ | 1.0 | 20 | 30 | 4.25 | 98.6 | 95.4 | 91.3 |
| Comparative Example 8-28 | LiCo$_{0.8}$Ni$_{0.15}$Al$_{0.05}$O$_2$ | 1.0 | 20 | 20 | 4.20 | 99.0 | 96.3 | 92.7 |
| Comparative Example 8-29 | LiCo$_{0.8}$Ni$_{0.15}$Al$_{0.05}$O$_2$ | 1.5 | 20 | 20 | 4.20 | 98.9 | 96.3 | 92.6 |
| Comparative Example 8-30 | LiCo$_{0.8}$Ni$_{0.15}$Al$_{0.05}$O$_2$ | 1.0 | 25 | 20 | 4.20 | 98.7 | 96.2 | 92.6 |
| Comparative Example 8-31 | LiCo$_{0.8}$Ni$_{0.15}$Al$_{0.05}$O$_2$ | 1.0 | 20 | 30 | 4.20 | 98.7 | 96.2 | 92.5 |
| Comparative Example 8-32 | LiCo$_{0.8}$Ni$_{0.15}$Al$_{0.05}$O$_2$ | 1.5 | 25 | 30 | 4.20 | 98.6 | 96.0 | 92.0 |
| Comparative Example 8-33 | LiCo$_{0.8}$Ni$_{0.15}$Al$_{0.05}$O$_2$ | 1.5 | 25 | 30 | 4.25 | 98.2 | 95.0 | 91.0 |

TABLE 112

| | cathode active material | concentration of Li$_2$CO$_3$ + Li$_2$SO$_4$ (wt %) | concentration of protic impurities (ppm) | moisture content (ppm) | upper limit voltage (V) | discharge capacity retention ratio (%) | | |
|---|---|---|---|---|---|---|---|---|
| | | | | | | 10 cycles | 50 cycles | 100 cycles |
| Example 8-53 | LiCo$_{0.8}$Ni$_{0.15}$Al$_{0.05}$O$_2$ | 1.0 | 20 | 20 | 4.30 | 99.0 | 96.0 | 92.2 |
| Example 8-54 | LiCo$_{0.8}$Ni$_{0.15}$Al$_{0.05}$O$_2$ | 1.5 | 20 | 20 | 4.30 | 98.5 | 95.1 | 91.0 |
| Example 8-55 | LiCo$_{0.8}$Ni$_{0.15}$Al$_{0.05}$O$_2$ | 1.0 | 25 | 20 | 4.30 | 98.4 | 95.1 | 91.0 |
| Example 8-56 | LiCo$_{0.8}$Ni$_{0.15}$Al$_{0.05}$O$_2$ | 1.0 | 20 | 30 | 4.30 | 98.6 | 95.2 | 91.1 |
| Comparative Example 8-34 | LiCo$_{0.8}$Ni$_{0.15}$Al$_{0.05}$O$_2$ | 1.5 | 25 | 30 | 4.30 | 98.1 | 95.0 | 90.8 |

TABLE 113

| | cathode active material | concentration of Li$_2$CO$_3$ + Li$_2$SO$_4$ (wt %) | concentration of protic impurities (ppm) | moisture content (ppm) | upper limit voltage (V) | discharge capacity retention ratio (%) | | |
|---|---|---|---|---|---|---|---|---|
| | | | | | | 10 cycles | 50 cycles | 100 cycles |
| Example 8-57 | LiCo$_{0.8}$Ni$_{0.15}$Al$_{0.05}$O$_2$ | 1.0 | 20 | 20 | 4.40 | 96.4 | 93.8 | 88.5 |
| Example 8-58 | LiCo$_{0.8}$Ni$_{0.15}$Al$_{0.05}$O$_2$ | 1.5 | 20 | 20 | 4.40 | 95.4 | 91.5 | 86.9 |
| Example 8-59 | LiCo$_{0.8}$Ni$_{0.15}$Al$_{0.05}$O$_2$ | 1.0 | 25 | 20 | 4.40 | 94.7 | 92.3 | 87.6 |
| Example 8-60 | LiCo$_{0.8}$Ni$_{0.15}$Al$_{0.05}$O$_2$ | 1.0 | 20 | 30 | 4.40 | 94.5 | 92.4 | 87.7 |
| Comparative Example 8-35 | LiCo$_{0.8}$Ni$_{0.15}$Al$_{0.05}$O$_2$ | 1.5 | 25 | 30 | 4.40 | 93.5 | 90.9 | 78.9 |

TABLE 114

| | cathode active material | concentration of Li$_2$CO$_3$ + Li$_2$SO$_4$ (wt %) | concentration of protic impurities (ppm) | moisture content (ppm) | upper limit voltage (V) | discharge capacity retention ratio (%) | | |
|---|---|---|---|---|---|---|---|---|
| | | | | | | 10 cycles | 50 cycles | 100 cycles |
| Example 8-61 | LiCo$_{0.8}$Ni$_{0.15}$Al$_{0.05}$O$_2$ | 1.0 | 20 | 20 | 4.50 | 94.4 | 88.8 | 83.5 |
| Example 8-62 | LiCo$_{0.8}$Ni$_{0.15}$Al$_{0.05}$O$_2$ | 1.5 | 20 | 20 | 4.50 | 91.4 | 87.5 | 76.9 |
| Example 8-63 | LiCo$_{0.8}$Ni$_{0.15}$Al$_{0.05}$O$_2$ | 1.0 | 25 | 20 | 4.50 | 91.7 | 88.3 | 77.6 |
| Example 8-64 | LiCo$_{0.8}$Ni$_{0.15}$Al$_{0.05}$O$_2$ | 1.0 | 20 | 30 | 4.50 | 91.5 | 88.4 | 77.7 |
| Comparative Example 8-36 | LiCo$_{0.8}$Ni$_{0.15}$Al$_{0.05}$O$_2$ | 1.5 | 25 | 30 | 4.50 | 90.5 | 86.9 | 71.9 |

TABLE 115

| | cathode active material | concentration of Li$_2$CO$_3$ + Li$_2$SO$_4$ (wt %) | concentration of protic impurities (ppm) | moisture content (ppm) | upper limit voltage (V) | discharge capacity retention ratio (%) | | |
|---|---|---|---|---|---|---|---|---|
| | | | | | | 10 cycles | 50 cycles | 100 cycles |
| Example 8-65 | LiCo$_{0.9}$Mg$_{0.05}$Al$_{0.05}$O$_2$ | 1.0 | 20 | 20 | 4.25 | 99.2 | 96.4 | 91.7 |
| Example 8-66 | LiCo$_{0.9}$Mg$_{0.05}$Al$_{0.05}$O$_2$ | 1.5 | 20 | 20 | 4.25 | 99.0 | 95.4 | 90.5 |
| Example 8-67 | LiCo$_{0.9}$Mg$_{0.05}$Al$_{0.05}$O$_2$ | 1.0 | 25 | 20 | 4.25 | 99.0 | 95.5 | 90.6 |
| Example 8-68 | LiCo$_{0.9}$Mg$_{0.05}$Al$_{0.05}$O$_2$ | 1.0 | 20 | 30 | 4.25 | 99.0 | 95.5 | 90.7 |
| Comparative Example 8-37 | LiCo$_{0.9}$Mg$_{0.05}$Al$_{0.05}$O$_2$ | 1.0 | 20 | 20 | 4.20 | 99.2 | 96.6 | 92.0 |
| Comparative Example 8-38 | LiCo$_{0.9}$Mg$_{0.05}$Al$_{0.05}$O$_2$ | 1.5 | 20 | 20 | 4.20 | 99.0 | 96.5 | 91.9 |

TABLE 115-continued

| | cathode active material | concentration of $Li_2CO_3 + Li_2SO_4$ (wt %) | concentration of protic impurities (ppm) | moisture content (ppm) | upper limit voltage (V) | discharge capacity retention ratio (%) | | |
|---|---|---|---|---|---|---|---|---|
| | | | | | | 10 cycles | 50 cycles | 100 cycles |
| Comparative Example 8-39 | $LiCo_{0.9}Mg_{0.05}Al_{0.05}O_2$ | 1.0 | 25 | 20 | 4.20 | 99.1 | 96.5 | 91.8 |
| Comparative Example 8-40 | $LiCo_{0.9}Mg_{0.05}Al_{0.05}O_2$ | 1.0 | 20 | 30 | 4.20 | 99.1 | 96.5 | 91.7 |
| Comparative Example 8-41 | $LiCo_{0.9}Mg_{0.05}Al_{0.05}O_2$ | 1.5 | 25 | 30 | 4.20 | 98.5 | 96.2 | 90.8 |
| Comparative Example 8-42 | $LiCo_{0.9}Mg_{0.05}Al_{0.05}O_2$ | 1.5 | 25 | 30 | 4.25 | 98.8 | 95.4 | 90.2 |

TABLE 116

| | cathode active material | concentration of $Li_2CO_3 + Li_2SO_4$ (wt %) | concentration of protic impurities (ppm) | moisture content (ppm) | upper limit voltage (V) | discharge capacity retention ratio (%) | | |
|---|---|---|---|---|---|---|---|---|
| | | | | | | 10 cycles | 50 cycles | 100 cycles |
| Example 8-69 | $LiCo_{0.9}Mg_{0.05}Al_{0.05}O_2$ | 1.0 | 20 | 20 | 4.30 | 99.1 | 96.2 | 91.5 |
| Example 8-70 | $LiCo_{0.9}Mg_{0.05}Al_{0.05}O_2$ | 1.5 | 20 | 20 | 4.30 | 99.0 | 95.1 | 90.2 |
| Example 8-71 | $LiCo_{0.9}Mg_{0.05}Al_{0.05}O_2$ | 1.0 | 25 | 20 | 4.30 | 99.0 | 95.2 | 90.3 |
| Example 8-72 | $LiCo_{0.9}Mg_{0.05}Al_{0.05}O_2$ | 1.0 | 20 | 30 | 4.30 | 99.0 | 95.3 | 90.4 |
| Comparative Example 8-43 | $LiCo_{0.9}Mg_{0.05}Al_{0.05}O_2$ | 1.5 | 25 | 30 | 4.30 | 98.7 | 95.2 | 90.0 |

TABLE 117

| | cathode active material | concentration of $Li_2CO_3 + Li_2SO_4$ (wt %) | concentration of protic impurities (ppm) | moisture content (ppm) | upper limit voltage (V) | discharge capacity retention ratio (%) | | |
|---|---|---|---|---|---|---|---|---|
| | | | | | | 10 cycles | 50 cycles | 100 cycles |
| Example 8-73 | $LiCo_{0.9}Mg_{0.05}Al_{0.05}O_2$ | 1.0 | 20 | 20 | 4.40 | 96.2 | 93.0 | 88.7 |
| Example 8-74 | $LiCo_{0.9}Mg_{0.05}Al_{0.05}O_2$ | 1.5 | 20 | 20 | 4.40 | 95.2 | 91.9 | 87.0 |
| Example 8-75 | $LiCo_{0.9}Mg_{0.05}Al_{0.05}O_2$ | 1.0 | 25 | 20 | 4.40 | 95.8 | 91.9 | 87.5 |
| Example 8-76 | $LiCo_{0.9}Mg_{0.05}Al_{0.05}O_2$ | 1.0 | 20 | 30 | 4.40 | 95.5 | 92.1 | 87.7 |
| Comparative Example 8-44 | $LiCo_{0.9}Mg_{0.05}Al_{0.05}O_2$ | 1.5 | 25 | 30 | 4.40 | 93.5 | 90.7 | 79.1 |

TABLE 118

| | cathode active material | concentration of $Li_2CO_3 + Li_2SO_4$ (wt %) | concentration of protic impurities (ppm) | moisture content (ppm) | upper limit voltage (V) | discharge capacity retention ratio (%) | | |
|---|---|---|---|---|---|---|---|---|
| | | | | | | 10 cycles | 50 cycles | 100 cycles |
| Example 8-77 | $LiCo_{0.9}Mg_{0.05}Al_{0.05}O_2$ | 1.0 | 20 | 20 | 4.50 | 94.2 | 89.0 | 83.7 |
| Example 8-78 | $LiCo_{0.9}Mg_{0.05}Al_{0.05}O_2$ | 1.5 | 20 | 20 | 4.50 | 91.0 | 86.9 | 77.0 |
| Example 8-79 | $LiCo_{0.9}Mg_{0.05}Al_{0.05}O_2$ | 1.0 | 25 | 20 | 4.50 | 93.8 | 88.9 | 84.0 |
| Example 8-80 | $LiCo_{0.9}Mg_{0.05}Al_{0.05}O_2$ | 1.0 | 20 | 30 | 4.50 | 93.5 | 89.1 | 83.9 |
| Comparative Example 8-45 | $LiCo_{0.9}Mg_{0.05}Al_{0.05}O_2$ | 1.5 | 25 | 30 | 4.50 | 90.5 | 85.7 | 71.7 |

TABLE 119

| | cathode active material | concentration of $Li_2CO_3 + Li_2SO_4$ (wt %) | concentration of protic impurities (ppm) | moisture content (ppm) | upper limit voltage (V) | discharge capacity retention ratio (%) | | |
|---|---|---|---|---|---|---|---|---|
| | | | | | | 10 cycles | 50 cycles | 100 cycles |
| Example 8-81 | $LiCo_{0.9}Ti_{0.05}Al_{0.05}O_2$ | 1.0 | 20 | 20 | 4.25 | 98.8 | 96.5 | 93.0 |
| Example 8-82 | $LiCo_{0.9}Ti_{0.05}Al_{0.05}O_2$ | 1.5 | 20 | 20 | 4.25 | 98.7 | 95.3 | 91.6 |
| Example 8-83 | $LiCo_{0.9}Ti_{0.05}Al_{0.05}O_2$ | 1.0 | 25 | 20 | 4.25 | 98.7 | 95.4 | 91.6 |
| Example 8-84 | $LiCo_{0.9}Ti_{0.05}Al_{0.05}O_2$ | 1.0 | 20 | 30 | 4.25 | 98.7 | 95.4 | 91.6 |
| Comparative Example 8-46 | $LiCo_{0.9}Ti_{0.05}Al_{0.05}O_2$ | 1.0 | 20 | 20 | 4.20 | 98.8 | 96.7 | 93.2 |
| Comparative Example 8-47 | $LiCo_{0.9}Ti_{0.05}Al_{0.05}O_2$ | 1.5 | 20 | 20 | 4.20 | 98.8 | 96.7 | 93.3 |
| Comparative Example 8-48 | $LiCo_{0.9}Ti_{0.05}Al_{0.05}O_2$ | 1.0 | 25 | 20 | 4.20 | 98.7 | 96.7 | 93.0 |

TABLE 119-continued

| | cathode active material | concentration of Li$_2$CO$_3$ + Li$_2$SO$_4$ (wt %) | concentration of protic impurities (ppm) | moisture content (ppm) | upper limit voltage (V) | discharge capacity retention ratio (%) | | |
|---|---|---|---|---|---|---|---|---|
| | | | | | | 10 cycles | 50 cycles | 100 cycles |
| Comparative Example 8-49 | LiCo$_{0.9}$Ti$_{0.05}$Al$_{0.05}$O$_2$ | 1.0 | 20 | 30 | 4.20 | 98.7 | 96.7 | 93.0 |
| Comparative Example 8-50 | LiCo$_{0.9}$Ti$_{0.05}$Al$_{0.05}$O$_2$ | 1.5 | 25 | 30 | 4.20 | 98.5 | 96.4 | 92.4 |
| Comparative Example 8-51 | LiCo$_{0.9}$Ti$_{0.05}$Al$_{0.05}$O$_2$ | 1.5 | 25 | 30 | 4.25 | 98.5 | 95.2 | 90.1 |

TABLE 120

| | cathode active material | concentration of Li$_2$CO$_3$ + Li$_2$SO$_4$ (wt %) | concentration of protic impurities (ppm) | moisture content (ppm) | upper limit voltage (V) | discharge capacity retention ratio (%) | | |
|---|---|---|---|---|---|---|---|---|
| | | | | | | 10 cycles | 50 cycles | 100 cycles |
| Example 8-85 | LiCo$_{0.9}$Ti$_{0.05}$Al$_{0.05}$O$_2$ | 1.0 | 20 | 20 | 4.30 | 98.6 | 96.4 | 93.0 |
| Example 8-86 | LiCo$_{0.9}$Ti$_{0.05}$Al$_{0.05}$O$_2$ | 1.5 | 20 | 20 | 4.30 | 98.5 | 95.2 | 91.5 |
| Example 8-87 | LiCo$_{0.9}$Ti$_{0.05}$Al$_{0.05}$O$_2$ | 1.0 | 25 | 20 | 4.30 | 98.6 | 95.4 | 91.5 |
| Example 8-88 | LiCo$_{0.9}$Ti$_{0.05}$Al$_{0.05}$O$_2$ | 1.0 | 20 | 30 | 4.30 | 98.7 | 95.3 | 91.6 |
| Comparative Example 8-52 | LiCo$_{0.9}$Ti$_{0.05}$Al$_{0.05}$O$_2$ | 1.5 | 25 | 30 | 4.30 | 98.5 | 95.1 | 90.0 |

TABLE 121

| | cathode active material | concentration of Li$_2$CO$_3$ + Li$_2$SO$_4$ (wt %) | concentration of protic impurities (ppm) | moisture content (ppm) | upper limit voltage (V) | discharge capacity retention ratio (%) | | |
|---|---|---|---|---|---|---|---|---|
| | | | | | | 10 cycles | 50 cycles | 100 cycles |
| Example 8-89 | LiCo$_{0.9}$Ti$_{0.05}$Al$_{0.05}$O$_2$ | 1.0 | 20 | 20 | 4.40 | 96.8 | 93.5 | 88.7 |
| Example 8-90 | LiCo$_{0.9}$Ti$_{0.05}$Al$_{0.05}$O$_2$ | 1.5 | 20 | 20 | 4.40 | 95.8 | 91.7 | 87.4 |
| Example 8-91 | LiCo$_{0.9}$Ti$_{0.05}$Al$_{0.05}$O$_2$ | 1.0 | 25 | 20 | 4.40 | 96.2 | 93.2 | 87.7 |
| Example 8-92 | LiCo$_{0.9}$Ti$_{0.05}$Al$_{0.05}$O$_2$ | 1.0 | 20 | 30 | 4.40 | 96.2 | 93.3 | 87.9 |
| Comparative Example 8-53 | LiCo$_{0.9}$Ti$_{0.05}$Al$_{0.05}$O$_2$ | 1.5 | 25 | 30 | 4.40 | 93.5 | 90.8 | 78.8 |

TABLE 122

| | cathode active material | concentration of Li$_2$CO$_3$ + Li$_2$SO$_4$ (wt %) | concentration of protic impurities (ppm) | moisture content (ppm) | upper limit voltage (V) | discharge capacity retention ratio (%) | | |
|---|---|---|---|---|---|---|---|---|
| | | | | | | 10 cycles | 50 cycles | 100 cycles |
| Example 8-93 | LiCo$_{0.9}$Ti$_{0.05}$Al$_{0.05}$O$_2$ | 1.0 | 20 | 20 | 4.50 | 93.8 | 88.5 | 79.7 |
| Example 8-94 | LiCo$_{0.9}$Ti$_{0.05}$Al$_{0.05}$O$_2$ | 1.5 | 20 | 20 | 4.50 | 90.8 | 86.7 | 73.4 |
| Example 8-95 | LiCo$_{0.9}$Ti$_{0.05}$Al$_{0.05}$O$_2$ | 1.0 | 25 | 20 | 4.50 | 94.2 | 89.2 | 80.0 |
| Example 8-96 | LiCo$_{0.9}$Ti$_{0.05}$Al$_{0.05}$O$_2$ | 1.0 | 20 | 30 | 4.50 | 94.2 | 89.3 | 79.9 |
| Comparative Example 8-54 | LiCo$_{0.9}$Ti$_{0.05}$Al$_{0.05}$O$_2$ | 1.5 | 25 | 30 | 4.50 | 90.5 | 85.8 | 70.8 |

TABLE 123

| | cathode active material | concentration of Li$_2$CO$_3$ + Li$_2$SO$_4$ (wt %) | concentration of protic impurities (ppm) | moisture content (ppm) | upper limit voltage (V) | discharge capacity retention ratio (%) | | |
|---|---|---|---|---|---|---|---|---|
| | | | | | | 10 cycles | 50 cycles | 100 cycles |
| Example 8-97 | LiCo$_{0.8}$Mn$_{0.15}$Mg$_{0.05}$O$_2$ | 0.7 | 20 | 20 | 4.25 | 98.9 | 95.6 | 92.3 |
| Example 8-98 | LiCo$_{0.8}$Mn$_{0.15}$Mg$_{0.05}$O$_2$ | 1.5 | 20 | 20 | 4.25 | 98.5 | 94.3 | 91.0 |
| Example 8-99 | LiCo$_{0.8}$Mn$_{0.15}$Mg$_{0.05}$O$_2$ | 0.7 | 25 | 20 | 4.25 | 98.5 | 94.3 | 91.0 |
| Example 8-100 | LiCo$_{0.8}$Mn$_{0.15}$Mg$_{0.05}$O$_2$ | 0.7 | 20 | 30 | 4.25 | 98.6 | 94.3 | 91.0 |
| Comparative Example 8-55 | LiCo$_{0.8}$Mn$_{0.15}$Mg$_{0.05}$O$_2$ | 0.7 | 20 | 20 | 4.20 | 98.9 | 95.6 | 92.6 |
| Comparative Example 8-56 | LiCo$_{0.8}$Mn$_{0.15}$Mg$_{0.05}$O$_2$ | 1.5 | 20 | 20 | 4.20 | 98.8 | 95.5 | 92.5 |
| Comparative Example 8-57 | LiCo$_{0.8}$Mn$_{0.15}$Mg$_{0.05}$O$_2$ | 0.7 | 25 | 20 | 4.20 | 98.9 | 95.5 | 92.5 |
| Comparative Example 8-58 | LiCo$_{0.8}$Mn$_{0.15}$Mg$_{0.05}$O$_2$ | 0.7 | 20 | 30 | 4.20 | 98.9 | 95.5 | 92.5 |

TABLE 123-continued

|  | cathode active material | concentration of Li$_2$CO$_3$ + Li$_2$SO$_4$ (wt %) | concentration of protic impurities (ppm) | moisture content (ppm) | upper limit voltage (V) | discharge capacity retention ratio (%) | | |
|---|---|---|---|---|---|---|---|---|
|  |  |  |  |  |  | 10 cycles | 50 cycles | 100 cycles |
| Comparative Example 8-59 | LiCo$_{0.8}$Mn$_{0.15}$Mg$_{0.05}$O$_2$ | 1.5 | 25 | 30 | 4.20 | 98.8 | 95.1 | 92.1 |
| Comparative Example 8-60 | LiCo$_{0.8}$Mn$_{0.15}$Mg$_{0.05}$O$_2$ | 1.5 | 25 | 30 | 4.25 | 98.4 | 93.5 | 90.2 |

TABLE 124

|  | cathode active material | concentration of Li$_2$CO$_3$ + Li$_2$SO$_4$ (wt %) | concentration of protic impurities (ppm) | moisture content (ppm) | upper limit voltage (V) | discharge capacity retention ratio (%) | | |
|---|---|---|---|---|---|---|---|---|
|  |  |  |  |  |  | 10 cycles | 50 cycles | 100 cycles |
| Example 8-101 | LiCo$_{0.8}$Mn$_{0.15}$Mg$_{0.05}$O$_2$ | 0.7 | 20 | 20 | 4.30 | 98.9 | 95.5 | 92.3 |
| Example 8-102 | LiCo$_{0.8}$Mn$_{0.15}$Mg$_{0.05}$O$_2$ | 1.5 | 20 | 20 | 4.30 | 98.4 | 94.1 | 90.8 |
| Example 8-103 | LiCo$_{0.8}$Mn$_{0.15}$Mg$_{0.05}$O$_2$ | 0.7 | 25 | 20 | 4.30 | 98.3 | 94.2 | 90.9 |
| Example 8-104 | LiCo$_{0.8}$Mn$_{0.15}$Mg$_{0.05}$O$_2$ | 0.7 | 20 | 30 | 4.30 | 98.4 | 94.3 | 90.0 |
| Comparative Example 8-61 | LiCo$_{0.8}$Mn$_{0.15}$Mg$_{0.05}$O$_2$ | 1.5 | 25 | 30 | 4.30 | 98.2 | 93.1 | 89.2 |

TABLE 125

|  | cathode active material | concentration of Li$_2$CO$_3$ + Li$_2$SO$_4$ (wt %) | concentration of protic impurities (ppm) | moisture content (ppm) | upper limit voltage (V) | discharge capacity retention ratio (%) | | |
|---|---|---|---|---|---|---|---|---|
|  |  |  |  |  |  | 10 cycles | 50 cycles | 100 cycles |
| Example 8-105 | LiCo$_{0.8}$Mn$_{0.15}$Mg$_{0.05}$O$_2$ | 0.7 | 20 | 20 | 4.40 | 97.9 | 94.6 | 89.5 |
| Example 8-106 | LiCo$_{0.8}$Mn$_{0.15}$Mg$_{0.05}$O$_2$ | 1.5 | 20 | 20 | 4.40 | 96.9 | 93.5 | 88.0 |
| Example 8-107 | LiCo$_{0.8}$Mn$_{0.15}$Mg$_{0.05}$O$_2$ | 0.7 | 25 | 20 | 4.40 | 97.0 | 94.3 | 89.2 |
| Example 8-108 | LiCo$_{0.8}$Mn$_{0.15}$Mg$_{0.05}$O$_2$ | 0.7 | 20 | 30 | 4.40 | 97.6 | 94.1 | 89.1 |
| Comparative Example 8-62 | LiCo$_{0.8}$Mn$_{0.15}$Mg$_{0.05}$O$_2$ | 1.5 | 25 | 30 | 4.40 | 96.6 | 91.7 | 80.2 |

TABLE 126

|  | cathode active material | concentration of Li$_2$CO$_3$ + Li$_2$SO$_4$ (wt %) | concentration of protic impurities (ppm) | moisture content (ppm) | upper limit voltage (V) | discharge capacity retention ratio (%) | | |
|---|---|---|---|---|---|---|---|---|
|  |  |  |  |  |  | 10 cycles | 50 cycles | 100 cycles |
| Example 8-109 | LiCo$_{0.8}$Mn$_{0.15}$Mg$_{0.05}$O$_2$ | 0.7 | 20 | 20 | 4.50 | 93.9 | 87.6 | 78.5 |
| Example 8-110 | LiCo$_{0.8}$Mn$_{0.15}$Mg$_{0.05}$O$_2$ | 1.5 | 20 | 20 | 4.50 | 90.9 | 86.5 | 73.0 |
| Example 8-111 | LiCo$_{0.8}$Mn$_{0.15}$Mg$_{0.05}$O$_2$ | 0.7 | 25 | 20 | 4.50 | 94.0 | 87.3 | 77.8 |
| Example 8-112 | LiCo$_{0.8}$Mn$_{0.15}$Mg$_{0.05}$O$_2$ | 0.7 | 20 | 30 | 4.50 | 93.6 | 87.4 | 78.1 |
| Comparative Example 8-63 | LiCo$_{0.8}$Mn$_{0.15}$Mg$_{0.05}$O$_2$ | 1.5 | 25 | 30 | 4.50 | 90.6 | 85.7 | 71.2 |

TABLE 127

|  | cathode active material | concentration of Li$_2$CO$_3$ + Li$_2$SO$_4$ (wt %) | concentration of protic impurities (ppm) | moisture content (ppm) | upper limit voltage (V) | discharge capacity retention ratio (%) | | |
|---|---|---|---|---|---|---|---|---|
|  |  |  |  |  |  | 10 cycles | 50 cycles | 100 cycles |
| Example 8-113 | LiCo$_{0.9}$Fe$_{0.1}$O$_2$ | 1.0 | 20 | 20 | 4.25 | 98.7 | 96.2 | 92.1 |
| Example 8-114 | LiCo$_{0.9}$Fe$_{0.1}$O$_2$ | 1.5 | 20 | 20 | 4.25 | 98.5 | 95.3 | 90.7 |
| Example 8-115 | LiCo$_{0.9}$Fe$_{0.1}$O$_2$ | 1.0 | 25 | 20 | 4.25 | 98.6 | 95.4 | 90.8 |
| Example 8-116 | LiCo$_{0.9}$Fe$_{0.1}$O$_2$ | 1.0 | 20 | 30 | 4.25 | 98.5 | 95.4 | 90.7 |
| Comparative Example 8-64 | LiCo$_{0.9}$Fe$_{0.1}$O$_2$ | 1.0 | 20 | 20 | 4.20 | 98.7 | 96.3 | 92.1 |
| Comparative Example 8-65 | LiCo$_{0.9}$Fe$_{0.1}$O$_2$ | 1.5 | 20 | 20 | 4.20 | 98.8 | 96.3 | 92.1 |
| Comparative Example 8-66 | LiCo$_{0.9}$Fe$_{0.1}$O$_2$ | 1.0 | 25 | 20 | 4.20 | 98.7 | 96.2 | 92.0 |
| Comparative Example 8-67 | LiCo$_{0.9}$Fe$_{0.1}$O$_2$ | 1.0 | 20 | 30 | 4.20 | 98.6 | 96.2 | 92.0 |
| Comparative Example 8-68 | LiCo$_{0.9}$Fe$_{0.1}$O$_2$ | 1.5 | 25 | 30 | 4.20 | 98.5 | 95.9 | 91.5 |
| Comparative Example 8-69 | LiCo$_{0.9}$Fe$_{0.1}$O$_2$ | 1.5 | 25 | 30 | 4.25 | 98.5 | 95.1 | 90.1 |

TABLE 128

| | cathode active material | concentration of Li$_2$CO$_3$ + Li$_2$SO$_4$ (wt %) | concentration of protic impurities (ppm) | moisture content (ppm) | upper limit voltage (V) | discharge capacity retention ratio (%) | | |
|---|---|---|---|---|---|---|---|---|
| | | | | | | 10 cycles | 50 cycles | 100 cycles |
| Example 8-117 | LiCo$_{0.9}$Fe$_{0.1}$O$_2$ | 1.0 | 20 | 20 | 4.30 | 98.5 | 96.1 | 92.0 |
| Example 8-118 | LiCo$_{0.9}$Fe$_{0.1}$O$_2$ | 1.5 | 20 | 20 | 4.30 | 98.3 | 95.0 | 90.4 |
| Example 8-119 | LiCo$_{0.9}$Fe$_{0.1}$O$_2$ | 1.0 | 25 | 20 | 4.30 | 98.3 | 95.2 | 90.5 |
| Example 8-120 | LiCo$_{0.9}$Fe$_{0.1}$O$_2$ | 1.0 | 20 | 30 | 4.30 | 98.4 | 95.2 | 90.5 |
| Comparative Example 8-70 | LiCo$_{0.9}$Fe$_{0.1}$O$_2$ | 1.5 | 25 | 30 | 4.30 | 98.1 | 95.0 | 89.1 |

TABLE 129

| | cathode active material | concentration of Li$_2$CO$_3$ + Li$_2$SO$_4$ (wt %) | concentration of protic impurities (ppm) | moisture content (ppm) | upper limit voltage (V) | discharge capacity retention ratio (%) | | |
|---|---|---|---|---|---|---|---|---|
| | | | | | | 10 cycles | 50 cycles | 100 cycles |
| Example 8-121 | LiCo$_{0.9}$Fe$_{0.1}$O$_2$ | 1.0 | 20 | 20 | 4.40 | 97.7 | 94.2 | 88.8 |
| Example 8-122 | LiCo$_{0.9}$Fe$_{0.1}$O$_2$ | 1.5 | 20 | 20 | 4.40 | 96.6 | 93.0 | 85.9 |
| Example 8-123 | LiCo$_{0.9}$Fe$_{0.1}$O$_2$ | 1.0 | 25 | 20 | 4.40 | 96.9 | 94.1 | 87.1 |
| Example 8-124 | LiCo$_{0.9}$Fe$_{0.1}$O$_2$ | 1.0 | 20 | 30 | 4.40 | 97.1 | 93.8 | 87.1 |
| Comparative Example 8-71 | LiCo$_{0.9}$Fe$_{0.1}$O$_2$ | 1.5 | 25 | 30 | 4.40 | 95.4 | 90.8 | 79.9 |

TABLE 130

| | cathode active material | concentration of Li$_2$CO$_3$ + Li$_2$SO$_4$ (wt %) | concentration of protic impurities (ppm) | moisture content (ppm) | upper limit voltage (V) | discharge capacity retention ratio (%) | | |
|---|---|---|---|---|---|---|---|---|
| | | | | | | 10 cycles | 50 cycles | 100 cycles |
| Example 8-125 | LiCo$_{0.9}$Fe$_{0.1}$O$_2$ | 1.0 | 20 | 20 | 4.50 | 93.7 | 87.2 | 78.6 |
| Example 8-126 | LiCo$_{0.9}$Fe$_{0.1}$O$_2$ | 1.5 | 20 | 20 | 4.50 | 90.6 | 86.0 | 73.1 |
| Example 8-127 | LiCo$_{0.9}$Fe$_{0.1}$O$_2$ | 1.0 | 25 | 20 | 4.50 | 92.9 | 87.1 | 77.1 |
| Example 8-128 | LiCo$_{0.9}$Fe$_{0.1}$O$_2$ | 1.0 | 20 | 30 | 4.50 | 93.1 | 87.0 | 78.1 |
| Comparative Example 8-72 | LiCo$_{0.9}$Fe$_{0.1}$O$_2$ | 1.5 | 25 | 30 | 4.50 | 90.4 | 85.8 | 71.1 |

TABLE 131

| | cathode active material | concentration of Li$_2$CO$_3$ + Li$_2$SO$_4$ (wt %) | concentration of protic impurities (ppm) | moisture content (ppm) | upper limit voltage (V) | discharge capacity retention ratio (%) | | |
|---|---|---|---|---|---|---|---|---|
| | | | | | | 10 cycles | 50 cycles | 100 cycles |
| Example 8-129 | LiNi$_{0.5}$Mn$_{0.5}$O$_2$ | 0.3 | 20 | 20 | 4.25 | 99.0 | 96.6 | 92.9 |
| Example 8-130 | LiNi$_{0.5}$Mn$_{0.5}$O$_2$ | 1.5 | 20 | 20 | 4.25 | 97.9 | 95.4 | 91.7 |
| Example 8-131 | LiNi$_{0.5}$Mn$_{0.5}$O$_2$ | 0.3 | 25 | 20 | 4.25 | 98.0 | 95.3 | 91.8 |
| Example 8-132 | LiNi$_{0.5}$Mn$_{0.5}$O$_2$ | 0.3 | 20 | 30 | 4.25 | 98.0 | 95.4 | 91.7 |
| Comparative Example 8-73 | LiNi$_{0.5}$Mn$_{0.5}$O$_2$ | 0.3 | 20 | 20 | 4.20 | 99.0 | 96.7 | 93.4 |
| Comparative Example 8-74 | LiNi$_{0.5}$Mn$_{0.5}$O$_2$ | 1.5 | 20 | 20 | 4.20 | 99.1 | 96.7 | 93.4 |
| Comparative Example 8-75 | LiNi$_{0.5}$Mn$_{0.5}$O$_2$ | 0.3 | 25 | 20 | 4.20 | 99.0 | 96.7 | 93.4 |
| Comparative Example 8-76 | LiNi$_{0.5}$Mn$_{0.5}$O$_2$ | 0.3 | 20 | 30 | 4.20 | 99.0 | 96.7 | 93.4 |
| Comparative Example 8-77 | LiNi$_{0.5}$Mn$_{0.5}$O$_2$ | 1.5 | 25 | 30 | 4.20 | 98.6 | 96.5 | 93.0 |
| Comparative Example 8-78 | LiNi$_{0.5}$Mn$_{0.5}$O$_2$ | 1.5 | 25 | 30 | 4.25 | 97.8 | 94.1 | 91.3 |

TABLE 132

| | cathode active material | concentration of Li$_2$CO$_3$ + Li$_2$SO$_4$ (wt %) | concentration of protic impurities (ppm) | moisture content (ppm) | upper limit voltage (V) | discharge capacity retention ratio (%) | | |
|---|---|---|---|---|---|---|---|---|
| | | | | | | 10 cycles | 50 cycles | 100 cycles |
| Example 8-133 | LiNi$_{0.5}$Mn$_{0.5}$O$_2$ | 0.3 | 20 | 20 | 4.30 | 99.0 | 96.5 | 92.7 |
| Example 8-134 | LiNi$_{0.5}$Mn$_{0.5}$O$_2$ | 1.5 | 20 | 20 | 4.30 | 97.6 | 95.2 | 91.5 |
| Example 8-135 | LiNi$_{0.5}$Mn$_{0.5}$O$_2$ | 0.3 | 25 | 20 | 4.30 | 98.0 | 95.2 | 91.8 |

TABLE 132-continued

| | cathode active material | concentration of Li$_2$CO$_3$ + Li$_2$SO$_4$ (wt %) | concentration of protic impurities (ppm) | moisture content (ppm) | upper limit voltage (V) | discharge capacity retention ratio (%) | | |
|---|---|---|---|---|---|---|---|---|
| | | | | | | 10 cycles | 50 cycles | 100 cycles |
| Example 8-136 | LiNi$_{0.5}$Mn$_{0.5}$O$_2$ | 0.3 | 20 | 30 | 4.30 | 98.0 | 95.2 | 91.7 |
| Comparative Example 8-79 | LiNi$_{0.5}$Mn$_{0.5}$O$_2$ | 1.5 | 25 | 30 | 4.30 | 97.8 | 94.0 | 91.3 |

TABLE 133

| | cathode active material | concentration of Li$_2$CO$_3$ + Li$_2$SO$_4$ (wt %) | concentration of protic impurities (ppm) | moisture content (ppm) | upper limit voltage (V) | discharge capacity retention ratio (%) | | |
|---|---|---|---|---|---|---|---|---|
| | | | | | | 10 cycles | 50 cycles | 100 cycles |
| Example 8-137 | LiNi$_{0.5}$Mn$_{0.5}$O$_2$ | 0.3 | 20 | 20 | 4.40 | 97.4 | 95.1 | 89.9 |
| Example 8-138 | LiNi$_{0.5}$Mn$_{0.5}$O$_2$ | 1.5 | 20 | 20 | 4.40 | 96.5 | 93.7 | 88.2 |
| Example 8-139 | LiNi$_{0.5}$Mn$_{0.5}$O$_2$ | 0.3 | 25 | 20 | 4.40 | 97.1 | 95.0 | 88.7 |
| Example 8-140 | LiNi$_{0.5}$Mn$_{0.5}$O$_2$ | 0.3 | 20 | 30 | 4.40 | 96.9 | 94.7 | 88.9 |
| Comparative Example 8-80 | LiNi$_{0.5}$Mn$_{0.5}$O$_2$ | 1.5 | 25 | 30 | 4.40 | 94.9 | 92.9 | 82.2 |

TABLE 134

| | cathode active material | concentration of Li$_2$CO$_3$ + Li$_2$SO$_4$ (wt %) | concentration of protic impurities (ppm) | moisture content (ppm) | upper limit voltage (V) | discharge capacity retention ratio (%) | | |
|---|---|---|---|---|---|---|---|---|
| | | | | | | 10 cycles | 50 cycles | 100 cycles |
| Example 8-141 | LiNi$_{0.5}$Mn$_{0.5}$O$_2$ | 0.3 | 20 | 20 | 4.50 | 94.4 | 89.1 | 85.9 |
| Example 8-142 | LiNi$_{0.5}$Mn$_{0.5}$O$_2$ | 1.5 | 20 | 20 | 4.50 | 91.5 | 87.7 | 77.2 |
| Example 8-143 | LiNi$_{0.5}$Mn$_{0.5}$O$_2$ | 0.3 | 25 | 20 | 4.50 | 93.8 | 89.0 | 84.0 |
| Example 8-144 | LiNi$_{0.5}$Mn$_{0.5}$O$_2$ | 0.3 | 20 | 30 | 4.50 | 93.7 | 88.7 | 83.9 |
| Comparative Example 8-81 | LiNi$_{0.5}$Mn$_{0.5}$O$_2$ | 1.5 | 25 | 30 | 4.50 | 91.4 | 87.0 | 75.2 |

TABLE 135

| | cathode active material | concentration of Li$_2$CO$_3$ + Li$_2$SO$_4$ (wt %) | concentration of protic impurities (ppm) | moisture content (ppm) | upper limit voltage (V) | discharge capacity retention ratio (%) | | |
|---|---|---|---|---|---|---|---|---|
| | | | | | | 10 cycles | 50 cycles | 100 cycles |
| Example 8-145 | LiNi$_{0.9}$Mg$_{0.05}$Al$_{0.05}$O$_2$ | 1.0 | 20 | 20 | 4.25 | 96.0 | 94.2 | 92.2 |
| Example 8-146 | LiNi$_{0.9}$Mg$_{0.05}$Al$_{0.05}$O$_2$ | 1.5 | 20 | 20 | 4.25 | 96.0 | 93.5 | 90.3 |
| Example 8-147 | LiNi$_{0.9}$Mg$_{0.05}$Al$_{0.05}$O$_2$ | 1.0 | 25 | 20 | 4.25 | 96.0 | 93.5 | 90.4 |
| Example 8-148 | LiNi$_{0.9}$Mg$_{0.05}$Al$_{0.05}$O$_2$ | 1.0 | 20 | 30 | 4.25 | 96.0 | 93.6 | 90.3 |
| Comparative Example 8-82 | LiNi$_{0.9}$Mg$_{0.05}$Al$_{0.05}$O$_2$ | 1.0 | 20 | 20 | 4.20 | 96.0 | 94.3 | 92.3 |
| Comparative Example 8-83 | LiNi$_{0.9}$Mg$_{0.05}$Al$_{0.05}$O$_2$ | 1.5 | 20 | 20 | 4.20 | 95.9 | 94.3 | 92.2 |
| Comparative Example 8-84 | LiNi$_{0.9}$Mg$_{0.05}$Al$_{0.05}$O$_2$ | 1.0 | 25 | 20 | 4.20 | 95.9 | 94.2 | 92.2 |
| Comparative Example 8-85 | LiNi$_{0.9}$Mg$_{0.05}$Al$_{0.05}$O$_2$ | 1.0 | 20 | 30 | 4.20 | 95.8 | 94.2 | 92.2 |
| Comparative Example 8-86 | LiNi$_{0.9}$Mg$_{0.05}$Al$_{0.05}$O$_2$ | 1.5 | 25 | 30 | 4.20 | 95.2 | 93.9 | 91.9 |
| Comparative Example 8-87 | LiNi$_{0.9}$Mg$_{0.05}$Al$_{0.05}$O$_2$ | 1.5 | 25 | 30 | 4.25 | 96.0 | 93.0 | 90.0 |

TABLE 136

| | cathode active material | concentration of Li$_2$CO$_3$ + Li$_2$SO$_4$ (wt %) | concentration of protic impurities (ppm) | moisture content (ppm) | upper limit voltage (V) | discharge capacity retention ratio (%) | | |
|---|---|---|---|---|---|---|---|---|
| | | | | | | 10 cycles | 50 cycles | 100 cycles |
| Example 8-149 | LiNi$_{0.9}$Mg$_{0.05}$Al$_{0.05}$O$_2$ | 1.0 | 20 | 20 | 4.30 | 96.0 | 94.1 | 92.1 |
| Example 8-150 | LiNi$_{0.9}$Mg$_{0.05}$Al$_{0.05}$O$_2$ | 1.5 | 20 | 20 | 4.30 | 96.0 | 93.3 | 90.2 |
| Example 8-151 | LiNi$_{0.9}$Mg$_{0.05}$Al$_{0.05}$O$_2$ | 1.0 | 25 | 20 | 4.30 | 96.0 | 93.4 | 90.4 |
| Example 8-152 | LiNi$_{0.9}$Mg$_{0.05}$Al$_{0.05}$O$_2$ | 1.0 | 20 | 30 | 4.30 | 96.0 | 93.6 | 90.2 |
| Comparative Example 8-88 | LiNi$_{0.9}$Mg$_{0.05}$Al$_{0.05}$O$_2$ | 1.5 | 25 | 30 | 4.30 | 96.0 | 93.0 | 89.4 |

TABLE 137

| | cathode active material | concentration of $Li_2CO_3 + Li_2SO_4$ (wt %) | concentration of protic impurities (ppm) | moisture content (ppm) | upper limit voltage (V) | discharge capacity retention ratio (%) | | |
|---|---|---|---|---|---|---|---|---|
| | | | | | | 10 cycles | 50 cycles | 100 cycles |
| Example 8-153 | $LiNi_{0.9}Mg_{0.05}Al_{0.05}O_2$ | 1.0 | 20 | 20 | 4.40 | 95.4 | 93.2 | 89.2 |
| Example 8-154 | $LiNi_{0.9}Mg_{0.05}Al_{0.05}O_2$ | 1.5 | 20 | 20 | 4.40 | 95.0 | 91.9 | 83.3 |
| Example 8-155 | $LiNi_{0.9}Mg_{0.05}Al_{0.05}O_2$ | 1.0 | 25 | 20 | 4.40 | 95.1 | 92.7 | 86.2 |
| Example 8-156 | $LiNi_{0.9}Mg_{0.05}Al_{0.05}O_2$ | 1.0 | 20 | 30 | 4.40 | 95.3 | 93.0 | 86.0 |
| Comparative Example 8-89 | $LiNi_{0.9}Mg_{0.05}Al_{0.05}O_2$ | 1.5 | 25 | 30 | 4.40 | 95.2 | 92.2 | 80.7 |

TABLE 138

| | cathode active material | concentration of $Li_2CO_3 + Li_2SO_4$ (wt %) | concentration of protic impurities (ppm) | moisture content (ppm) | upper limit voltage (V) | discharge capacity retention ratio (%) | | |
|---|---|---|---|---|---|---|---|---|
| | | | | | | 10 cycles | 50 cycles | 100 cycles |
| Example 8-157 | $LiNi_{0.9}Mg_{0.05}Al_{0.05}O_2$ | 1.0 | 20 | 20 | 4.50 | 92.4 | 88.2 | 79.2 |
| Example 8-158 | $LiNi_{0.9}Mg_{0.05}Al_{0.05}O_2$ | 1.5 | 20 | 20 | 4.50 | 90.5 | 85.9 | 73.3 |
| Example 8-159 | $LiNi_{0.9}Mg_{0.05}Al_{0.05}O_2$ | 1.0 | 25 | 20 | 4.50 | 91.1 | 87.7 | 76.2 |
| Example 8-160 | $LiNi_{0.9}Mg_{0.05}Al_{0.05}O_2$ | 1.0 | 20 | 30 | 4.50 | 91.3 | 88.0 | 76.0 |
| Comparative Example 8-90 | $LiNi_{0.9}Mg_{0.05}Al_{0.05}O_2$ | 1.5 | 25 | 30 | 4.50 | 90.2 | 85.2 | 71.7 |

TABLE 139

| | cathode active material | concentration of $Li_2CO_3 + Li_2SO_4$ (wt %) | concentration of protic impurities (ppm) | moisture content (ppm) | upper limit voltage (V) | discharge capacity retention ratio (%) | | |
|---|---|---|---|---|---|---|---|---|
| | | | | | | 10 cycles | 50 cycles | 100 cycles |
| Example 8-161 | $LiNi_{0.9}Mn_{0.05}Al_{0.05}O_2$ | 0.9 | 20 | 20 | 4.25 | 96.0 | 94.5 | 92.4 |
| Example 8-162 | $LiNi_{0.9}Mn_{0.05}Al_{0.05}O_2$ | 1.5 | 20 | 20 | 4.25 | 95.6 | 94.2 | 91.3 |
| Example 8-163 | $LiNi_{0.9}Mn_{0.05}Al_{0.05}O_2$ | 0.9 | 25 | 20 | 4.25 | 95.7 | 94.2 | 91.3 |
| Example 8-164 | $LiNi_{0.9}Mn_{0.05}Al_{0.05}O_2$ | 0.9 | 20 | 30 | 4.25 | 95.7 | 94.3 | 91.4 |
| Comparative Example 8-91 | $LiNi_{0.9}Mn_{0.05}Al_{0.05}O_2$ | 0.9 | 20 | 20 | 4.20 | 96.0 | 94.5 | 92.4 |
| Comparative Example 8-92 | $LiNi_{0.9}Mn_{0.05}Al_{0.05}O_2$ | 1.5 | 20 | 20 | 4.20 | 96.0 | 94.5 | 92.3 |
| Comparative Example 8-93 | $LiNi_{0.9}Mn_{0.05}Al_{0.05}O_2$ | 0.9 | 25 | 20 | 4.20 | 96.0 | 94.5 | 92.3 |
| Comparative Example 8-94 | $LiNi_{0.9}Mn_{0.05}Al_{0.05}O_2$ | 0.9 | 20 | 30 | 4.20 | 96.0 | 94.5 | 92.2 |
| Comparative Example 8-95 | $LiNi_{0.9}Mn_{0.05}Al_{0.05}O_2$ | 1.5 | 25 | 30 | 4.20 | 95.9 | 94.4 | 91.8 |
| Comparative Example 8-96 | $LiNi_{0.9}Mn_{0.05}Al_{0.05}O_2$ | 1.5 | 25 | 30 | 4.25 | 95.5 | 94.0 | 90.5 |

TABLE 140

| | cathode active material | concentration of $Li_2CO_3 + Li_2SO_4$ (wt %) | concentration of protic impurities (ppm) | moisture content (ppm) | upper limit voltage (V) | discharge capacity retention ratio (%) | | |
|---|---|---|---|---|---|---|---|---|
| | | | | | | 10 cycles | 50 cycles | 100 cycles |
| Example 8-165 | $LiNi_{0.9}Mn_{0.05}Al_{0.05}O_2$ | 0.9 | 20 | 20 | 4.30 | 96.0 | 94.4 | 92.0 |
| Example 8-166 | $LiNi_{0.9}Mn_{0.05}Al_{0.05}O_2$ | 1.5 | 20 | 20 | 4.30 | 95.5 | 94.2 | 91.1 |
| Example 8-167 | $LiNi_{0.9}Mn_{0.05}Al_{0.05}O_2$ | 0.9 | 25 | 20 | 4.30 | 95.5 | 94.2 | 91.2 |
| Example 8-168 | $LiNi_{0.9}Mn_{0.05}Al_{0.05}O_2$ | 0.9 | 20 | 30 | 4.30 | 95.6 | 94.2 | 91.0 |
| Comparative Example 8-97 | $LiNi_{0.9}Mn_{0.05}Al_{0.05}O_2$ | 1.5 | 25 | 30 | 4.30 | 95.1 | 93.8 | 90.1 |

TABLE 141

| | cathode active material | concentration of $Li_2CO_3 + Li_2SO_4$ (wt %) | concentration of protic impurities (ppm) | moisture content (ppm) | upper limit voltage (V) | discharge capacity retention ratio (%) | | |
|---|---|---|---|---|---|---|---|---|
| | | | | | | 10 cycles | 50 cycles | 100 cycles |
| Example 8-169 | $LiNi_{0.9}Mn_{0.05}Al_{0.05}O_2$ | 0.9 | 20 | 20 | 4.40 | 95.0 | 92.8 | 89.4 |
| Example 8-170 | $LiNi_{0.9}Mn_{0.05}Al_{0.05}O_2$ | 1.5 | 20 | 20 | 4.40 | 94.7 | 91.2 | 85.0 |
| Example 8-171 | $LiNi_{0.9}Mn_{0.05}Al_{0.05}O_2$ | 0.9 | 25 | 20 | 4.40 | 94.5 | 92.1 | 86.7 |

TABLE 141-continued

|  | cathode active material | concentration of $Li_2CO_3 + Li_2SO_4$ (wt %) | concentration of protic impurities (ppm) | moisture content (ppm) | upper limit voltage (V) | discharge capacity retention ratio (%) | | |
|---|---|---|---|---|---|---|---|---|
|  |  |  |  |  |  | 10 cycles | 50 cycles | 100 cycles |
| Example 8-172 | $LiNi_{0.9}Mn_{0.05}Al_{0.05}O_2$ | 0.9 | 20 | 30 | 4.40 | 94.8 | 91.9 | 86.5 |
| Comparative Example 8-98 | $LiNi_{0.9}Mn_{0.05}Al_{0.05}O_2$ | 1.5 | 25 | 30 | 4.40 | 94.1 | 90.0 | 80.1 |

TABLE 142

|  | cathode active material | concentration of $Li_2CO_3 + Li_2SO_4$ (wt %) | concentration of protic impurities (ppm) | moisture content (ppm) | upper limit voltage (V) | discharge capacity retention ratio (%) | | |
|---|---|---|---|---|---|---|---|---|
|  |  |  |  |  |  | 10 cycles | 50 cycles | 100 cycles |
| Example 8-173 | $LiNi_{0.9}Mn_{0.05}Al_{0.05}O_2$ | 0.9 | 20 | 20 | 4.50 | 93.0 | 88.8 | 81.4 |
| Example 8-174 | $LiNi_{0.9}Mn_{0.05}Al_{0.05}O_2$ | 1.5 | 20 | 20 | 4.50 | 90.7 | 86.2 | 76.0 |
| Example 8-175 | $LiNi_{0.9}Mn_{0.05}Al_{0.05}O_2$ | 0.9 | 25 | 20 | 4.50 | 92.5 | 88.1 | 80.7 |
| Example 8-176 | $LiNi_{0.9}Mn_{0.05}Al_{0.05}O_2$ | 0.9 | 20 | 30 | 4.50 | 92.0 | 87.9 | 80.5 |
| Comparative Example 8-99 | $LiNi_{0.9}Mn_{0.05}Al_{0.05}O_2$ | 1.5 | 25 | 30 | 4.50 | 90.1 | 86.0 | 72.1 |

TABLE 143

|  | cathode active material | concentration of $Li_2CO_3 + Li_2SO_4$ (wt %) | concentration of protic impurities (ppm) | moisture content (ppm) | upper limit voltage (V) | discharge capacity retention ratio (%) | | |
|---|---|---|---|---|---|---|---|---|
|  |  |  |  |  |  | 10 cycles | 50 cycles | 100 cycles |
| Example 8-177 | $LiNi_{0.8}Fe_{0.05}Al_{0.15}O_2$ | 1.0 | 20 | 20 | 4.25 | 95.6 | 94.0 | 92.3 |
| Example 8-178 | $LiNi_{0.8}Fe_{0.05}Al_{0.15}O_2$ | 1.5 | 20 | 20 | 4.25 | 95.1 | 92.7 | 90.9 |
| Example 8-179 | $LiNi_{0.8}Fe_{0.05}Al_{0.15}O_2$ | 1.0 | 25 | 20 | 4.25 | 95.2 | 92.6 | 90.9 |
| Example 8-180 | $LiNi_{0.8}Fe_{0.05}Al_{0.15}O_2$ | 1.0 | 20 | 30 | 4.25 | 95.1 | 92.7 | 90.8 |
| Comparative Example 8-100 | $LiNi_{0.8}Fe_{0.05}Al_{0.15}O_2$ | 1.0 | 20 | 20 | 4.20 | 95.6 | 94.0 | 92.3 |
| Comparative Example 8-101 | $LiNi_{0.8}Fe_{0.05}Al_{0.15}O_2$ | 1.5 | 20 | 20 | 4.20 | 95.5 | 94.0 | 92.4 |
| Comparative Example 8-102 | $LiNi_{0.8}Fe_{0.05}Al_{0.15}O_2$ | 1.0 | 25 | 20 | 4.20 | 95.5 | 94.0 | 92.4 |
| Comparative Example 8-103 | $LiNi_{0.8}Fe_{0.05}Al_{0.15}O_2$ | 1.0 | 20 | 30 | 4.20 | 95.5 | 94.1 | 92.5 |
| Comparative Example 8-104 | $LiNi_{0.8}Fe_{0.05}Al_{0.15}O_2$ | 1.5 | 25 | 30 | 4.20 | 95.5 | 93.8 | 92.0 |
| Comparative Example 8-105 | $LiNi_{0.8}Fe_{0.05}Al_{0.15}O_2$ | 1.5 | 25 | 30 | 4.25 | 95.0 | 92.5 | 90.2 |

TABLE 144

|  | cathode active material | concentration of $Li_2CO_3 + Li_2SO_4$ (wt %) | concentration of protic impurities (ppm) | moisture content (ppm) | upper limit voltage (V) | discharge capacity retention ratio (%) | | |
|---|---|---|---|---|---|---|---|---|
|  |  |  |  |  |  | 10 cycles | 50 cycles | 100 cycles |
| Example 8-181 | $LiNi_{0.8}Fe_{0.05}Al_{0.15}O_2$ | 1.0 | 20 | 20 | 4.30 | 95.5 | 94.0 | 92.2 |
| Example 8-182 | $LiNi_{0.8}Fe_{0.05}Al_{0.15}O_2$ | 1.5 | 20 | 20 | 4.30 | 95.0 | 92.3 | 90.8 |
| Example 8-183 | $LiNi_{0.8}Fe_{0.05}Al_{0.15}O_2$ | 1.0 | 25 | 20 | 4.30 | 95.2 | 92.2 | 90.9 |
| Example 8-184 | $LiNi_{0.8}Fe_{0.05}Al_{0.15}O_2$ | 1.0 | 20 | 30 | 4.30 | 95.1 | 92.4 | 90.8 |
| Comparative Example 8-106 | $LiNi_{0.8}Fe_{0.05}Al_{0.15}O_2$ | 1.5 | 25 | 30 | 4.30 | 94.8 | 92.3 | 90.1 |

TABLE 145

|  | cathode active material | concentration of $Li_2CO_3 + Li_2SO_4$ (wt %) | concentration of protic impurities (ppm) | moisture content (ppm) | upper limit voltage (V) | discharge capacity retention ratio (%) | | |
|---|---|---|---|---|---|---|---|---|
|  |  |  |  |  |  | 10 cycles | 50 cycles | 100 cycles |
| Example 8-185 | $LiNi_{0.8}Fe_{0.05}Al_{0.15}O_2$ | 1.0 | 20 | 20 | 4.40 | 95.0 | 91.9 | 88.3 |
| Example 8-186 | $LiNi_{0.8}Fe_{0.05}Al_{0.15}O_2$ | 1.5 | 20 | 20 | 4.40 | 93.5 | 90.3 | 84.5 |
| Example 8-187 | $LiNi_{0.8}Fe_{0.05}Al_{0.15}O_2$ | 1.0 | 25 | 20 | 4.40 | 94.2 | 91.5 | 86.8 |
| Example 8-188 | $LiNi_{0.8}Fe_{0.05}Al_{0.15}O_2$ | 1.0 | 20 | 30 | 4.40 | 94.3 | 91.5 | 86.8 |
| Comparative Example 8-107 | $LiNi_{0.8}Fe_{0.05}Al_{0.15}O_2$ | 1.5 | 25 | 30 | 4.40 | 93.2 | 90.7 | 81.1 |

TABLE 146

| | cathode active material | concentration of Li$_2$CO$_3$ + Li$_2$SO$_4$ (wt %) | concentration of protic impurities (ppm) | moisture content (ppm) | upper limit voltage (V) | discharge capacity retention ratio (%) 10 cycles | 50 cycles | 100 cycles |
|---|---|---|---|---|---|---|---|---|
| Example 8-189 | LiNi$_{0.8}$Fe$_{0.05}$Al$_{0.15}$O$_2$ | 1.0 | 20 | 20 | 4.50 | 93.6 | 86.9 | 77.3 |
| Example 8-190 | LiNi$_{0.8}$Fe$_{0.05}$Al$_{0.15}$O$_2$ | 1.5 | 20 | 20 | 4.50 | 91.0 | 85.3 | 73.5 |
| Example 8-191 | LiNi$_{0.8}$Fe$_{0.05}$Al$_{0.15}$O$_2$ | 1.0 | 25 | 20 | 4.50 | 93.2 | 86.8 | 76.8 |
| Example 8-192 | LiNi$_{0.8}$Fe$_{0.05}$Al$_{0.15}$O$_2$ | 1.0 | 20 | 30 | 4.50 | 93.3 | 86.5 | 76.8 |
| Comparative Example 8-108 | LiNi$_{0.8}$Fe$_{0.05}$Al$_{0.15}$O$_2$ | 1.5 | 25 | 30 | 4.50 | 91.0 | 84.7 | 71.1 |

TABLE 147

| | cathode active material | concentration of Li$_2$CO$_3$ + Li$_2$SO$_4$ (wt %) | concentration of protic impurities (ppm) | moisture content (ppm) | upper limit voltage (V) | discharge capacity retention ratio (%) 10 cycles | 50 cycles | 100 cycles |
|---|---|---|---|---|---|---|---|---|
| Example 8-193 | LiCo$_{0.333}$Ni$_{0.333}$Mn$_{0.333}$O$_2$ | 0.3 | 20 | 20 | 4.25 | 99.0 | 96.5 | 92.8 |
| Example 8-194 | LiCo$_{0.333}$Ni$_{0.333}$Mn$_{0.333}$O$_2$ | 1.5 | 20 | 20 | 4.25 | 98.7 | 96.0 | 91.5 |
| Example 8-195 | LiCo$_{0.333}$Ni$_{0.333}$Mn$_{0.333}$O$_2$ | 0.3 | 25 | 20 | 4.25 | 98.7 | 96.0 | 91.8 |
| Example 8-196 | LiCo$_{0.333}$Ni$_{0.333}$Mn$_{0.333}$O$_2$ | 0.3 | 20 | 30 | 4.25 | 98.7 | 95.9 | 92.0 |
| Comparative Example 8-109 | LiCo$_{0.333}$Ni$_{0.333}$Mn$_{0.333}$O$_2$ | 0.3 | 20 | 20 | 4.20 | 99.0 | 96.6 | 93.5 |
| Comparative Example 8-110 | LiCo$_{0.333}$Ni$_{0.333}$Mn$_{0.333}$O$_2$ | 1.5 | 20 | 20 | 4.20 | 98.9 | 96.6 | 93.6 |
| Comparative Example 8-111 | LiCo$_{0.333}$Ni$_{0.333}$Mn$_{0.333}$O$_2$ | 0.3 | 25 | 20 | 4.20 | 99.0 | 96.6 | 93.5 |
| Comparative Example 8-112 | LiCo$_{0.333}$Ni$_{0.333}$Mn$_{0.333}$O$_2$ | 0.3 | 20 | 30 | 4.20 | 99.0 | 96.7 | 93.5 |
| Comparative Example 8-113 | LiCo$_{0.333}$Ni$_{0.333}$Mn$_{0.333}$O$_2$ | 1.5 | 25 | 30 | 4.20 | 98.9 | 96.5 | 93.3 |
| Comparative Example 8-114 | LiCo$_{0.333}$Ni$_{0.333}$Mn$_{0.333}$O$_2$ | 1.5 | 25 | 30 | 4.25 | 98.5 | 95.6 | 90.7 |

TABLE 148

| | cathode active material | concentration of Li$_2$CO$_3$ + Li$_2$SO$_4$ (wt %) | concentration of protic impurities (ppm) | moisture content (ppm) | upper limit voltage (V) | discharge capacity retention ratio (%) 10 cycles | 50 cycles | 100 cycles |
|---|---|---|---|---|---|---|---|---|
| Example 8-197 | LiCo$_{0.333}$Ni$_{0.333}$Mn$_{0.333}$O$_2$ | 0.3 | 20 | 20 | 4.30 | 99.0 | 96.4 | 92.7 |
| Example 8-198 | LiCo$_{0.333}$Ni$_{0.333}$Mn$_{0.333}$O$_2$ | 1.5 | 20 | 20 | 4.30 | 98.7 | 96.0 | 91.4 |
| Example 8-199 | LiCo$_{0.333}$Ni$_{0.333}$Mn$_{0.333}$O$_2$ | 0.3 | 25 | 20 | 4.30 | 98.6 | 95.9 | 91.7 |
| Example 8-200 | LiCo$_{0.333}$Ni$_{0.333}$Mn$_{0.333}$O$_2$ | 0.3 | 20 | 30 | 4.30 | 98.7 | 95.9 | 92.0 |
| Comparative Example 8-115 | LiCo$_{0.333}$Ni$_{0.333}$Mn$_{0.333}$O$_2$ | 1.5 | 25 | 30 | 4.30 | 98.4 | 95.4 | 90.3 |

TABLE 148

| | cathode active material | concentration of Li$_2$CO$_3$ + Li$_2$SO$_4$ (wt %) | concentration of protic impurities (ppm) | moisture content (ppm) | upper limit voltage (V) | discharge capacity retention ratio (%) 10 cycles | 50 cycles | 100 cycles |
|---|---|---|---|---|---|---|---|---|
| Example 8-201 | LiCo$_{0.333}$Ni$_{0.333}$Mn$_{0.333}$O$_2$ | 0.3 | 20 | 20 | 4.40 | 97.1 | 94.5 | 90.8 |
| Example 8-202 | LiCo$_{0.333}$Ni$_{0.333}$Mn$_{0.333}$O$_2$ | 1.5 | 20 | 20 | 4.40 | 96.3 | 92.7 | 87.5 |
| Example 8-203 | LiCo$_{0.333}$Ni$_{0.333}$Mn$_{0.333}$O$_2$ | 0.3 | 25 | 20 | 4.40 | 96.7 | 93.0 | 88.8 |
| Example 8-204 | LiCo$_{0.333}$Ni$_{0.333}$Mn$_{0.333}$O$_2$ | 0.3 | 20 | 30 | 4.40 | 96.8 | 93.1 | 89.0 |
| Comparative Example 8-116 | LiCo$_{0.333}$Ni$_{0.333}$Mn$_{0.333}$O$_2$ | 1.5 | 25 | 30 | 4.40 | 95.3 | 91.2 | 85.8 |

TABLE 149

| | cathode active material | concentration of Li$_2$CO$_3$ + Li$_2$SO$_4$ (wt %) | concentration of protic impurities (ppm) | moisture content (ppm) | upper limit voltage (V) | discharge capacity retention ratio (%) 10 cycles | 50 cycles | 100 cycles |
|---|---|---|---|---|---|---|---|---|
| Example 8-205 | LiCo$_{0.333}$Ni$_{0.333}$Mn$_{0.333}$O$_2$ | 0.3 | 20 | 20 | 4.50 | 94.1 | 89.5 | 84.8 |
| Example 8-206 | LiCo$_{0.333}$Ni$_{0.333}$Mn$_{0.333}$O$_2$ | 1.5 | 20 | 20 | 4.50 | 91.3 | 87.7 | 77.5 |
| Example 8-207 | LiCo$_{0.333}$Ni$_{0.333}$Mn$_{0.333}$O$_2$ | 0.3 | 25 | 20 | 4.50 | 93.7 | 89.0 | 81.8 |

TABLE 149-continued

| | cathode active material | concentration of $Li_2CO_3 + Li_2SO_4$ (wt %) | concentration of protic impurities (ppm) | moisture content (ppm) | upper limit voltage (V) | discharge capacity retention ratio (%) | | |
|---|---|---|---|---|---|---|---|---|
| | | | | | | 10 cycles | 50 cycles | 100 cycles |
| Example 8-208 | $LiCo_{0.333}Ni_{0.333}Mn_{0.333}O_2$ | 0.3 | 20 | 30 | 4.50 | 93.8 | 89.1 | 82.0 |
| Comparative Example 8-117 | $LiCo_{0.333}Ni_{0.333}Mn_{0.333}O_2$ | 1.5 | 25 | 30 | 4.50 | 91.3 | 87.2 | 73.8 |

TABLE 150

| | cathode active material | concentration of $Li_2CO_3 + Li_2SO_4$ (wt %) | concentration of protic impurities (ppm) | moisture content (ppm) | upper limit voltage (V) | discharge capacity retention ratio (%) | | |
|---|---|---|---|---|---|---|---|---|
| | | | | | | 10 cycles | 50 cycles | 100 cycles |
| Example 8-209 | $LiCo_{0.3}Ni_{0.5}Al_{0.2}O_2$ | 1.0 | 20 | 20 | 4.25 | 98.5 | 95.4 | 92.2 |
| Example 8-210 | $LiCo_{0.3}Ni_{0.5}Al_{0.2}O_2$ | 1.5 | 20 | 20 | 4.25 | 98.2 | 94.7 | 90.7 |
| Example 8-211 | $LiCo_{0.3}Ni_{0.5}Al_{0.2}O_2$ | 1.0 | 25 | 20 | 4.25 | 98.2 | 94.7 | 91.2 |
| Example 8-212 | $LiCo_{0.3}Ni_{0.5}Al_{0.2}O_2$ | 1.0 | 20 | 30 | 4.25 | 98.3 | 95.0 | 90.9 |
| Comparative Example 8-118 | $LiCo_{0.3}Ni_{0.5}Al_{0.2}O_2$ | 1.0 | 20 | 20 | 4.20 | 98.5 | 95.5 | 92.5 |
| Comparative Example 8-119 | $LiCo_{0.3}Ni_{0.5}Al_{0.2}O_2$ | 1.5 | 20 | 20 | 4.20 | 98.5 | 95.4 | 92.5 |
| Comparative Example 8-120 | $LiCo_{0.3}Ni_{0.5}Al_{0.2}O_2$ | 1.0 | 25 | 20 | 4.20 | 98.5 | 95.4 | 92.4 |
| Comparative Example 8-121 | $LiCo_{0.3}Ni_{0.5}Al_{0.2}O_2$ | 1.0 | 20 | 30 | 4.20 | 98.5 | 95.4 | 92.4 |
| Comparative Example 8-122 | $LiCo_{0.3}Ni_{0.5}Al_{0.2}O_2$ | 1.5 | 25 | 30 | 4.20 | 98.3 | 95.2 | 92.0 |
| Comparative Example 8-123 | $LiCo_{0.3}Ni_{0.5}Al_{0.2}O_2$ | 1.5 | 25 | 30 | 4.25 | 98.1 | 94.0 | 90.0 |

TABLE 151

| | cathode active material | concentration of $Li_2CO_3 + Li_2SO_4$ (wt %) | concentration of protic impurities (ppm) | moisture content (ppm) | upper limit voltage (V) | discharge capacity retention ratio (%) | | |
|---|---|---|---|---|---|---|---|---|
| | | | | | | 10 cycles | 50 cycles | 100 cycles |
| Example 8-213 | $LiCo_{0.3}Ni_{0.5}Al_{0.2}O_2$ | 1.0 | 20 | 20 | 4.30 | 98.4 | 95.4 | 92.1 |
| Example 8-214 | $LiCo_{0.3}Ni_{0.5}Al_{0.2}O_2$ | 1.5 | 20 | 20 | 4.30 | 98.2 | 94.3 | 90.5 |
| Example 8-215 | $LiCo_{0.3}Ni_{0.5}Al_{0.2}O_2$ | 1.0 | 25 | 20 | 4.30 | 98.2 | 94.5 | 91.0 |
| Example 8-216 | $LiCo_{0.3}Ni_{0.5}Al_{0.2}O_2$ | 1.0 | 20 | 30 | 4.30 | 98.3 | 94.3 | 90.8 |
| Comparative Example 8-124 | $LiCo_{0.3}Ni_{0.5}Al_{0.2}O_2$ | 1.5 | 25 | 30 | 4.30 | 98.0 | 93.8 | 89.2 |

TABLE 152

| | cathode active material | concentration of $Li_2CO_3 + Li_2SO_4$ (wt %) | concentration of protic impurities (ppm) | moisture content (ppm) | upper limit voltage (V) | discharge capacity retention ratio (%) | | |
|---|---|---|---|---|---|---|---|---|
| | | | | | | 10 cycles | 50 cycles | 100 cycles |
| Example 8-217 | $LiCo_{0.3}Ni_{0.5}Al_{0.2}O_2$ | 1.0 | 20 | 20 | 4.40 | 96.5 | 93.4 | 89.2 |
| Example 8-218 | $LiCo_{0.3}Ni_{0.5}Al_{0.2}O_2$ | 1.5 | 20 | 20 | 4.40 | 95.9 | 92.1 | 86.3 |
| Example 8-219 | $LiCo_{0.3}Ni_{0.5}Al_{0.2}O_2$ | 1.0 | 25 | 20 | 4.40 | 96.1 | 92.7 | 86.8 |
| Example 8-220 | $LiCo_{0.3}Ni_{0.5}Al_{0.2}O_2$ | 1.0 | 20 | 30 | 4.40 | 96.3 | 92.5 | 87.1 |
| Comparative Example 8-125 | $LiCo_{0.3}Ni_{0.5}Al_{0.2}O_2$ | 1.5 | 25 | 30 | 4.40 | 94.1 | 91.5 | 83.3 |

TABLE 153

| | cathode active material | concentration of $Li_2CO_3 + Li_2SO_4$ (wt %) | concentration of protic impurities (ppm) | moisture content (ppm) | upper limit voltage (V) | discharge capacity retention ratio (%) | | |
|---|---|---|---|---|---|---|---|---|
| | | | | | | 10 cycles | 50 cycles | 100 cycles |
| Example 8-221 | $LiCo_{0.3}Ni_{0.5}Al_{0.2}O_2$ | 1.0 | 20 | 20 | 4.50 | 94.5 | 88.4 | 82.2 |
| Example 8-222 | $LiCo_{0.3}Ni_{0.5}Al_{0.2}O_2$ | 1.5 | 20 | 20 | 4.50 | 90.9 | 86.1 | 76.3 |
| Example 8-223 | $LiCo_{0.3}Ni_{0.5}Al_{0.2}O_2$ | 1.0 | 25 | 20 | 4.50 | 91.6 | 87.7 | 80.8 |
| Example 8-224 | $LiCo_{0.3}Ni_{0.5}Al_{0.2}O_2$ | 1.0 | 20 | 30 | 4.50 | 92.3 | 87.5 | 81.1 |
| Comparative Example 8-126 | $LiCo_{0.3}Ni_{0.5}Al_{0.2}O_2$ | 1.5 | 25 | 30 | 4.50 | 90.1 | 85.2 | 73.3 |

TABLE 154

| | cathode active material | concentration of Li$_2$CO$_3$ + Li$_2$SO$_4$ (wt %) | concentration of protic impurities (ppm) | moisture content (ppm) | upper limit voltage (V) | discharge capacity retention ratio (%) | | |
|---|---|---|---|---|---|---|---|---|
| | | | | | | 10 cycles | 50 cycles | 100 cycles |
| Example 8-225 | LiCo$_{0.45}$Ni$_{0.5}$Mg$_{0.05}$O$_2$ | 1.0 | 20 | 20 | 4.25 | 99.0 | 96.3 | 92.4 |
| Example 8-226 | LiCo$_{0.45}$Ni$_{0.5}$Mg$_{0.05}$O$_2$ | 1.5 | 20 | 20 | 4.25 | 98.6 | 95.4 | 91.4 |
| Example 8-227 | LiCo$_{0.45}$Ni$_{0.5}$Mg$_{0.05}$O$_2$ | 1.0 | 25 | 20 | 4.25 | 98.6 | 95.7 | 91.8 |
| Example 8-228 | LiCo$_{0.45}$Ni$_{0.5}$Mg$_{0.05}$O$_2$ | 1.0 | 20 | 30 | 4.25 | 98.6 | 95.4 | 91.7 |
| Comparative Example 8-127 | LiCo$_{0.45}$Ni$_{0.5}$Mg$_{0.05}$O$_2$ | 1.0 | 20 | 20 | 4.20 | 99.0 | 96.3 | 92.7 |
| Comparative Example 8-128 | LiCo$_{0.45}$Ni$_{0.5}$Mg$_{0.05}$O$_2$ | 1.5 | 20 | 20 | 4.20 | 98.8 | 96.2 | 92.6 |
| Comparative Example 8-129 | LiCo$_{0.45}$Ni$_{0.5}$Mg$_{0.05}$O$_2$ | 1.0 | 25 | 20 | 4.20 | 98.9 | 96.3 | 92.6 |
| Comparative Example 8-130 | LiCo$_{0.45}$Ni$_{0.5}$Mg$_{0.05}$O$_2$ | 1.0 | 20 | 30 | 4.20 | 99.0 | 96.3 | 92.5 |
| Comparative Example 8-131 | LiCo$_{0.45}$Ni$_{0.5}$Mg$_{0.05}$O$_2$ | 1.5 | 25 | 30 | 4.20 | 98.7 | 96.0 | 91.8 |
| Comparative Example 8-132 | LiCo$_{0.45}$Ni$_{0.5}$Mg$_{0.05}$O$_2$ | 1.5 | 25 | 30 | 4.25 | 98.5 | 95.0 | 90.7 |

TABLE 155

| | cathode active material | concentration of Li$_2$CO$_3$ + Li$_2$SO$_4$ (wt %) | concentration of protic impurities (ppm) | moisture content (ppm) | upper limit voltage (V) | discharge capacity retention ratio (%) | | |
|---|---|---|---|---|---|---|---|---|
| | | | | | | 10 cycles | 50 cycles | 100 cycles |
| Example 8-229 | LiCo$_{0.45}$Ni$_{0.5}$Mg$_{0.05}$O$_2$ | 1.0 | 20 | 20 | 4.30 | 99.0 | 96.2 | 92.3 |
| Example 8-230 | LiCo$_{0.45}$Ni$_{0.5}$Mg$_{0.05}$O$_2$ | 1.5 | 20 | 20 | 4.30 | 98.4 | 95.2 | 91.3 |
| Example 8-231 | LiCo$_{0.45}$Ni$_{0.5}$Mg$_{0.05}$O$_2$ | 1.0 | 25 | 20 | 4.30 | 98.5 | 95.5 | 91.7 |
| Example 8-232 | LiCo$_{0.45}$Ni$_{0.5}$Mg$_{0.05}$O$_2$ | 1.0 | 20 | 30 | 4.30 | 98.6 | 95.4 | 91.5 |
| Comparative Example 8-133 | LiCo$_{0.45}$Ni$_{0.5}$Mg$_{0.05}$O$_2$ | 1.5 | 25 | 30 | 4.30 | 98.4 | 95.0 | 90.0 |

TABLE 156

| | cathode active material | concentration of Li$_2$CO$_3$ + Li$_2$SO$_4$ (wt %) | concentration of protic impurities (ppm) | moisture content (ppm) | upper limit voltage (V) | discharge capacity retention ratio (%) | | |
|---|---|---|---|---|---|---|---|---|
| | | | | | | 10 cycles | 50 cycles | 100 cycles |
| Example 8-233 | LiCo$_{0.45}$Ni$_{0.5}$Mg$_{0.05}$O$_2$ | 1.0 | 20 | 20 | 4.40 | 97.0 | 93.3 | 89.4 |
| Example 8-234 | LiCo$_{0.45}$Ni$_{0.5}$Mg$_{0.05}$O$_2$ | 1.5 | 20 | 20 | 4.40 | 96.0 | 92.9 | 87.5 |
| Example 8-235 | LiCo$_{0.45}$Ni$_{0.5}$Mg$_{0.05}$O$_2$ | 1.0 | 25 | 20 | 4.40 | 97.1 | 93.2 | 89.0 |
| Example 8-236 | LiCo$_{0.45}$Ni$_{0.5}$Mg$_{0.05}$O$_2$ | 1.0 | 20 | 30 | 4.40 | 96.9 | 93.0 | 89.2 |
| Comparative Example 8-134 | LiCo$_{0.45}$Ni$_{0.5}$Mg$_{0.05}$O$_2$ | 1.5 | 25 | 30 | 4.40 | 95.5 | 91.7 | 82.2 |

TABLE 157

| | cathode active material | concentration of Li$_2$CO$_3$ + Li$_2$SO$_4$ (wt %) | concentration of protic impurities (ppm) | moisture content (ppm) | upper limit voltage (V) | discharge capacity retention ratio (%) | | |
|---|---|---|---|---|---|---|---|---|
| | | | | | | 10 cycles | 50 cycles | 100 cycles |
| Example 8-237 | LiCo$_{0.45}$Ni$_{0.5}$Mg$_{0.05}$O$_2$ | 1.0 | 20 | 20 | 4.50 | 94.0 | 88.3 | 80.4 |
| Example 8-238 | LiCo$_{0.45}$Ni$_{0.5}$Mg$_{0.05}$O$_2$ | 1.5 | 20 | 20 | 4.50 | 91.0 | 85.9 | 73.5 |
| Example 8-239 | LiCo$_{0.45}$Ni$_{0.5}$Mg$_{0.05}$O$_2$ | 1.0 | 25 | 20 | 4.50 | 93.5 | 86.2 | 80.0 |
| Example 8-240 | LiCo$_{0.45}$Ni$_{0.5}$Mg$_{0.05}$O$_2$ | 1.0 | 20 | 30 | 4.50 | 92.9 | 86.4 | 79.8 |
| Comparative Example 8-135 | LiCo$_{0.45}$Ni$_{0.5}$Mg$_{0.05}$O$_2$ | 1.5 | 25 | 30 | 4.50 | 91.0 | 83.7 | 70.2 |

TABLE 158

| | cathode active material | concentration of Li$_2$CO$_3$ + Li$_2$SO$_4$ (wt %) | concentration of protic impurities (ppm) | moisture content (ppm) | upper limit voltage (V) | discharge capacity retention ratio (%) | | |
|---|---|---|---|---|---|---|---|---|
| | | | | | | 10 cycles | 50 cycles | 100 cycles |
| Example 8-241 | LiCo$_{0.35}$Ni$_{0.6}$Ti$_{0.05}$O$_2$ | 1.0 | 20 | 20 | 4.25 | 98.8 | 94.6 | 92.0 |
| Example 8-242 | LiCo$_{0.35}$Ni$_{0.6}$Ti$_{0.05}$O$_2$ | 1.5 | 20 | 20 | 4.25 | 98.7 | 94.1 | 90.6 |
| Example 8-243 | LiCo$_{0.35}$Ni$_{0.6}$Ti$_{0.05}$O$_2$ | 1.0 | 25 | 20 | 4.25 | 98.7 | 94.3 | 91.1 |

TABLE 158-continued

|  | cathode active material | concentration of $Li_2CO_3 + Li_2SO_4$ (wt %) | concentration of protic impurities (ppm) | moisture content (ppm) | upper limit voltage (V) | discharge capacity retention ratio (%) 10 cycles | 50 cycles | 100 cycles |
|---|---|---|---|---|---|---|---|---|
| Example 8-244 | $LiCo_{0.35}Ni_{0.6}Ti_{0.05}O_2$ | 1.0 | 20 | 30 | 4.25 | 98.8 | 94.5 | 90.8 |
| Comparative Example 8-136 | $LiCo_{0.35}Ni_{0.6}Ti_{0.05}O_2$ | 1.0 | 20 | 20 | 4.20 | 98.8 | 94.6 | 92.2 |
| Comparative Example 8-137 | $LiCo_{0.35}Ni_{0.6}Ti_{0.05}O_2$ | 1.5 | 20 | 20 | 4.20 | 98.9 | 94.6 | 92.0 |
| Comparative Example 8-138 | $LiCo_{0.35}Ni_{0.6}Ti_{0.05}O_2$ | 1.0 | 25 | 20 | 4.20 | 98.8 | 94.6 | 92.1 |
| Comparative Example 8-139 | $LiCo_{0.35}Ni_{0.6}Ti_{0.05}O_2$ | 1.0 | 20 | 30 | 4.20 | 98.8 | 94.6 | 92.0 |
| Comparative Example 8-140 | $LiCo_{0.35}Ni_{0.6}Ti_{0.05}O_2$ | 1.5 | 25 | 30 | 4.20 | 98.7 | 94.4 | 91.5 |
| Comparative Example 8-141 | $LiCo_{0.35}Ni_{0.6}Ti_{0.05}O_2$ | 1.5 | 25 | 30 | 4.25 | 98.6 | 93.7 | 89.8 |

TABLE 159

|  | cathode active material | concentration of $Li_2CO_3 + Li_2SO_4$ (wt %) | concentration of protic impurities (ppm) | moisture content (ppm) | upper limit voltage (V) | discharge capacity retention ratio (%) 10 cycles | 50 cycles | 100 cycles |
|---|---|---|---|---|---|---|---|---|
| Example 8-245 | $LiCo_{0.35}Ni_{0.6}Ti_{0.05}O_2$ | 1.0 | 20 | 20 | 4.30 | 98.7 | 94.5 | 91.8 |
| Example 8-246 | $LiCo_{0.35}Ni_{0.6}Ti_{0.05}O_2$ | 1.5 | 20 | 20 | 4.30 | 98.5 | 94.0 | 90.4 |
| Example 8-247 | $LiCo_{0.35}Ni_{0.6}Ti_{0.05}O_2$ | 1.0 | 25 | 20 | 4.30 | 98.6 | 94.2 | 91.0 |
| Example 8-248 | $LiCo_{0.35}Ni_{0.6}Ti_{0.05}O_2$ | 1.0 | 20 | 30 | 4.30 | 98.7 | 94.3 | 90.8 |
| Comparative Example 8-142 | $LiCo_{0.35}Ni_{0.6}Ti_{0.05}O_2$ | 1.5 | 25 | 30 | 4.30 | 98.4 | 93.2 | 89.1 |

TABLE 160

|  | cathode active material | concentration of $Li_2CO_3 + Li_2SO_4$ (wt %) | concentration of protic impurities (ppm) | moisture content (ppm) | upper limit voltage (V) | discharge capacity retention ratio (%) 10 cycles | 50 cycles | 100 cycles |
|---|---|---|---|---|---|---|---|---|
| Example 8-249 | $LiCo_{0.35}Ni_{0.6}Ti_{0.05}O_2$ | 1.0 | 20 | 20 | 4.40 | 96.8 | 93.6 | 88.0 |
| Example 8-250 | $LiCo_{0.35}Ni_{0.6}Ti_{0.05}O_2$ | 1.5 | 20 | 20 | 4.40 | 95.1 | 92.3 | 83.9 |
| Example 8-251 | $LiCo_{0.35}Ni_{0.6}Ti_{0.05}O_2$ | 1.0 | 25 | 20 | 4.40 | 96.0 | 93.4 | 87.6 |
| Example 8-252 | $LiCo_{0.35}Ni_{0.6}Ti_{0.05}O_2$ | 1.0 | 20 | 30 | 4.40 | 96.1 | 93.5 | 87.1 |
| Comparative Example 8-143 | $LiCo_{0.35}Ni_{0.6}Ti_{0.05}O_2$ | 1.5 | 25 | 30 | 4.40 | 95.0 | 91.8 | 79.8 |

TABLE 161

|  | cathode active material | concentration of $Li_2CO_3 + Li_2SO_4$ (wt %) | concentration of protic impurities (ppm) | moisture content (ppm) | upper limit voltage (V) | discharge capacity retention ratio (%) 10 cycles | 50 cycles | 100 cycles |
|---|---|---|---|---|---|---|---|---|
| Example 8-253 | $LiCo_{0.35}Ni_{0.6}Ti_{0.05}O_2$ | 1.0 | 20 | 20 | 4.50 | 93.8 | 87.6 | 78.0 |
| Example 8-254 | $LiCo_{0.35}Ni_{0.6}Ti_{0.05}O_2$ | 1.5 | 20 | 20 | 4.50 | 91.1 | 86.3 | 72.9 |
| Example 8-255 | $LiCo_{0.35}Ni_{0.6}Ti_{0.05}O_2$ | 1.0 | 25 | 20 | 4.50 | 93.0 | 87.4 | 77.6 |
| Example 8-256 | $LiCo_{0.35}Ni_{0.6}Ti_{0.05}O_2$ | 1.0 | 20 | 30 | 4.50 | 93.1 | 87.5 | 77.1 |
| Comparative Example 8-144 | $LiCo_{0.35}Ni_{0.6}Ti_{0.05}O_2$ | 1.5 | 25 | 30 | 4.50 | 91.0 | 85.8 | 69.8 |

TABLE 162

|  | cathode active material | concentration of $Li_2CO_3 + Li_2SO_4$ (wt %) | concentration of protic impurities (ppm) | moisture content (ppm) | upper limit voltage (V) | discharge capacity retention ratio (%) 10 cycles | 50 cycles | 100 cycles |
|---|---|---|---|---|---|---|---|---|
| Example 8-257 | $LiCo_{0.2}Ni_{0.75}Cr_{0.05}O_2$ | 1.0 | 20 | 20 | 4.25 | 97.3 | 94.6 | 91.8 |
| Example 8-258 | $LiCo_{0.2}Ni_{0.75}Cr_{0.05}O_2$ | 1.5 | 20 | 20 | 4.25 | 97.0 | 94.1 | 90.2 |
| Example 8-259 | $LiCo_{0.2}Ni_{0.75}Cr_{0.05}O_2$ | 1.0 | 25 | 20 | 4.25 | 97.2 | 94.5 | 90.8 |
| Example 8-260 | $LiCo_{0.2}Ni_{0.75}Cr_{0.05}O_2$ | 1.0 | 20 | 30 | 4.25 | 97.1 | 94.3 | 91.1 |
| Comparative Example 8-145 | $LiCo_{0.2}Ni_{0.75}Cr_{0.05}O_2$ | 1.0 | 20 | 20 | 4.20 | 97.3 | 94.7 | 92.3 |
| Comparative Example 8-146 | $LiCo_{0.2}Ni_{0.75}Cr_{0.05}O_2$ | 1.5 | 20 | 20 | 4.20 | 97.2 | 94.7 | 92.2 |

TABLE 162-continued

|  | cathode active material | concentration of Li$_2$CO$_3$ + Li$_2$SO$_4$ (wt %) | concentration of protic impurities (ppm) | moisture content (ppm) | upper limit voltage (V) | discharge capacity retention ratio (%) | | |
| --- | --- | --- | --- | --- | --- | --- | --- | --- |
|  |  |  |  |  |  | 10 cycles | 50 cycles | 100 cycles |
| Comparative Example 8-147 | LiCo$_{0.2}$Ni$_{0.75}$Cr$_{0.05}$O$_2$ | 1.0 | 25 | 20 | 4.20 | 97.2 | 94.7 | 92.2 |
| Comparative Example 8-148 | LiCo$_{0.2}$Ni$_{0.75}$Cr$_{0.05}$O$_2$ | 1.0 | 20 | 30 | 4.20 | 97.2 | 94.7 | 92.1 |
| Comparative Example 8-149 | LiCo$_{0.2}$Ni$_{0.75}$Cr$_{0.05}$O$_2$ | 1.5 | 25 | 30 | 4.20 | 97.0 | 94.5 | 91.3 |
| Comparative Example 8-150 | LiCo$_{0.2}$Ni$_{0.75}$Cr$_{0.05}$O$_2$ | 1.5 | 25 | 30 | 4.25 | 97.0 | 94.1 | 89.9 |

TABLE 163

|  | cathode active material | concentration of Li$_2$CO$_3$ + Li$_2$SO$_4$ (wt %) | concentration of protic impurities (ppm) | moisture content (ppm) | upper limit voltage (V) | discharge capacity retention ratio (%) | | |
| --- | --- | --- | --- | --- | --- | --- | --- | --- |
|  |  |  |  |  |  | 10 cycles | 50 cycles | 100 cycles |
| Example 8-261 | LiCo$_{0.2}$Ni$_{0.75}$Cr$_{0.05}$O$_2$ | 1.0 | 20 | 20 | 4.30 | 97.2 | 94.5 | 91.6 |
| Example 8-262 | LiCo$_{0.2}$Ni$_{0.75}$Cr$_{0.05}$O$_2$ | 1.5 | 20 | 20 | 4.30 | 96.7 | 94.0 | 90.0 |
| Example 8-263 | LiCo$_{0.2}$Ni$_{0.75}$Cr$_{0.05}$O$_2$ | 1.0 | 25 | 20 | 4.30 | 97.0 | 94.0 | 90.4 |
| Example 8-264 | LiCo$_{0.2}$Ni$_{0.75}$Cr$_{0.05}$O$_2$ | 1.0 | 20 | 30 | 4.30 | 97.0 | 94.1 | 90.6 |
| Comparative Example 8-151 | LiCo$_{0.2}$Ni$_{0.75}$Cr$_{0.05}$O$_2$ | 1.5 | 25 | 30 | 4.30 | 96.8 | 93.7 | 89.1 |

TABLE 164

|  | cathode active material | concentration of Li$_2$CO$_3$ + Li$_2$SO$_4$ (wt %) | concentration of protic impurities (ppm) | moisture content (ppm) | upper limit voltage (V) | discharge capacity retention ratio (%) | | |
| --- | --- | --- | --- | --- | --- | --- | --- | --- |
|  |  |  |  |  |  | 10 cycles | 50 cycles | 100 cycles |
| Example 8-265 | LiCo$_{0.2}$Ni$_{0.75}$Cr$_{0.05}$O$_2$ | 1.0 | 20 | 20 | 4.40 | 96.3 | 93.6 | 88.8 |
| Example 8-266 | LiCo$_{0.2}$Ni$_{0.75}$Cr$_{0.05}$O$_2$ | 1.5 | 20 | 20 | 4.40 | 95.8 | 91.8 | 84.0 |
| Example 8-267 | LiCo$_{0.2}$Ni$_{0.75}$Cr$_{0.05}$O$_2$ | 1.0 | 25 | 20 | 4.40 | 95.9 | 92.3 | 88.1 |
| Example 8-268 | LiCo$_{0.2}$Ni$_{0.75}$Cr$_{0.05}$O$_2$ | 1.0 | 20 | 30 | 4.40 | 96.0 | 92.6 | 87.9 |
| Comparative Example 8-152 | LiCo$_{0.2}$Ni$_{0.75}$Cr$_{0.05}$O$_2$ | 1.5 | 25 | 30 | 4.40 | 95.6 | 90.9 | 79.7 |

TABLE 165

|  | cathode active material | concentration of Li$_2$CO$_3$ + Li$_2$SO$_4$ (wt %) | concentration of protic impurities (ppm) | moisture content (ppm) | upper limit voltage (V) | discharge capacity retention ratio (%) | | |
| --- | --- | --- | --- | --- | --- | --- | --- | --- |
|  |  |  |  |  |  | 10 cycles | 50 cycles | 100 cycles |
| Example 8-269 | LiCo$_{0.2}$Ni$_{0.75}$Cr$_{0.05}$O$_2$ | 1.0 | 20 | 20 | 4.50 | 93.3 | 86.6 | 78.8 |
| Example 8-270 | LiCo$_{0.2}$Ni$_{0.75}$Cr$_{0.05}$O$_2$ | 1.5 | 20 | 20 | 4.50 | 90.8 | 85.4 | 74.0 |
| Example 8-271 | LiCo$_{0.2}$Ni$_{0.75}$Cr$_{0.05}$O$_2$ | 1.0 | 25 | 20 | 4.50 | 92.7 | 86.3 | 78.1 |
| Example 8-272 | LiCo$_{0.2}$Ni$_{0.75}$Cr$_{0.05}$O$_2$ | 1.0 | 20 | 30 | 4.50 | 93.0 | 85.8 | 77.3 |
| Comparative Example 8-153 | LiCo$_{0.2}$Ni$_{0.75}$Cr$_{0.05}$O$_2$ | 1.5 | 25 | 30 | 4.50 | 90.6 | 84.9 | 70.7 |

TABLE 166

|  | cathode active material | concentration of Li$_2$CO$_3$ + Li$_2$SO$_4$ (wt %) | concentration of protic impurities (ppm) | moisture content (ppm) | upper limit voltage (V) | discharge capacity retention ratio (%) | | |
| --- | --- | --- | --- | --- | --- | --- | --- | --- |
|  |  |  |  |  |  | 10 cycles | 50 cycles | 100 cycles |
| Example 8-273 | LiCo$_{0.25}$Ni$_{0.65}$Fe$_{0.1}$O$_2$ | 1.0 | 20 | 20 | 4.25 | 97.7 | 95.0 | 92.3 |
| Example 8-274 | LiCo$_{0.25}$Ni$_{0.65}$Fe$_{0.1}$O$_2$ | 1.5 | 20 | 20 | 4.25 | 97.6 | 94.4 | 91.1 |
| Example 8-275 | LiCo$_{0.25}$Ni$_{0.65}$Fe$_{0.1}$O$_2$ | 1.0 | 25 | 20 | 4.25 | 97.7 | 94.6 | 91.5 |
| Example 8-276 | LiCo$_{0.25}$Ni$_{0.65}$Fe$_{0.1}$O$_2$ | 1.0 | 20 | 30 | 4.25 | 97.8 | 94.5 | 91.6 |
| Comparative Example 8-154 | LiCo$_{0.25}$Ni$_{0.65}$Fe$_{0.1}$O$_2$ | 1.0 | 20 | 20 | 4.20 | 97.7 | 95.1 | 92.3 |
| Comparative Example 8-155 | LiCo$_{0.25}$Ni$_{0.65}$Fe$_{0.1}$O$_2$ | 1.5 | 20 | 20 | 4.20 | 97.7 | 95.0 | 92.1 |
| Comparative Example 8-156 | LiCo$_{0.25}$Ni$_{0.65}$Fe$_{0.1}$O$_2$ | 1.0 | 25 | 20 | 4.20 | 97.7 | 95.0 | 92.2 |
| Comparative Example 8-157 | LiCo$_{0.25}$Ni$_{0.65}$Fe$_{0.1}$O$_2$ | 1.0 | 20 | 30 | 4.20 | 97.7 | 95.0 | 92.1 |

TABLE 166-continued

| | cathode active material | concentration of Li$_2$CO$_3$ + Li$_2$SO$_4$ (wt %) | concentration of protic impurities (ppm) | moisture content (ppm) | upper limit voltage (V) | discharge capacity retention ratio (%) 10 cycles | 50 cycles | 100 cycles |
|---|---|---|---|---|---|---|---|---|
| Comparative Example 8-158 | LiCo$_{0.25}$Ni$_{0.65}$Fe$_{0.1}$O$_2$ | 1.5 | 25 | 30 | 4.20 | 97.6 | 94.8 | 91.7 |
| Comparative Example 8-159 | LiCo$_{0.25}$Ni$_{0.65}$Fe$_{0.1}$O$_2$ | 1.5 | 25 | 30 | 4.25 | 97.5 | 94.2 | 91.2 |

TABLE 167

| | cathode active material | concentration of Li$_2$CO$_3$ + Li$_2$SO$_4$ (wt %) | concentration of protic impurities (ppm) | moisture content (ppm) | upper limit voltage (V) | discharge capacity retention ratio (%) 10 cycles | 50 cycles | 100 cycles |
|---|---|---|---|---|---|---|---|---|
| Example 8-277 | LiCo$_{0.25}$Ni$_{0.65}$Fe$_{0.1}$O$_2$ | 1.0 | 20 | 20 | 4.30 | 97.6 | 95.0 | 92.1 |
| Example 8-278 | LiCo$_{0.25}$Ni$_{0.65}$Fe$_{0.1}$O$_2$ | 1.5 | 20 | 20 | 4.30 | 97.6 | 94.3 | 90.8 |
| Example 8-279 | LiCo$_{0.25}$Ni$_{0.65}$Fe$_{0.1}$O$_2$ | 1.0 | 25 | 20 | 4.30 | 97.6 | 94.2 | 91.2 |
| Example 8-280 | LiCo$_{0.25}$Ni$_{0.65}$Fe$_{0.1}$O$_2$ | 1.0 | 20 | 30 | 4.30 | 97.7 | 94.2 | 91.2 |
| Comparative Example 8-160 | LiCo$_{0.25}$Ni$_{0.65}$Fe$_{0.1}$O$_2$ | 1.5 | 25 | 30 | 4.30 | 97.3 | 94.0 | 90.3 |

TABLE 168

| | cathode active material | concentration of Li$_2$CO$_3$ + Li$_2$SO$_4$ (wt %) | concentration of protic impurities (ppm) | moisture content (ppm) | upper limit voltage (V) | discharge capacity retention ratio (%) 10 cycles | 50 cycles | 100 cycles |
|---|---|---|---|---|---|---|---|---|
| Example 8-281 | LiCo$_{0.25}$Ni$_{0.65}$Fe$_{0.1}$O$_2$ | 1.0 | 20 | 20 | 4.40 | 95.7 | 93.5 | 89.3 |
| Example 8-282 | LiCo$_{0.25}$Ni$_{0.65}$Fe$_{0.1}$O$_2$ | 1.5 | 20 | 20 | 4.40 | 95.2 | 91.6 | 83.5 |
| Example 8-283 | LiCo$_{0.25}$Ni$_{0.65}$Fe$_{0.1}$O$_2$ | 1.0 | 25 | 20 | 4.40 | 95.4 | 92.7 | 88.8 |
| Example 8-284 | LiCo$_{0.25}$Ni$_{0.65}$Fe$_{0.1}$O$_2$ | 1.0 | 20 | 30 | 4.40 | 95.5 | 92.8 | 88.5 |
| Comparative Example 8-161 | LiCo$_{0.25}$Ni$_{0.65}$Fe$_{0.1}$O$_2$ | 1.5 | 25 | 30 | 4.40 | 94.9 | 91.0 | 80.2 |

TABLE 169

| | cathode active material | concentration of Li$_2$CO$_3$ + Li$_2$SO$_4$ (wt %) | concentration of protic impurities (ppm) | moisture content (ppm) | upper limit voltage (V) | discharge capacity retention ratio (%) 10 cycles | 50 cycles | 100 cycles |
|---|---|---|---|---|---|---|---|---|
| Example 8-285 | LiCo$_{0.25}$Ni$_{0.65}$Fe$_{0.1}$O$_2$ | 1.0 | 20 | 20 | 4.50 | 93.7 | 87.0 | 79.3 |
| Example 8-286 | LiCo$_{0.25}$Ni$_{0.65}$Fe$_{0.1}$O$_2$ | 1.5 | 20 | 20 | 4.50 | 91.2 | 85.6 | 73.5 |
| Example 8-287 | LiCo$_{0.25}$Ni$_{0.65}$Fe$_{0.1}$O$_2$ | 1.0 | 25 | 20 | 4.50 | 92.2 | 86.7 | 78.8 |
| Example 8-288 | LiCo$_{0.25}$Ni$_{0.65}$Fe$_{0.1}$O$_2$ | 1.0 | 20 | 30 | 4.50 | 92.5 | 86.8 | 78.5 |
| Comparative Example 8-162 | LiCo$_{0.25}$Ni$_{0.65}$Fe$_{0.1}$O$_2$ | 1.5 | 25 | 30 | 4.50 | 90.9 | 85.0 | 71.2 |

TABLE 170

| | cathode active material | concentration of Li$_2$CO$_3$ + Li$_2$SO$_4$ (wt %) | concentration of protic impurities (ppm) | moisture content (ppm) | upper limit voltage (V) | discharge capacity retention ratio (%) 10 cycles | 50 cycles | 100 cycles |
|---|---|---|---|---|---|---|---|---|
| Example 8-289 | LiCo$_{0.3}$Ni$_{0.5}$Mn$_{0.15}$Al$_{0.05}$O$_2$ | 0.7 | 20 | 20 | 4.25 | 98.7 | 95.5 | 92.3 |
| Example 8-290 | LiCo$_{0.3}$Ni$_{0.5}$Mn$_{0.15}$Al$_{0.05}$O$_2$ | 1.5 | 20 | 20 | 4.25 | 98.5 | 94.3 | 90.8 |
| Example 8-291 | LiCo$_{0.3}$Ni$_{0.5}$Mn$_{0.15}$Al$_{0.05}$O$_2$ | 0.7 | 25 | 20 | 4.25 | 98.5 | 94.6 | 91.2 |
| Example 8-292 | LiCo$_{0.3}$Ni$_{0.5}$Mn$_{0.15}$Al$_{0.05}$O$_2$ | 0.7 | 20 | 30 | 4.25 | 98.7 | 94.5 | 91.3 |
| Comparative Example 8-163 | LiCo$_{0.3}$Ni$_{0.5}$Mn$_{0.15}$Al$_{0.05}$O$_2$ | 0.7 | 20 | 20 | 4.20 | 98.7 | 95.6 | 92.8 |
| Comparative Example 8-164 | LiCo$_{0.3}$Ni$_{0.5}$Mn$_{0.15}$Al$_{0.05}$O$_2$ | 1.5 | 20 | 20 | 4.20 | 98.6 | 95.6 | 92.6 |
| Comparative Example 8-165 | LiCo$_{0.3}$Ni$_{0.5}$Mn$_{0.15}$Al$_{0.05}$O$_2$ | 0.7 | 25 | 20 | 4.20 | 98.7 | 95.6 | 92.6 |
| Comparative Example 8-166 | LiCo$_{0.3}$Ni$_{0.5}$Mn$_{0.15}$Al$_{0.05}$O$_2$ | 0.7 | 20 | 30 | 4.20 | 98.7 | 95.5 | 92.6 |
| Comparative Example 8-167 | LiCo$_{0.3}$Ni$_{0.5}$Mn$_{0.15}$Al$_{0.05}$O$_2$ | 1.5 | 25 | 30 | 4.20 | 98.6 | 95.1 | 92.1 |
| Comparative Example 8-168 | LiCo$_{0.3}$Ni$_{0.5}$Mn$_{0.15}$Al$_{0.05}$O$_2$ | 1.5 | 25 | 30 | 4.25 | 98.4 | 94.0 | 90.0 |

TABLE 171

| | cathode active material | concentration of $Li_2CO_3 + Li_2SO_4$ (wt %) | concentration of protic impurities (ppm) | moisture content (ppm) | upper limit voltage (V) | discharge capacity retention ratio (%) | | |
|---|---|---|---|---|---|---|---|---|
| | | | | | | 10 cycles | 50 cycles | 100 cycles |
| Example 8-293 | $LiCo_{0.3}Ni_{0.5}Mn_{0.15}Al_{0.05}O_2$ | 0.7 | 20 | 20 | 4.30 | 98.5 | 95.3 | 92.0 |
| Example 8-294 | $LiCo_{0.3}Ni_{0.5}Mn_{0.15}Al_{0.05}O_2$ | 1.5 | 20 | 20 | 4.30 | 98.2 | 94.1 | 90.5 |
| Example 8-295 | $LiCo_{0.3}Ni_{0.5}Mn_{0.15}Al_{0.05}O_2$ | 0.7 | 25 | 20 | 4.30 | 98.3 | 94.2 | 91.0 |
| Example 8-296 | $LiCo_{0.3}Ni_{0.5}Mn_{0.15}Al_{0.05}O_2$ | 0.7 | 20 | 30 | 4.30 | 98.2 | 94.3 | 91.2 |
| Comparative Example 8-169 | $LiCo_{0.3}Ni_{0.5}Mn_{0.15}Al_{0.05}O_2$ | 1.5 | 25 | 30 | 4.30 | 98.1 | 93.7 | 88.8 |

TABLE 172

| | cathode active material | concentration of $Li_2CO_3 + Li_2SO_4$ (wt %) | concentration of protic impurities (ppm) | moisture content (ppm) | upper limit voltage (V) | discharge capacity retention ratio (%) | | |
|---|---|---|---|---|---|---|---|---|
| | | | | | | 10 cycles | 50 cycles | 100 cycles |
| Example 8-297 | $LiCo_{0.3}Ni_{0.5}Mn_{0.15}Al_{0.05}O_2$ | 0.7 | 20 | 20 | 4.40 | 96.1 | 93.9 | 89.3 |
| Example 8-298 | $LiCo_{0.3}Ni_{0.5}Mn_{0.15}Al_{0.05}O_2$ | 1.5 | 20 | 20 | 4.40 | 95.0 | 92.5 | 83.7 |
| Example 8-299 | $LiCo_{0.3}Ni_{0.5}Mn_{0.15}Al_{0.05}O_2$ | 0.7 | 25 | 20 | 4.40 | 95.7 | 93.0 | 85.0 |
| Example 8-300 | $LiCo_{0.3}Ni_{0.5}Mn_{0.15}Al_{0.05}O_2$ | 0.7 | 20 | 30 | 4.40 | 95.2 | 93.2 | 85.8 |
| Comparative Example 8-170 | $LiCo_{0.3}Ni_{0.5}Mn_{0.15}Al_{0.05}O_2$ | 1.5 | 25 | 30 | 4.40 | 94.4 | 90.9 | 81.1 |

TABLE 173

| | cathode active material | concentration of $Li_2CO_3 + Li_2SO_4$ (wt %) | concentration of protic impurities (ppm) | moisture content (ppm) | upper limit voltage (V) | discharge capacity retention ratio (%) | | |
|---|---|---|---|---|---|---|---|---|
| | | | | | | 10 cycles | 50 cycles | 100 cycles |
| Example 8-301 | $LiCo_{0.3}Ni_{0.5}Mn_{0.15}Al_{0.05}O_2$ | 0.7 | 20 | 20 | 4.50 | 94.1 | 88.5 | 80.3 |
| Example 8-302 | $LiCo_{0.3}Ni_{0.5}Mn_{0.15}Al_{0.05}O_2$ | 1.5 | 20 | 20 | 4.50 | 91.0 | 86.5 | 73.7 |
| Example 8-303 | $LiCo_{0.3}Ni_{0.5}Mn_{0.15}Al_{0.05}O_2$ | 0.7 | 25 | 20 | 4.50 | 93.7 | 88.0 | 80.0 |
| Example 8-304 | $LiCo_{0.3}Ni_{0.5}Mn_{0.15}Al_{0.05}O_2$ | 0.7 | 20 | 30 | 4.50 | 94.0 | 87.9 | 79.8 |
| Comparative Example 8-171 | $LiCo_{0.3}Ni_{0.5}Mn_{0.15}Al_{0.05}O_2$ | 1.5 | 25 | 30 | 4.50 | 90.4 | 85.9 | 71.1 |

TABLE 174

| | cathode active material | concentration of $Li_2CO_3 + Li_2SO_4$ (wt %) | concentration of protic impurities (ppm) | moisture content (ppm) | upper limit voltage (V) | discharge capacity retention ratio (%) | | |
|---|---|---|---|---|---|---|---|---|
| | | | | | | 10 cycles | 50 cycles | 100 cycles |
| Example 8-305 | $LiCo_{0.3}Ni_{0.5}Ti_{0.15}Mg_{0.05}O_2$ | 1.0 | 20 | 20 | 4.25 | 97.9 | 94.6 | 91.6 |
| Example 8-306 | $LiCo_{0.3}Ni_{0.5}Ti_{0.15}Mg_{0.05}O_2$ | 1.5 | 20 | 20 | 4.25 | 97.5 | 93.2 | 90.5 |
| Example 8-307 | $LiCo_{0.3}Ni_{0.5}Ti_{0.15}Mg_{0.05}O_2$ | 1.0 | 25 | 20 | 4.25 | 97.6 | 93.8 | 90.6 |
| Example 8-308 | $LiCo_{0.3}Ni_{0.5}Ti_{0.15}Mg_{0.05}O_2$ | 1.0 | 20 | 30 | 4.25 | 97.6 | 93.5 | 90.5 |
| Comparative Example 8-172 | $LiCo_{0.3}Ni_{0.5}Ti_{0.15}Mg_{0.05}O_2$ | 1.0 | 20 | 20 | 4.20 | 97.9 | 94.8 | 92.6 |
| Comparative Example 8-173 | $LiCo_{0.3}Ni_{0.5}Ti_{0.15}Mg_{0.05}O_2$ | 1.5 | 20 | 20 | 4.20 | 97.7 | 94.8 | 92.4 |
| Comparative Example 8-174 | $LiCo_{0.3}Ni_{0.5}Ti_{0.15}Mg_{0.05}O_2$ | 1.0 | 25 | 20 | 4.20 | 97.8 | 94.8 | 92.5 |
| Comparative Example 8-175 | $LiCo_{0.3}Ni_{0.5}Ti_{0.15}Mg_{0.05}O_2$ | 1.0 | 20 | 30 | 4.20 | 97.7 | 94.8 | 92.4 |
| Comparative Example 8-176 | $LiCo_{0.3}Ni_{0.5}Ti_{0.15}Mg_{0.05}O_2$ | 1.5 | 25 | 30 | 4.20 | 97.6 | 94.5 | 92.0 |
| Comparative Example 8-177 | $LiCo_{0.3}Ni_{0.5}Ti_{0.15}Mg_{0.05}O_2$ | 1.5 | 25 | 30 | 4.25 | 97.5 | 93.2 | 89.8 |

TABLE 175

| | cathode active material | concentration of $Li_2CO_3 + Li_2SO_4$ (wt %) | concentration of protic impurities (ppm) | moisture content (ppm) | upper limit voltage (V) | discharge capacity retention ratio (%) | | |
|---|---|---|---|---|---|---|---|---|
| | | | | | | 10 cycles | 50 cycles | 100 cycles |
| Example 8-309 | $LiCo_{0.3}Ni_{0.5}Ti_{0.15}Mg_{0.05}O_2$ | 1.0 | 20 | 20 | 4.30 | 97.6 | 94.3 | 91.4 |
| Example 8-310 | $LiCo_{0.3}Ni_{0.5}Ti_{0.15}Mg_{0.05}O_2$ | 1.5 | 20 | 20 | 4.30 | 97.2 | 93.0 | 90.3 |
| Example 8-311 | $LiCo_{0.3}Ni_{0.5}Ti_{0.15}Mg_{0.05}O_2$ | 1.0 | 25 | 20 | 4.30 | 97.4 | 93.6 | 90.4 |

TABLE 175-continued

| | cathode active material | concentration of Li$_2$CO$_3$ + Li$_2$SO$_4$ (wt %) | concentration of protic impurities (ppm) | moisture content (ppm) | upper limit voltage (V) | discharge capacity retention ratio (%) | | |
|---|---|---|---|---|---|---|---|---|
| | | | | | | 10 cycles | 50 cycles | 100 cycles |
| Example 8-312 | LiCo$_{0.3}$Ni$_{0.5}$Ti$_{0.15}$Mg$_{0.05}$O$_2$ | 1.0 | 20 | 30 | 4.30 | 97.4 | 93.5 | 90.5 |
| Comparative Example 8-178 | LiCo$_{0.3}$Ni$_{0.5}$Ti$_{0.15}$Mg$_{0.05}$O$_2$ | 1.5 | 25 | 30 | 4.30 | 97.0 | 92.8 | 89.0 |

TABLE 176

| | cathode active material | concentration of Li$_2$CO$_3$ + Li$_2$SO$_4$ (wt %) | concentration of protic impurities (ppm) | moisture content (ppm) | upper limit voltage (V) | discharge capacity retention ratio (%) | | |
|---|---|---|---|---|---|---|---|---|
| | | | | | | 10 cycles | 50 cycles | 100 cycles |
| Example 8-313 | LiCo$_{0.3}$Ni$_{0.5}$Ti$_{0.15}$Mg$_{0.05}$O$_2$ | 1.0 | 20 | 20 | 4.40 | 95.9 | 93.6 | 89.6 |
| Example 8-314 | LiCo$_{0.3}$Ni$_{0.5}$Ti$_{0.15}$Mg$_{0.05}$O$_2$ | 1.5 | 20 | 20 | 4.40 | 95.2 | 92.4 | 85.6 |
| Example 8-315 | LiCo$_{0.3}$Ni$_{0.5}$Ti$_{0.15}$Mg$_{0.05}$O$_2$ | 1.0 | 25 | 20 | 4.40 | 95.5 | 93.3 | 87.1 |
| Example 8-316 | LiCo$_{0.3}$Ni$_{0.5}$Ti$_{0.15}$Mg$_{0.05}$O$_2$ | 1.0 | 20 | 30 | 4.40 | 95.8 | 93.4 | 87.3 |
| Comparative Example 8-179 | LiCo$_{0.3}$Ni$_{0.5}$Ti$_{0.15}$Mg$_{0.05}$O$_2$ | 1.5 | 25 | 30 | 4.40 | 94.7 | 91.1 | 81.7 |

TABLE 177

| | cathode active material | concentration of Li$_2$CO$_3$ + Li$_2$SO$_4$ (wt %) | concentration of protic impurities (ppm) | moisture content (ppm) | upper limit voltage (V) | discharge capacity retention ratio (%) | | |
|---|---|---|---|---|---|---|---|---|
| | | | | | | 10 cycles | 50 cycles | 100 cycles |
| Example 8-317 | LiCo$_{0.3}$Ni$_{0.5}$Ti$_{0.15}$Mg$_{0.05}$O$_2$ | 1.0 | 20 | 20 | 4.50 | 93.9 | 87.6 | 80.6 |
| Example 8-318 | LiCo$_{0.3}$Ni$_{0.5}$Ti$_{0.15}$Mg$_{0.05}$O$_2$ | 1.5 | 20 | 20 | 4.50 | 91.2 | 86.4 | 73.6 |
| Example 8-319 | LiCo$_{0.3}$Ni$_{0.5}$Ti$_{0.15}$Mg$_{0.05}$O$_2$ | 1.0 | 25 | 20 | 4.50 | 93.5 | 87.3 | 80.1 |
| Example 8-320 | LiCo$_{0.3}$Ni$_{0.5}$Ti$_{0.15}$Mg$_{0.05}$O$_2$ | 1.0 | 20 | 30 | 4.50 | 92.8 | 87.4 | 80.3 |
| Comparative Example 8-180 | LiCo$_{0.3}$Ni$_{0.5}$Ti$_{0.15}$Mg$_{0.05}$O$_2$ | 1.5 | 25 | 30 | 4.50 | 90.7 | 86.1 | 70.7 |

TABLE 178

| | cathode active material | concentration of Li$_2$CO$_3$ + Li$_2$SO$_4$ (wt %) | concentration of protic impurities (ppm) | moisture content (ppm) | upper limit voltage (V) | discharge capacity retention ratio (%) | | |
|---|---|---|---|---|---|---|---|---|
| | | | | | | 10 cycles | 50 cycles | 100 cycles |
| Example 8-321 | LiCo$_{0.3}$Ni$_{0.4}$Mn$_{0.2}$Al$_{0.1}$O$_2$ | 0.6 | 20 | 20 | 4.25 | 98.7 | 95.6 | 92.1 |
| Example 8-322 | LiCo$_{0.3}$Ni$_{0.4}$Mn$_{0.2}$Al$_{0.1}$O$_2$ | 1.5 | 20 | 20 | 4.25 | 98.4 | 94.9 | 90.3 |
| Example 8-323 | LiCo$_{0.3}$Ni$_{0.4}$Mn$_{0.2}$Al$_{0.1}$O$_2$ | 0.6 | 25 | 20 | 4.25 | 98.6 | 94.9 | 90.7 |
| Example 8-324 | LiCo$_{0.3}$Ni$_{0.4}$Mn$_{0.2}$Al$_{0.1}$O$_2$ | 0.6 | 20 | 30 | 4.25 | 98.5 | 95.2 | 91.1 |
| Comparative Example 8-181 | LiCo$_{0.3}$Ni$_{0.4}$Mn$_{0.2}$Al$_{0.1}$O$_2$ | 0.6 | 20 | 20 | 4.20 | 98.7 | 95.6 | 92.7 |
| Comparative Example 8-182 | LiCo$_{0.3}$Ni$_{0.4}$Mn$_{0.2}$Al$_{0.1}$O$_2$ | 1.5 | 20 | 20 | 4.20 | 98.7 | 95.6 | 92.7 |
| Comparative Example 8-183 | LiCo$_{0.3}$Ni$_{0.4}$Mn$_{0.2}$Al$_{0.1}$O$_2$ | 0.6 | 25 | 20 | 4.20 | 98.7 | 95.6 | 92.7 |
| Comparative Example 8-184 | LiCo$_{0.3}$Ni$_{0.4}$Mn$_{0.2}$Al$_{0.1}$O$_2$ | 0.6 | 20 | 30 | 4.20 | 98.7 | 95.6 | 92.6 |
| Comparative Example 8-185 | LiCo$_{0.3}$Ni$_{0.4}$Mn$_{0.2}$Al$_{0.1}$O$_2$ | 1.5 | 25 | 30 | 4.20 | 98.6 | 95.4 | 92.0 |
| Comparative Example 8-186 | LiCo$_{0.3}$Ni$_{0.4}$Mn$_{0.2}$Al$_{0.1}$O$_2$ | 1.5 | 25 | 30 | 4.25 | 98.4 | 94.8 | 90.1 |

TABLE 179

| | cathode active material | concentration of Li$_2$CO$_3$ + Li$_2$SO$_4$ (wt %) | concentration of protic impurities (ppm) | moisture content (ppm) | upper limit voltage (V) | discharge capacity retention ratio (%) | | |
|---|---|---|---|---|---|---|---|---|
| | | | | | | 10 cycles | 50 cycles | 100 cycles |
| Example 8-325 | LiCo$_{0.3}$Ni$_{0.4}$Mn$_{0.2}$Al$_{0.1}$O$_2$ | 0.6 | 20 | 20 | 4.30 | 98.6 | 95.5 | 91.8 |
| Example 8-326 | LiCo$_{0.3}$Ni$_{0.4}$Mn$_{0.2}$Al$_{0.1}$O$_2$ | 1.5 | 20 | 20 | 4.30 | 98.2 | 94.6 | 90.0 |
| Example 8-327 | LiCo$_{0.3}$Ni$_{0.4}$Mn$_{0.2}$Al$_{0.1}$O$_2$ | 0.6 | 25 | 20 | 4.30 | 98.5 | 94.8 | 90.2 |
| Example 8-328 | LiCo$_{0.3}$Ni$_{0.4}$Mn$_{0.2}$Al$_{0.1}$O$_2$ | 0.6 | 20 | 30 | 4.30 | 98.5 | 95.2 | 90.6 |
| Comparative Example 8-187 | LiCo$_{0.3}$Ni$_{0.4}$Mn$_{0.2}$Al$_{0.1}$O$_2$ | 1.5 | 25 | 30 | 4.30 | 98.1 | 94.4 | 89.4 |

TABLE 180

| | cathode active material | concentration of $Li_2CO_3 + Li_2SO_4$ (wt %) | concentration of protic impurities (ppm) | moisture content (ppm) | upper limit voltage (V) | discharge capacity retention ratio (%) | | |
|---|---|---|---|---|---|---|---|---|
| | | | | | | 10 cycles | 50 cycles | 100 cycles |
| Example 8-329 | $LiCo_{0.3}Ni_{0.4}Mn_{0.2}Al_{0.1}O_2$ | 0.6 | 20 | 20 | 4.40 | 96.7 | 94.6 | 90.1 |
| Example 8-330 | $LiCo_{0.3}Ni_{0.4}Mn_{0.2}Al_{0.1}O_2$ | 1.5 | 20 | 20 | 4.40 | 95.8 | 93.1 | 87.9 |
| Example 8-331 | $LiCo_{0.3}Ni_{0.4}Mn_{0.2}Al_{0.1}O_2$ | 0.6 | 25 | 20 | 4.40 | 96.5 | 94.0 | 88.3 |
| Example 8-332 | $LiCo_{0.3}Ni_{0.4}Mn_{0.2}Al_{0.1}O_2$ | 0.6 | 20 | 30 | 4.40 | 96.5 | 93.8 | 88.7 |
| Comparative Example 8-188 | $LiCo_{0.3}Ni_{0.4}Mn_{0.2}Al_{0.1}O_2$ | 1.5 | 25 | 30 | 4.40 | 95.5 | 91.4 | 82.9 |

TABLE 181

| | cathode active material | concentration of $Li_2CO_3 + Li_2SO_4$ (wt %) | concentration of protic impurities (ppm) | moisture content (ppm) | upper limit voltage (V) | discharge capacity retention ratio (%) | | |
|---|---|---|---|---|---|---|---|---|
| | | | | | | 10 cycles | 50 cycles | 100 cycles |
| Example 8-333 | $LiCo_{0.3}Ni_{0.4}Mn_{0.2}Al_{0.1}O_2$ | 0.6 | 20 | 20 | 4.50 | 93.7 | 88.6 | 85.1 |
| Example 8-334 | $LiCo_{0.3}Ni_{0.4}Mn_{0.2}Al_{0.1}O_2$ | 1.5 | 20 | 20 | 4.50 | 90.8 | 86.1 | 77.9 |
| Example 8-335 | $LiCo_{0.3}Ni_{0.4}Mn_{0.2}Al_{0.1}O_2$ | 0.6 | 25 | 20 | 4.50 | 93.5 | 88.0 | 84.3 |
| Example 8-336 | $LiCo_{0.3}Ni_{0.4}Mn_{0.2}Al_{0.1}O_2$ | 0.6 | 20 | 30 | 4.50 | 93.5 | 87.8 | 84.7 |
| Comparative Example 8-189 | $LiCo_{0.3}Ni_{0.4}Mn_{0.2}Al_{0.1}O_2$ | 1.5 | 25 | 30 | 4.50 | 90.5 | 85.4 | 72.9 |

TABLE 182

| | cathode active material | concentration of $Li_2CO_3 + Li_2SO_4$ (wt %) | concentration of protic impurities (ppm) | moisture content (ppm) | upper limit voltage (V) | discharge capacity retention ratio (%) | | |
|---|---|---|---|---|---|---|---|---|
| | | | | | | 10 cycles | 50 cycles | 100 cycles |
| Example 8-337 | $LiCo_{0.4}Ni_{0.3}Mn_{0.2}Mg_{0.1}O_2$ | 0.5 | 20 | 20 | 4.25 | 98.1 | 94.8 | 92.3 |
| Example 8-338 | $LiCo_{0.4}Ni_{0.3}Mn_{0.2}Mg_{0.1}O_2$ | 1.5 | 20 | 20 | 4.25 | 98.0 | 94.2 | 90.6 |
| Example 8-339 | $LiCo_{0.4}Ni_{0.3}Mn_{0.2}Mg_{0.1}O_2$ | 0.5 | 25 | 20 | 4.25 | 98.2 | 94.2 | 91.0 |
| Example 8-340 | $LiCo_{0.4}Ni_{0.3}Mn_{0.2}Mg_{0.1}O_2$ | 0.5 | 20 | 30 | 4.25 | 98.1 | 94.6 | 91.0 |
| Comparative Example 8-190 | $LiCo_{0.4}Ni_{0.3}Mn_{0.2}Mg_{0.1}O_2$ | 0.5 | 20 | 20 | 4.20 | 98.1 | 94.9 | 92.5 |
| Comparative Example 8-191 | $LiCo_{0.4}Ni_{0.3}Mn_{0.2}Mg_{0.1}O_2$ | 1.5 | 20 | 20 | 4.20 | 98.3 | 94.8 | 92.5 |
| Comparative Example 8-192 | $LiCo_{0.4}Ni_{0.3}Mn_{0.2}Mg_{0.1}O_2$ | 0.5 | 25 | 20 | 4.20 | 98.2 | 94.7 | 92.4 |
| Comparative Example 8-193 | $LiCo_{0.4}Ni_{0.3}Mn_{0.2}Mg_{0.1}O_2$ | 0.5 | 20 | 30 | 4.20 | 98.1 | 94.7 | 92.4 |
| Comparative Example 8-194 | $LiCo_{0.4}Ni_{0.3}Mn_{0.2}Mg_{0.1}O_2$ | 1.5 | 25 | 30 | 4.20 | 98.0 | 94.2 | 91.6 |
| Comparative Example 8-195 | $LiCo_{0.4}Ni_{0.3}Mn_{0.2}Mg_{0.1}O_2$ | 1.5 | 25 | 30 | 4.25 | 98.0 | 94.0 | 90.2 |

TABLE 183

| | cathode active material | concentration of $Li_2CO_3 + Li_2SO_4$ (wt %) | concentration of protic impurities (ppm) | moisture content (ppm) | upper limit voltage (V) | discharge capacity retention ratio (%) | | |
|---|---|---|---|---|---|---|---|---|
| | | | | | | 10 cycles | 50 cycles | 100 cycles |
| Example 8-341 | $LiCo_{0.4}Ni_{0.3}Mn_{0.2}Mg_{0.1}O_2$ | 0.5 | 20 | 20 | 4.30 | 98.1 | 94.6 | 92.0 |
| Example 8-342 | $LiCo_{0.4}Ni_{0.3}Mn_{0.2}Mg_{0.1}O_2$ | 1.5 | 20 | 20 | 4.30 | 97.8 | 94.1 | 90.1 |
| Example 8-343 | $LiCo_{0.4}Ni_{0.3}Mn_{0.2}Mg_{0.1}O_2$ | 0.5 | 25 | 20 | 4.30 | 98.0 | 94.0 | 90.0 |
| Example 8-344 | $LiCo_{0.4}Ni_{0.3}Mn_{0.2}Mg_{0.1}O_2$ | 0.5 | 20 | 30 | 4.30 | 98.1 | 94.4 | 90.4 |
| Comparative Example 8-196 | $LiCo_{0.4}Ni_{0.3}Mn_{0.2}Mg_{0.1}O_2$ | 1.5 | 25 | 30 | 4.30 | 97.7 | 93.5 | 89.6 |

TABLE 184

| | cathode active material | concentration of $Li_2CO_3 + Li_2SO_4$ (wt %) | concentration of protic impurities (ppm) | moisture content (ppm) | upper limit voltage (V) | discharge capacity retention ratio (%) | | |
|---|---|---|---|---|---|---|---|---|
| | | | | | | 10 cycles | 50 cycles | 100 cycles |
| Example 8-345 | $LiCo_{0.4}Ni_{0.3}Mn_{0.2}Mg_{0.1}O_2$ | 0.5 | 20 | 20 | 4.40 | 96.1 | 94.8 | 89.9 |
| Example 8-346 | $LiCo_{0.4}Ni_{0.3}Mn_{0.2}Mg_{0.1}O_2$ | 1.5 | 20 | 20 | 4.40 | 94.9 | 93.4 | 87.7 |
| Example 8-347 | $LiCo_{0.4}Ni_{0.3}Mn_{0.2}Mg_{0.1}O_2$ | 0.5 | 25 | 20 | 4.40 | 95.6 | 94.6 | 88.2 |

TABLE 184-continued

| | cathode active material | concentration of Li$_2$CO$_3$ + Li$_2$SO$_4$ (wt %) | concentration of protic impurities (ppm) | moisture content (ppm) | upper limit voltage (V) | discharge capacity retention ratio (%) | | |
|---|---|---|---|---|---|---|---|---|
| | | | | | | 10 cycles | 50 cycles | 100 cycles |
| Example 8-348 | LiCo$_{0.4}$Ni$_{0.3}$Mn$_{0.2}$Mg$_{0.1}$O$_2$ | 0.5 | 20 | 30 | 4.40 | 95.4 | 94.1 | 89.2 |
| Comparative Example 8-197 | LiCo$_{0.4}$Ni$_{0.3}$Mn$_{0.2}$Mg$_{0.1}$O$_2$ | 1.5 | 25 | 30 | 4.40 | 94.8 | 91.7 | 83.1 |

TABLE 185

| | cathode active material | concentration of Li$_2$CO$_3$ + Li$_2$SO$_4$ (wt %) | concentration of protic impurities (ppm) | moisture content (ppm) | upper limit voltage (V) | discharge capacity retention ratio (%) | | |
|---|---|---|---|---|---|---|---|---|
| | | | | | | 10 cycles | 50 cycles | 100 cycles |
| Example 8-349 | LiCo$_{0.4}$Ni$_{0.3}$Mn$_{0.2}$Mg$_{0.1}$O$_2$ | 0.5 | 20 | 20 | 4.50 | 94.1 | 88.8 | 84.9 |
| Example 8-350 | LiCo$_{0.4}$Ni$_{0.3}$Mn$_{0.2}$Mg$_{0.1}$O$_2$ | 1.5 | 20 | 20 | 4.50 | 90.9 | 86.4 | 77.7 |
| Example 8-351 | LiCo$_{0.4}$Ni$_{0.3}$Mn$_{0.2}$Mg$_{0.1}$O$_2$ | 0.5 | 25 | 20 | 4.50 | 93.6 | 88.6 | 84.2 |
| Example 8-352 | LiCo$_{0.4}$Ni$_{0.3}$Mn$_{0.2}$Mg$_{0.1}$O$_2$ | 0.5 | 20 | 30 | 4.50 | 93.4 | 88.1 | 84.2 |
| Comparative Example 8-198 | LiCo$_{0.4}$Ni$_{0.3}$Mn$_{0.2}$Mg$_{0.1}$O$_2$ | 1.5 | 25 | 30 | 4.50 | 90.8 | 85.7 | 73.1 |

TABLE 186

| | cathode active material | concentration of Li$_2$CO$_3$ + Li$_2$SO$_4$ (wt %) | concentration of protic impurities (ppm) | moisture content (ppm) | upper limit voltage (V) | discharge capacity retention ratio (%) | | |
|---|---|---|---|---|---|---|---|---|
| | | | | | | 10 cycles | 50 cycles | 100 cycles |
| Example 8-353 | LiCo$_{0.3}$Ni$_{0.45}$Mn$_{0.2}$Ti$_{0.05}$O$_2$ | 0.6 | 20 | 20 | 4.25 | 98.3 | 95.0 | 92.0 |
| Example 8-354 | LiCo$_{0.3}$Ni$_{0.45}$Mn$_{0.2}$Ti$_{0.05}$O$_2$ | 1.5 | 20 | 20 | 4.25 | 98.2 | 94.5 | 90.3 |
| Example 8-355 | LiCo$_{0.3}$Ni$_{0.45}$Mn$_{0.2}$Ti$_{0.05}$O$_2$ | 0.6 | 25 | 20 | 4.25 | 98.4 | 94.8 | 91.5 |
| Example 8-356 | LiCo$_{0.3}$Ni$_{0.45}$Mn$_{0.2}$Ti$_{0.05}$O$_2$ | 0.6 | 20 | 30 | 4.25 | 98.3 | 94.7 | 90.9 |
| Comparative Example 8-199 | LiCo$_{0.3}$Ni$_{0.45}$Mn$_{0.2}$Ti$_{0.05}$O$_2$ | 0.6 | 20 | 20 | 4.20 | 98.3 | 95.0 | 92.3 |
| Comparative Example 8-200 | LiCo$_{0.3}$Ni$_{0.45}$Mn$_{0.2}$Ti$_{0.05}$O$_2$ | 1.5 | 20 | 20 | 4.20 | 98.2 | 95.0 | 92.3 |
| Comparative Example 8-201 | LiCo$_{0.3}$Ni$_{0.45}$Mn$_{0.2}$Ti$_{0.05}$O$_2$ | 0.6 | 25 | 20 | 4.20 | 98.2 | 95.1 | 92.3 |
| Comparative Example 8-202 | LiCo$_{0.3}$Ni$_{0.45}$Mn$_{0.2}$Ti$_{0.05}$O$_2$ | 0.6 | 20 | 30 | 4.20 | 98.2 | 94.9 | 92.3 |
| Comparative Example 8-203 | LiCo$_{0.3}$Ni$_{0.45}$Mn$_{0.2}$Ti$_{0.05}$O$_2$ | 1.5 | 25 | 30 | 4.20 | 98.1 | 94.6 | 91.9 |
| Comparative Example 8-204 | LiCo$_{0.3}$Ni$_{0.45}$Mn$_{0.2}$Ti$_{0.05}$O$_2$ | 1.5 | 25 | 30 | 4.25 | 98.2 | 94.0 | 89.9 |

TABLE 187

| | cathode active material | concentration of Li$_2$CO$_3$ + Li$_2$SO$_4$ (wt %) | concentration of protic impurities (ppm) | moisture content (ppm) | upper limit voltage (V) | discharge capacity retention ratio (%) | | |
|---|---|---|---|---|---|---|---|---|
| | | | | | | 10 cycles | 50 cycles | 100 cycles |
| Example 8-357 | LiCo$_{0.3}$Ni$_{0.45}$Mn$_{0.2}$Ti$_{0.05}$O$_2$ | 0.6 | 20 | 20 | 4.30 | 98.2 | 94.7 | 91.5 |
| Example 8-358 | LiCo$_{0.3}$Ni$_{0.45}$Mn$_{0.2}$Ti$_{0.05}$O$_2$ | 1.5 | 20 | 20 | 4.30 | 98.0 | 94.1 | 90.0 |
| Example 8-359 | LiCo$_{0.3}$Ni$_{0.45}$Mn$_{0.2}$Ti$_{0.05}$O$_2$ | 0.6 | 25 | 20 | 4.30 | 98.1 | 94.4 | 91.1 |
| Example 8-360 | LiCo$_{0.3}$Ni$_{0.45}$Mn$_{0.2}$Ti$_{0.05}$O$_2$ | 0.6 | 20 | 30 | 4.30 | 98.3 | 94.7 | 90.8 |
| Comparative Example 8-205 | LiCo$_{0.3}$Ni$_{0.45}$Mn$_{0.2}$Ti$_{0.05}$O$_2$ | 1.5 | 25 | 30 | 4.30 | 97.8 | 92.9 | 88.7 |

TABLE 188

| | cathode active material | concentration of Li$_2$CO$_3$ + Li$_2$SO$_4$ (wt %) | concentration of protic impurities (ppm) | moisture content (ppm) | upper limit voltage (V) | discharge capacity retention ratio (%) | | |
|---|---|---|---|---|---|---|---|---|
| | | | | | | 10 cycles | 50 cycles | 100 cycles |
| Example 8-361 | LiCo$_{0.3}$Ni$_{0.45}$Mn$_{0.2}$Ti$_{0.05}$O$_2$ | 0.6 | 20 | 20 | 4.40 | 95.8 | 94.5 | 89.5 |
| Example 8-362 | LiCo$_{0.3}$Ni$_{0.45}$Mn$_{0.2}$Ti$_{0.05}$O$_2$ | 1.5 | 20 | 20 | 4.40 | 94.1 | 93.0 | 87.0 |
| Example 8-363 | LiCo$_{0.3}$Ni$_{0.45}$Mn$_{0.2}$Ti$_{0.05}$O$_2$ | 0.6 | 25 | 20 | 4.40 | 95.0 | 93.9 | 89.3 |
| Example 8-364 | LiCo$_{0.3}$Ni$_{0.45}$Mn$_{0.2}$Ti$_{0.05}$O$_2$ | 0.6 | 20 | 30 | 4.40 | 94.9 | 94.0 | 89.3 |
| Comparative Example 8-206 | LiCo$_{0.3}$Ni$_{0.45}$Mn$_{0.2}$Ti$_{0.05}$O$_2$ | 1.5 | 25 | 30 | 4.40 | 94.8 | 91.3 | 81.4 |

TABLE 189

| | cathode active material | concentration of Li$_2$CO$_3$ + Li$_2$SO$_4$ (wt %) | concentration of protic impurities (ppm) | moisture content (ppm) | upper limit voltage (V) | discharge capacity retention ratio (%) | | |
|---|---|---|---|---|---|---|---|---|
| | | | | | | 10 cycles | 50 cycles | 100 cycles |
| Example 8-365 | LiCo$_{0.3}$Ni$_{0.45}$Mn$_{0.2}$Ti$_{0.05}$O$_2$ | 0.6 | 20 | 20 | 4.50 | 94.3 | 88.0 | 80.0 |
| Example 8-366 | LiCo$_{0.3}$Ni$_{0.45}$Mn$_{0.2}$Ti$_{0.05}$O$_2$ | 1.5 | 20 | 20 | 4.50 | 91.1 | 86.0 | 73.0 |
| Example 8-367 | LiCo$_{0.3}$Ni$_{0.45}$Mn$_{0.2}$Ti$_{0.05}$O$_2$ | 0.6 | 25 | 20 | 4.50 | 94.0 | 87.9 | 79.5 |
| Example 8-368 | LiCo$_{0.3}$Ni$_{0.45}$Mn$_{0.2}$Ti$_{0.05}$O$_2$ | 0.6 | 20 | 30 | 4.50 | 93.9 | 87.6 | 79.6 |
| Comparative Example 8-207 | LiCo$_{0.3}$Ni$_{0.45}$Mn$_{0.2}$Ti$_{0.05}$O$_2$ | 1.5 | 25 | 30 | 4.50 | 90.8 | 84.3 | 70.4 |

TABLE 190

| | cathode active material | concentration of Li$_2$CO$_3$ + Li$_2$SO$_4$ (wt %) | concentration of protic impurities (ppm) | moisture content (ppm) | upper limit voltage (V) | discharge capacity retention ratio (%) | | |
|---|---|---|---|---|---|---|---|---|
| | | | | | | 10 cycles | 50 cycles | 100 cycles |
| Example 8-369 | LiCo$_{0.2}$Ni$_{0.5}$Mn$_{0.25}$Cr$_{0.05}$O$_2$ | 0.5 | 20 | 20 | 4.25 | 97.5 | 94.1 | 91.4 |
| Example 8-370 | LiCo$_{0.2}$Ni$_{0.5}$Mn$_{0.25}$Cr$_{0.05}$O$_2$ | 1.5 | 20 | 20 | 4.25 | 97.3 | 93.8 | 90.2 |
| Example 8-371 | LiCo$_{0.2}$Ni$_{0.5}$Mn$_{0.25}$Cr$_{0.05}$O$_2$ | 0.5 | 25 | 20 | 4.25 | 97.4 | 94.0 | 91.1 |
| Example 8-372 | LiCo$_{0.2}$Ni$_{0.5}$Mn$_{0.25}$Cr$_{0.05}$O$_2$ | 0.5 | 20 | 30 | 4.25 | 97.5 | 94.1 | 90.7 |
| Comparative Example 8-208 | LiCo$_{0.2}$Ni$_{0.5}$Mn$_{0.25}$Cr$_{0.05}$O$_2$ | 0.5 | 20 | 20 | 4.20 | 97.5 | 94.1 | 92.2 |
| Comparative Example 8-209 | LiCo$_{0.2}$Ni$_{0.5}$Mn$_{0.25}$Cr$_{0.05}$O$_2$ | 1.5 | 20 | 20 | 4.20 | 97.5 | 94.0 | 92.1 |
| Comparative Example 8-210 | LiCo$_{0.2}$Ni$_{0.5}$Mn$_{0.25}$Cr$_{0.05}$O$_2$ | 0.5 | 25 | 20 | 4.20 | 97.5 | 94.1 | 92.2 |
| Comparative Example 8-211 | LiCo$_{0.2}$Ni$_{0.5}$Mn$_{0.25}$Cr$_{0.05}$O$_2$ | 0.5 | 20 | 30 | 4.20 | 97.5 | 94.1 | 92.1 |
| Comparative Example 8-212 | LiCo$_{0.2}$Ni$_{0.5}$Mn$_{0.25}$Cr$_{0.05}$O$_2$ | 1.5 | 25 | 30 | 4.20 | 97.4 | 93.9 | 91.7 |
| Comparative Example 8-213 | LiCo$_{0.2}$Ni$_{0.5}$Mn$_{0.25}$Cr$_{0.05}$O$_2$ | 1.5 | 25 | 30 | 4.25 | 97.2 | 93.7 | 90.0 |

TABLE 191

| | cathode active material | concentration of Li$_2$CO$_3$ + Li$_2$SO$_4$ (wt %) | concentration of protic impurities (ppm) | moisture content (ppm) | upper limit voltage (V) | discharge capacity retention ratio (%) | | |
|---|---|---|---|---|---|---|---|---|
| | | | | | | 10 cycles | 50 cycles | 100 cycles |
| Example 8-373 | LiCo$_{0.2}$Ni$_{0.5}$Mn$_{0.25}$Cr$_{0.05}$O$_2$ | 0.5 | 20 | 20 | 4.30 | 97.4 | 94.0 | 91.2 |
| Example 8-374 | LiCo$_{0.2}$Ni$_{0.5}$Mn$_{0.25}$Cr$_{0.05}$O$_2$ | 1.5 | 20 | 20 | 4.30 | 97.2 | 93.4 | 90.0 |
| Example 8-375 | LiCo$_{0.2}$Ni$_{0.5}$Mn$_{0.25}$Cr$_{0.05}$O$_2$ | 0.5 | 25 | 20 | 4.30 | 97.4 | 93.7 | 91.0 |
| Example 8-376 | LiCo$_{0.2}$Ni$_{0.5}$Mn$_{0.25}$Cr$_{0.05}$O$_2$ | 0.5 | 20 | 30 | 4.30 | 97.4 | 93.7 | 90.7 |
| Comparative Example 8-214 | LiCo$_{0.2}$Ni$_{0.5}$Mn$_{0.25}$Cr$_{0.05}$O$_2$ | 1.5 | 25 | 30 | 4.30 | 97.0 | 93.2 | 90.0 |

TABLE 192

| | cathode active material | concentration of Li$_2$CO$_3$ + Li$_2$SO$_4$ (wt %) | concentration of protic impurities (ppm) | moisture content (ppm) | upper limit voltage (V) | discharge capacity retention ratio (%) | | |
|---|---|---|---|---|---|---|---|---|
| | | | | | | 10 cycles | 50 cycles | 100 cycles |
| Example 8-377 | LiCo$_{0.2}$Ni$_{0.5}$Mn$_{0.25}$Cr$_{0.05}$O$_2$ | 0.5 | 20 | 20 | 4.40 | 95.7 | 94.1 | 89.4 |
| Example 8-378 | LiCo$_{0.2}$Ni$_{0.5}$Mn$_{0.25}$Cr$_{0.05}$O$_2$ | 1.5 | 20 | 20 | 4.40 | 94.6 | 92.7 | 87.1 |
| Example 8-379 | LiCo$_{0.2}$Ni$_{0.5}$Mn$_{0.25}$Cr$_{0.05}$O$_2$ | 0.5 | 25 | 20 | 4.40 | 95.3 | 93.6 | 89.5 |
| Example 8-380 | LiCo$_{0.2}$Ni$_{0.5}$Mn$_{0.25}$Cr$_{0.05}$O$_2$ | 0.5 | 20 | 30 | 4.40 | 95.0 | 93.7 | 88.9 |
| Comparative Example 8-215 | LiCo$_{0.2}$Ni$_{0.5}$Mn$_{0.25}$Cr$_{0.05}$O$_2$ | 1.5 | 25 | 30 | 4.40 | 94.8 | 90.8 | 79.9 |

TABLE 193

| | cathode active material | concentration of Li$_2$CO$_3$ + Li$_2$SO$_4$ (wt %) | concentration of protic impurities (ppm) | moisture content (ppm) | upper limit voltage (V) | discharge capacity retention ratio (%) | | |
|---|---|---|---|---|---|---|---|---|
| | | | | | | 10 cycles | 50 cycles | 100 cycles |
| Example 8-381 | LiCo$_{0.2}$Ni$_{0.5}$Mn$_{0.25}$Cr$_{0.05}$O$_2$ | 0.5 | 20 | 20 | 4.50 | 92.7 | 87.1 | 78.4 |
| Example 8-382 | LiCo$_{0.2}$Ni$_{0.5}$Mn$_{0.25}$Cr$_{0.05}$O$_2$ | 1.5 | 20 | 20 | 4.50 | 90.6 | 85.7 | 73.1 |
| Example 8-383 | LiCo$_{0.2}$Ni$_{0.5}$Mn$_{0.25}$Cr$_{0.05}$O$_2$ | 0.5 | 25 | 20 | 4.50 | 92.3 | 86.6 | 77.7 |

TABLE 193-continued

|  | cathode active material | concentration of Li$_2$CO$_3$ + Li$_2$SO$_4$ (wt %) | concentration of protic impurities (ppm) | moisture content (ppm) | upper limit voltage (V) | discharge capacity retention ratio (%) | | |
|---|---|---|---|---|---|---|---|---|
|  |  |  |  |  |  | 10 cycles | 50 cycles | 100 cycles |
| Example 8-384 | LiCo$_{0.2}$Ni$_{0.5}$Mn$_{0.25}$Cr$_{0.05}$O$_2$ | 0.5 | 20 | 30 | 4.50 | 92.0 | 86.7 | 78.1 |
| Comparative Example 8-216 | LiCo$_{0.2}$Ni$_{0.5}$Mn$_{0.25}$Cr$_{0.05}$O$_2$ | 1.5 | 25 | 30 | 4.50 | 90.4 | 84.6 | 70.9 |

TABLE 194

|  | cathode active material | concentration of Li$_2$CO$_3$ + Li$_2$SO$_4$ (wt %) | concentration of protic impurities (ppm) | moisture content (ppm) | upper limit voltage (V) | discharge capacity retention ratio (%) | | |
|---|---|---|---|---|---|---|---|---|
|  |  |  |  |  |  | 10 cycles | 50 cycles | 100 cycles |
| Example 8-385 | LiCo$_{0.3}$Ni$_{0.3}$Mn$_{0.3}$Fe$_{0.1}$O$_2$ | 0.4 | 20 | 20 | 4.25 | 98.0 | 95.4 | 91.5 |
| Example 8-386 | LiCo$_{0.3}$Ni$_{0.3}$Mn$_{0.3}$Fe$_{0.1}$O$_2$ | 1.5 | 20 | 20 | 4.25 | 98.0 | 95.0 | 90.5 |
| Example 8-387 | LiCo$_{0.3}$Ni$_{0.3}$Mn$_{0.3}$Fe$_{0.1}$O$_2$ | 0.4 | 25 | 20 | 4.25 | 98.1 | 95.0 | 90.9 |
| Example 8-388 | LiCo$_{0.3}$Ni$_{0.3}$Mn$_{0.3}$Fe$_{0.1}$O$_2$ | 0.4 | 20 | 30 | 4.25 | 98.0 | 95.1 | 91.0 |
| Comparative Example 8-217 | LiCo$_{0.3}$Ni$_{0.3}$Mn$_{0.3}$Fe$_{0.1}$O$_2$ | 0.4 | 20 | 20 | 4.20 | 98.0 | 95.5 | 92.4 |
| Comparative Example 8-218 | LiCo$_{0.3}$Ni$_{0.3}$Mn$_{0.3}$Fe$_{0.1}$O$_2$ | 1.5 | 20 | 20 | 4.20 | 98.0 | 95.6 | 92.4 |
| Comparative Example 8-219 | LiCo$_{0.3}$Ni$_{0.3}$Mn$_{0.3}$Fe$_{0.1}$O$_2$ | 0.4 | 25 | 20 | 4.20 | 98.0 | 95.5 | 92.5 |
| Comparative Example 8-220 | LiCo$_{0.3}$Ni$_{0.3}$Mn$_{0.3}$Fe$_{0.1}$O$_2$ | 0.4 | 20 | 30 | 4.20 | 98.0 | 95.6 | 92.4 |
| Comparative Example 8-221 | LiCo$_{0.3}$Ni$_{0.3}$Mn$_{0.3}$Fe$_{0.1}$O$_2$ | 1.5 | 25 | 30 | 4.20 | 98.0 | 95.3 | 91.8 |
| Comparative Example 8-222 | LiCo$_{0.3}$Ni$_{0.3}$Mn$_{0.3}$Fe$_{0.1}$O$_2$ | 1.5 | 25 | 30 | 4.25 | 97.9 | 94.9 | 90.3 |

TABLE 195

|  | cathode active material | concentration of Li$_2$CO$_3$ + Li$_2$SO$_4$ (wt %) | concentration of protic impurities (ppm) | moisture content (ppm) | upper limit voltage (V) | discharge capacity retention ratio (%) | | |
|---|---|---|---|---|---|---|---|---|
|  |  |  |  |  |  | 10 cycles | 50 cycles | 100 cycles |
| Example 8-389 | LiCo$_{0.3}$Ni$_{0.3}$Mn$_{0.3}$Fe$_{0.1}$O$_2$ | 0.4 | 20 | 20 | 4.30 | 98.0 | 95.3 | 91.2 |
| Example 8-390 | LiCo$_{0.3}$Ni$_{0.3}$Mn$_{0.3}$Fe$_{0.1}$O$_2$ | 1.5 | 20 | 20 | 4.30 | 98.0 | 94.8 | 90.2 |
| Example 8-391 | LiCo$_{0.3}$Ni$_{0.3}$Mn$_{0.3}$Fe$_{0.1}$O$_2$ | 0.4 | 25 | 20 | 4.30 | 98.1 | 94.9 | 90.7 |
| Example 8-392 | LiCo$_{0.3}$Ni$_{0.3}$Mn$_{0.3}$Fe$_{0.1}$O$_2$ | 0.4 | 20 | 30 | 4.30 | 98.0 | 94.8 | 90.8 |
| Comparative Example 8-223 | LiCo$_{0.3}$Ni$_{0.3}$Mn$_{0.3}$Fe$_{0.1}$O$_2$ | 1.5 | 25 | 30 | 4.30 | 97.9 | 94.2 | 90.0 |

TABLE 196

|  | cathode active material | concentration of Li$_2$CO$_3$ + Li$_2$SO$_4$ (wt %) | concentration of protic impurities (ppm) | moisture content (ppm) | upper limit voltage (V) | discharge capacity retention ratio (%) | | |
|---|---|---|---|---|---|---|---|---|
|  |  |  |  |  |  | 10 cycles | 50 cycles | 100 cycles |
| Example 8-393 | LiCo$_{0.3}$Ni$_{0.3}$Mn$_{0.3}$Fe$_{0.1}$O$_2$ | 0.4 | 20 | 20 | 4.40 | 96.0 | 93.9 | 89.5 |
| Example 8-394 | LiCo$_{0.3}$Ni$_{0.3}$Mn$_{0.3}$Fe$_{0.1}$O$_2$ | 1.5 | 20 | 20 | 4.40 | 95.6 | 91.9 | 87.4 |
| Example 8-395 | LiCo$_{0.3}$Ni$_{0.3}$Mn$_{0.3}$Fe$_{0.1}$O$_2$ | 0.4 | 25 | 20 | 4.40 | 95.9 | 92.7 | 88.5 |
| Example 8-396 | LiCo$_{0.3}$Ni$_{0.3}$Mn$_{0.3}$Fe$_{0.1}$O$_2$ | 0.4 | 20 | 30 | 4.40 | 95.7 | 92.8 | 89.0 |
| Comparative Example 8-224 | LiCo$_{0.3}$Ni$_{0.3}$Mn$_{0.3}$Fe$_{0.1}$O$_2$ | 1.5 | 25 | 30 | 4.40 | 95.4 | 90.2 | 80.1 |

TABLE 197

|  | cathode active material | concentration of Li$_2$CO$_3$ + Li$_2$SO$_4$ (wt %) | concentration of protic impurities (ppm) | moisture content (ppm) | upper limit voltage (V) | discharge capacity retention ratio (%) | | |
|---|---|---|---|---|---|---|---|---|
|  |  |  |  |  |  | 10 cycles | 50 cycles | 100 cycles |
| Example 8-397 | LiCo$_{0.3}$Ni$_{0.3}$Mn$_{0.3}$Fe$_{0.1}$O$_2$ | 0.4 | 20 | 20 | 4.50 | 93.0 | 87.4 | 79.5 |
| Example 8-398 | LiCo$_{0.3}$Ni$_{0.3}$Mn$_{0.3}$Fe$_{0.1}$O$_2$ | 1.5 | 20 | 20 | 4.50 | 90.6 | 86.4 | 73.4 |
| Example 8-399 | LiCo$_{0.3}$Ni$_{0.3}$Mn$_{0.3}$Fe$_{0.1}$O$_2$ | 0.4 | 25 | 20 | 4.50 | 92.2 | 87.2 | 79.2 |
| Example 8-400 | LiCo$_{0.3}$Ni$_{0.3}$Mn$_{0.3}$Fe$_{0.1}$O$_2$ | 0.4 | 20 | 30 | 4.50 | 92.7 | 86.8 | 79.0 |
| Comparative Example 8-225 | LiCo$_{0.3}$Ni$_{0.3}$Mn$_{0.3}$Fe$_{0.1}$O$_2$ | 1.5 | 25 | 30 | 4.50 | 90.4 | 84.2 | 71.1 |

TABLE 198

| | cathode active material | concentration of $Li_2CO_3 + Li_2SO_4$ (wt %) | concentration of protic impurities (ppm) | moisture content (ppm) | upper limit voltage (V) | discharge capacity retention ratio (%) 10 cycles | 50 cycles | 100 cycles |
|---|---|---|---|---|---|---|---|---|
| Example 8-401 | $LiCo_{0.3}Ni_{0.4}Mn_{0.15}Al_{0.1}Mg_{0.05}O_2$ | 0.7 | 20 | 20 | 4.25 | 98.6 | 94.8 | 92.4 |
| Example 8-402 | $LiCo_{0.3}Ni_{0.4}Mn_{0.15}Al_{0.1}Mg_{0.05}O_2$ | 1.5 | 20 | 20 | 4.25 | 98.2 | 94.5 | 91.5 |
| Example 8-403 | $LiCo_{0.3}Ni_{0.4}Mn_{0.15}Al_{0.1}Mg_{0.05}O_2$ | 0.7 | 25 | 20 | 4.25 | 98.3 | 94.7 | 91.7 |
| Example 8-404 | $LiCo_{0.3}Ni_{0.4}Mn_{0.15}Al_{0.1}Mg_{0.05}O_2$ | 0.7 | 20 | 30 | 4.25 | 98.2 | 94.6 | 91.8 |
| Comparative Example 8-226 | $LiCo_{0.3}Ni_{0.4}Mn_{0.15}Al_{0.1}Mg_{0.05}O_2$ | 0.7 | 20 | 20 | 4.20 | 98.6 | 94.8 | 92.6 |
| Comparative Example 8-227 | $LiCo_{0.3}Ni_{0.4}Mn_{0.15}Al_{0.1}Mg_{0.05}O_2$ | 1.5 | 20 | 20 | 4.20 | 98.5 | 94.8 | 92.5 |
| Comparative Example 8-228 | $LiCo_{0.3}Ni_{0.4}Mn_{0.15}Al_{0.1}Mg_{0.05}O_2$ | 0.7 | 25 | 20 | 4.20 | 98.5 | 94.8 | 92.5 |
| Comparative Example 8-229 | $LiCo_{0.3}Ni_{0.4}Mn_{0.15}Al_{0.1}Mg_{0.05}O_2$ | 0.7 | 20 | 30 | 4.20 | 98.6 | 94.8 | 92.6 |
| Comparative Example 8-230 | $LiCo_{0.3}Ni_{0.4}Mn_{0.15}Al_{0.1}Mg_{0.05}O_2$ | 1.5 | 25 | 30 | 4.20 | 98.5 | 94.6 | 92.0 |
| Comparative Example 8-231 | $LiCo_{0.3}Ni_{0.4}Mn_{0.15}Al_{0.1}Mg_{0.05}O_2$ | 1.5 | 25 | 30 | 4.25 | 98.2 | 94.2 | 91.0 |

TABLE 199

| | cathode active material | concentration of $Li_2CO_3 + Li_2SO_4$ (wt %) | concentration of protic impurities (ppm) | moisture content (ppm) | upper limit voltage (V) | discharge capacity retention ratio (%) 10 cycles | 50 cycles | 100 cycles |
|---|---|---|---|---|---|---|---|---|
| Example 8-405 | $LiCo_{0.3}Ni_{0.4}Mn_{0.15}Al_{0.1}Mg_{0.05}O_2$ | 0.7 | 20 | 20 | 4.30 | 98.4 | 94.7 | 92.1 |
| Example 8-406 | $LiCo_{0.3}Ni_{0.4}Mn_{0.15}Al_{0.1}Mg_{0.05}O_2$ | 1.5 | 20 | 20 | 4.30 | 98.0 | 94.2 | 91.1 |
| Example 8-407 | $LiCo_{0.3}Ni_{0.4}Mn_{0.15}Al_{0.1}Mg_{0.05}O_2$ | 0.7 | 25 | 20 | 4.30 | 98.0 | 94.5 | 91.7 |
| Example 8-408 | $LiCo_{0.3}Ni_{0.4}Mn_{0.15}Al_{0.1}Mg_{0.05}O_2$ | 0.7 | 20 | 30 | 4.30 | 98.0 | 94.6 | 91.6 |
| Comparative Example 8-232 | $LiCo_{0.3}Ni_{0.4}Mn_{0.15}Al_{0.1}Mg_{0.05}O_2$ | 1.5 | 25 | 30 | 4.30 | 98.0 | 94.0 | 90.6 |

TABLE 200

| | cathode active material | concentration of $Li_2CO_3 + Li_2SO_4$ (wt %) | concentration of protic impurities (ppm) | moisture content (ppm) | upper limit voltage (V) | discharge capacity retention ratio (%) 10 cycles | 50 cycles | 100 cycles |
|---|---|---|---|---|---|---|---|---|
| Example 8-409 | $LiCo_{0.3}Ni_{0.4}Mn_{0.15}Al_{0.1}Mg_{0.05}O_2$ | 0.7 | 20 | 20 | 4.40 | 96.3 | 93.3 | 89.7 |
| Example 8-410 | $LiCo_{0.3}Ni_{0.4}Mn_{0.15}Al_{0.1}Mg_{0.05}O_2$ | 1.5 | 20 | 20 | 4.40 | 95.3 | 91.8 | 87.7 |
| Example 8-411 | $LiCo_{0.3}Ni_{0.4}Mn_{0.15}Al_{0.1}Mg_{0.05}O_2$ | 0.7 | 25 | 20 | 4.40 | 96.2 | 93.0 | 88.7 |
| Example 8-412 | $LiCo_{0.3}Ni_{0.4}Mn_{0.15}Al_{0.1}Mg_{0.05}O_2$ | 0.7 | 20 | 30 | 4.40 | 96.3 | 92.8 | 89.5 |
| Comparative Example 8-233 | $LiCo_{0.3}Ni_{0.4}Mn_{0.15}Al_{0.1}Mg_{0.05}O_2$ | 1.5 | 25 | 30 | 4.40 | 95.3 | 90.6 | 81.2 |

TABLE 201

| | cathode active material | concentration of $Li_2CO_3 + Li_2SO_4$ (wt %) | concentration of protic impurities (ppm) | moisture content (ppm) | upper limit voltage (V) | discharge capacity retention ratio (%) 10 cycles | 50 cycles | 100 cycles |
|---|---|---|---|---|---|---|---|---|
| Example 8-413 | $LiCo_{0.3}Ni_{0.4}Mn_{0.15}Al_{0.1}Mg_{0.05}O_2$ | 0.7 | 20 | 20 | 4.50 | 94.1 | 88.3 | 82.7 |
| Example 8-414 | $LiCo_{0.3}Ni_{0.4}Mn_{0.15}Al_{0.1}Mg_{0.05}O_2$ | 1.5 | 20 | 20 | 4.50 | 91.2 | 85.8 | 76.7 |
| Example 8-415 | $LiCo_{0.3}Ni_{0.4}Mn_{0.15}Al_{0.1}Mg_{0.05}O_2$ | 0.7 | 25 | 20 | 4.50 | 93.7 | 88.0 | 81.7 |
| Example 8-416 | $LiCo_{0.3}Ni_{0.4}Mn_{0.15}Al_{0.1}Mg_{0.05}O_2$ | 0.7 | 20 | 30 | 4.50 | 93.9 | 87.8 | 81.5 |
| Comparative Example 8-234 | $LiCo_{0.3}Ni_{0.4}Mn_{0.15}Al_{0.1}Mg_{0.05}O_2$ | 1.5 | 25 | 30 | 4.50 | 90.8 | 84.2 | 72.2 |

TABLE 202

| | cathode active material | concentration of $Li_2CO_3 + Li_2SO_4$ (wt %) | concentration of protic impurities (ppm) | moisture content (ppm) | upper limit voltage (V) | discharge capacity retention ratio (%) | | |
|---|---|---|---|---|---|---|---|---|
| | | | | | | 10 cycles | 50 cycles | 100 cycles |
| Example 8-417 | $LiCo_{0.3}Ni_{0.4}Mn_{0.15}Cr_{0.1}Mg_{0.05}O_2$ | 0.8 | 20 | 20 | 4.25 | 97.6 | 94.4 | 91.9 |
| Example 8-418 | $LiCo_{0.3}Ni_{0.4}Mn_{0.15}Cr_{0.1}Mg_{0.05}O_2$ | 1.5 | 20 | 20 | 4.25 | 97.4 | 94.0 | 90.9 |
| Example 8-419 | $LiCo_{0.3}Ni_{0.4}Mn_{0.15}Cr_{0.1}Mg_{0.05}O_2$ | 0.8 | 25 | 20 | 4.25 | 97.5 | 94.2 | 91.3 |
| Example 8-420 | $LiCo_{0.3}Ni_{0.4}Mn_{0.15}Cr_{0.1}Mg_{0.05}O_2$ | 0.8 | 20 | 30 | 4.25 | 97.5 | 94.0 | 91.1 |
| Comparative Example 8-235 | $LiCo_{0.3}Ni_{0.4}Mn_{0.15}Cr_{0.1}Mg_{0.05}O_2$ | 0.8 | 20 | 20 | 4.20 | 97.6 | 94.4 | 92.3 |
| Comparative Example 8-236 | $LiCo_{0.3}Ni_{0.4}Mn_{0.15}Cr_{0.1}Mg_{0.05}O_2$ | 1.5 | 20 | 20 | 4.20 | 97.5 | 94.5 | 92.3 |
| Comparative Example 8-237 | $LiCo_{0.3}Ni_{0.4}Mn_{0.15}Cr_{0.1}Mg_{0.05}O_2$ | 0.8 | 25 | 20 | 4.20 | 97.5 | 94.5 | 92.3 |
| Comparative Example 8-238 | $LiCo_{0.3}Ni_{0.4}Mn_{0.15}Cr_{0.1}Mg_{0.05}O_2$ | 0.8 | 20 | 30 | 4.20 | 97.5 | 94.5 | 92.2 |
| Comparative Example 8-239 | $LiCo_{0.3}Ni_{0.4}Mn_{0.15}Cr_{0.1}Mg_{0.05}O_2$ | 1.5 | 25 | 30 | 4.20 | 97.5 | 94.4 | 91.7 |
| Comparative Example 8-240 | $LiCo_{0.3}Ni_{0.4}Mn_{0.15}Cr_{0.1}Mg_{0.05}O_2$ | 1.5 | 25 | 30 | 4.25 | 97.4 | 94.0 | 90.4 |

TABLE 204

| | cathode active material | concentration of $Li_2CO_3 + Li_2SO_4$ (wt %) | concentration of protic impurities (ppm) | moisture content (ppm) | upper limit voltage (V) | discharge capacity retention ratio (%) | | |
|---|---|---|---|---|---|---|---|---|
| | | | | | | 10 cycles | 50 cycles | 100 cycles |
| Example 8-421 | $LiCo_{0.3}Ni_{0.4}Mn_{0.15}Cr_{0.1}Mg_{0.05}O_2$ | 0.8 | 20 | 20 | 4.30 | 97.5 | 94.2 | 91.7 |
| Example 8-422 | $LiCo_{0.3}Ni_{0.4}Mn_{0.15}Cr_{0.1}Mg_{0.05}O_2$ | 1.5 | 20 | 20 | 4.30 | 97.2 | 93.7 | 90.9 |
| Example 8-423 | $LiCo_{0.3}Ni_{0.4}Mn_{0.15}Cr_{0.1}Mg_{0.05}O_2$ | 0.8 | 25 | 20 | 4.30 | 97.3 | 94.0 | 91.1 |
| Example 8-424 | $LiCo_{0.3}Ni_{0.4}Mn_{0.15}Cr_{0.1}Mg_{0.05}O_2$ | 0.8 | 20 | 30 | 4.30 | 97.3 | 93.8 | 90.8 |
| Comparative Example 8-241 | $LiCo_{0.3}Ni_{0.4}Mn_{0.15}Cr_{0.1}Mg_{0.05}O_2$ | 1.5 | 25 | 30 | 4.30 | 97.1 | 93.3 | 90.0 |

TABLE 205

| | cathode active material | concentration of $Li_2CO_3 + Li_2SO_4$ (wt %) | concentration of protic impurities (ppm) | moisture content (ppm) | upper limit voltage (V) | discharge capacity retention ratio (%) | | |
|---|---|---|---|---|---|---|---|---|
| | | | | | | 10 cycles | 50 cycles | 100 cycles |
| Example 8-425 | $LiCo_{0.3}Ni_{0.4}Mn_{0.15}Cr_{0.1}Mg_{0.05}O_2$ | 0.8 | 20 | 20 | 4.40 | 96.5 | 93.7 | 89.9 |
| Example 8-426 | $LiCo_{0.3}Ni_{0.4}Mn_{0.15}Cr_{0.1}Mg_{0.05}O_2$ | 1.5 | 20 | 20 | 4.40 | 95.5 | 91.9 | 87.9 |
| Example 8-427 | $LiCo_{0.3}Ni_{0.4}Mn_{0.15}Cr_{0.1}Mg_{0.05}O_2$ | 0.8 | 25 | 20 | 4.40 | 95.9 | 93.3 | 88.5 |
| Example 8-428 | $LiCo_{0.3}Ni_{0.4}Mn_{0.15}Cr_{0.1}Mg_{0.05}O_2$ | 0.8 | 20 | 30 | 4.40 | 96.3 | 93.0 | 88.3 |
| Comparative Example 8-242 | $LiCo_{0.3}Ni_{0.4}Mn_{0.15}Cr_{0.1}Mg_{0.05}O_2$ | 1.5 | 25 | 30 | 4.40 | 95.2 | 91.1 | 80.4 |

TABLE 206

| | cathode active material | concentration of $Li_2CO_3 + Li_2SO_4$ (wt %) | concentration of protic impurities (ppm) | moisture content (ppm) | upper limit voltage (V) | discharge capacity retention ratio (%) | | |
|---|---|---|---|---|---|---|---|---|
| | | | | | | 10 cycles | 50 cycles | 100 cycles |
| Example 8-429 | $LiCo_{0.3}Ni_{0.4}Mn_{0.15}Cr_{0.1}Mg_{0.05}O_2$ | 0.8 | 20 | 20 | 4.50 | 92.6 | 87.4 | 81.9 |
| Example 8-430 | $LiCo_{0.3}Ni_{0.4}Mn_{0.15}Cr_{0.1}Mg_{0.05}O_2$ | 1.5 | 20 | 20 | 4.50 | 90.7 | 85.9 | 75.9 |
| Example 8-431 | $LiCo_{0.3}Ni_{0.4}Mn_{0.15}Cr_{0.1}Mg_{0.05}O_2$ | 0.8 | 25 | 20 | 4.50 | 91.9 | 86.9 | 81.5 |
| Example 8-432 | $LiCo_{0.3}Ni_{0.4}Mn_{0.15}Cr_{0.1}Mg_{0.05}O_2$ | 0.8 | 20 | 30 | 4.50 | 92.3 | 87.0 | 81.3 |
| Comparative Example 8-243 | $LiCo_{0.3}Ni_{0.4}Mn_{0.15}Cr_{0.1}Mg_{0.05}O_2$ | 1.5 | 25 | 30 | 4.50 | 90.2 | 85.0 | 72.4 |

The invention claimed is:

1. A battery comprising:
    a cathode;
    an anode; and
    an electrolyte,
    wherein,
    the cathode has a cathode active material including a lithium composite oxide which contains lithium (Li), at least either cobalt (Co) or nickel (Ni), and oxygen (O),
    the anode has an anode active material including at least one kind selected from the group consisting of anode materials capable of insertion and extraction of lithium, and lithium metals,
    the battery charges at 4.25 V or more,
    a maximum of 1.0 wt % a total amount of lithium carbonate and lithium sulphate impurities in the cathode and the cathode active material,
    a maximum of 20 ppm of a concentration protic impurities in the electrolyte, and
    the battery has a discharge capacity within the range of 7.0 to 8.9 mAh.

2. A battery according to claim 1, having a maximum of 20 ppm of a concentration of a moisture content in the electrolyte.

3. A battery according to claim 1, wherein the lithium composite oxide furthermore contains at least one kind selected from the group consisting of manganese (Mn), aluminum (Al), magnesium (Mg), titanium (Ti), chromium (Cr), and iron (Fe).

4. A battery according to claim 3, wherein the lithium composite oxide contains cobalt and nickel.

5. A battery according to claim 3, wherein the lithium composite oxide contains manganese.

6. A battery according to claim 5, wherein the lithium composite oxide contains not only manganese but also at least one kind selected from the group consisting of aluminum, magnesium, titanium, chromium, and iron.

7. A battery according to claim 1, wherein the electrolyte contains a solvent and a lithium salt, and the solvent contains a cyclic carbonate.

8. A battery according to claim 7, wherein content of the cyclic carbonate in the solvent is not less than 20 vol % nor more than 100 vol %.

9. A battery according to claim 7, wherein the solvent contains a cyclic carboxylate with content of less than 50 vol %.

10. A battery according to claim 7, wherein the solvent contains vinylene carbonate with content of less than 10 vol %.

11. A battery according to claim 10, wherein the solvent furthermore contains a cyclic carboxylate.

12. A battery according to claim 7, wherein the solvent contains vinyl ethylene carbonate with content of less than 10 vol %.

13. A battery according to claim 12, wherein the solvent furthermore contains a cyclic carboxylate.

14. A battery according to claim 7, wherein the solvent furthermore contains a chain carbonate with content of 80 vol %. or less.

15. A battery according to claim 7, wherein content of the lithium salt to the solvent is not less than 0.6 mol/kg nor more than 2.0 mol/kg.

16. A battery according to claim 7, wherein the electrolyte furthermore contains a high molecular weight compound.

17. A battery according to claim 1, wherein the electrolyte contains at least one kind selected from the group consisting of $LiPF_6$, $LiBF_4$, $LiClO_4$, $LiN(CF_3SO_2)_2$ and $LiN(C_2F_5SO_2)_2$.

18. A battery according to claim 1, wherein the anode contains a carbon material.

19. A battery according to claim 18, wherein the anode contains at least one kind selected from the group consisting of graphite, graphitizable carbon, and non-graphitizable carbon.

20. A battery according to claim 19, wherein the anode contains non-graphitizable carbon.

21. A battery according to claim 19, wherein the anode contains graphite.

22. A battery according to claim 1, wherein the anode contains at least one kind selected from the group consisting of simple substances, alloys and compounds of metallic elements and semimetal elements which can form an alloy with lithium.

23. A battery according to claim 22, wherein the anode contains at least one kind selected from the group consisting of simple substances, alloys and compounds of tin (Sn), lead (Pb), aluminum (Al), indium (In), silicon (Si), zinc (Zn), copper (Cu), cobalt, antimony (Sb), bismuth (Bi), cadmium (Cd), magnesium (Mg), boron (B), gallium (Ga), germanium (Ge), arsenic (As), silver (Ag), hafnium (Hf), zirconium (Zr), and yttrium (Y).

24. A battery according to claim 1, wherein a capacity of the anode includes a capacity component by insertion and extraction of lithium and a capacity component by precipitation and dissolution of lithium and is expressed by the sum of the capacity components.

25. A battery comprising:
    a cathode:
    an anode: and
    an electrolyte,
    wherein,
    the cathode has a cathode active material including a lithium composite oxide which contains lithium (Li), at least either cobalt (Co) or nickel (Ni), and oxygen (O),
    the anode has an anode active material including at least one kind selected from the group consisting of anode materials capable of insertion and extraction of lithium, and lithium metals,
    the battery charges at 4.25 V or more,
    a maximum of 20 ppm of a concentration of protic impurities in the electrolyte, and
    said battery has a discharge capacity within the range of 7.0 to 8.9 mAh.

26. A battery according to claim 25, having a maximum of 20 ppm of a moisture content in the electrolyte.

27. A battery according to claim 25, wherein the lithium composite oxide furthermore contains at least one kind selected from the group consisting of manganese (Mn), aluminum (Al), magnesium (Mg), titanium (Ti), chromium (Cr), and iron (Fe).

28. battery according to claim 27, wherein the lithium composite oxide contains cobalt and nickel.

29. A battery according to claim 27, wherein the lithium composite oxide contains manganese.

30. A battery according to claim 29, wherein the lithium composite oxide contains not only manganese but also at least one kind selected from the group consisting of aluminum, magnesium, titanium, chromium, and iron.

31. A battery according to claim 25, wherein the electrolyte contains a solvent and a lithium salt, and the solvent contains a cyclic carbonate.

32. A battery according to claim 31, wherein content of the cyclic carbonate in the solvent is not less than 20 vol % nor more than 100 vol %.

33. A battery according to claim 31, wherein the solvent contains a cyclic carboxylate with content of less than 50 vol %.

34. A battery according to claim 31, wherein the solvent contains vinylene carbonate with content of less than 10 vol %.

35. A battery according to claim 34, wherein the solvent furthermore contains a cyclic carboxylate.

36. A battery according to claim 31, wherein the solvent contains vinyl ethylene carbonate with content of less than 10 vol %.

37. A battery according to claim 36, wherein the solvent furthermore contains a cyclic carboxylate.

38. A battery according to claim 31, wherein the solvent furthermore contains a chain carbonate with content of 80 vol % or less.

39. A battery according to claim 31, wherein content of the lithium salt to the solvent is not less than 0.6 mol/kg nor more than 2.0 mol/kg.

40. A battery according to claim 31, wherein the electrolyte furthermore contains a high molecular weight compound.

41. A battery according to claim 25, wherein the electrolyte contains at least one kind selected from the group consisting of $LiPF_6$, $LiBF_4$, $LiClO_4$, $LiN(CF_3SO_2)_2$ and $LiN(C_2F_5SO_2)_2$.

42. A battery according to claim 25, wherein the anode contains a carbon material.

43. A battery according to claim 42, wherein the anode contains at least one kind selected from the group consisting of graphite, graphitizable carbon, and non-graphitizable carbon.

44. A battery according to claim 43, wherein the anode contains non-graphitizable carbon.

45. A battery according to claim 43, wherein the anode contains graphite.

46. A battery according to claim 25, wherein the anode contains at least one kind selected from the group consisting of simple substances, alloys and compounds of metallic elements and semimetal elements which can form an alloy with lithium.

47. A battery according to claim 46, wherein the anode contains at least one kind selected from the group consisting of simple substances, alloys and compounds of tin (Sn), lead (Pb), aluminum (Al), indium (In), silicon (Si), zinc (Zn), copper (Cu), cobalt, antimony (Sb), bismuth (Bi), cadmium (Cd), magnesium (Mg), boron (B), gallium (Ga), germanium (Ge), arsenic (As), silver (Ag), hafnium (Hf), zirconium (Zr), and yttrium (Y).

48. A battery according to claim 25, wherein a capacity of the anode includes a capacity component by insertion and extraction of lithium and a capacity component by precipitation and dissolution of lithium and is expressed by the sum of the capacity components.

49. A battery comprising:
a cathode:
an anode: and
an electrolyte,
wherein;
the cathode has a cathode active material including a lithium composite oxide which contains lithium (Li), at least either cobalt (Co) or nickel (Ni), and oxygen (O),
the anode has an anode active material including at least one kind selected from the group consisting of anode materials capable of insertion and extraction of lithium, and lithium metals,
the battery charges at 4.25 V or more, and
a maximum of 20 ppm of a moisture content in the electrolyte,
a maximum of 20 ppm of a concentration of protic impurities in the electrolyte, and
the battery has a discharge capacity within the range of 7.0 to 8.9 mAh.

50. A battery according to claim 49, wherein the lithium composite oxide furthermore contains at least one kind selected from the group consisting of manganese (Mn), aluminum (Al), magnesium (Mg), titanium (Ti), chromium (Cr), and iron (Fe).

51. A battery according to claim 50, wherein the lithium composite oxide contains cobalt and nickel.

52. A battery according to claim 50, wherein the lithium composite oxide contains manganese.

53. A battery according to claim 52, wherein the lithium composite oxide contains not only manganese but also at least one kind selected from the group consisting of aluminum, magnesium, titanium, chromium, and iron.

54. A battery according to claim 49, wherein the electrolyte contains a solvent and a lithium salt, and the solvent contains a cyclic carbonate.

55. A battery according to claim 54, wherein content of the cyclic carbonate in the solvent is not less than 20 vol % nor more than 100 vol %.

56. A battery according to claim 54, wherein the solvent contains a cyclic carboxylate with content of less than 50 vol %.

57. A battery according to claim 54, wherein the solvent contains vinylene carbonate with content of less than 10 vol %.

58. A battery according to claim 57, wherein the solvent furthermore contains a cyclic carboxylate.

59. A battery according to claim 54, wherein the solvent contains vinyl ethylene carbonate with content of less than 10 vol %.

60. A battery according to claim 59, wherein the solvent furthermore contains a cyclic carboxylate.

61. A battery according to claim 54, wherein the solvent furthermore contains a chain carbonate with content of 80 vol % or less.

62. A battery according to claim 54, wherein content of the lithium salt to the solvent is not less than 0.6 mol/kg nor more than 2.0 mol/kg.

63. A battery according to claim 54, wherein the electrolyte furthermore contains a high molecular weight compound.

64. A battery according to claim 49, wherein the electrolyte contains at least one kind selected from the group consisting of $LiPF_6$, $LiBF_4$, $LiClO_4$, $LiN(CF_3SO_2)_2$ and $LiN(C_2F_5SO_2)_2$.

65. A battery according to claim 49, wherein the anode contains a carbon material.

66. A battery according to claim 65, wherein the anode contains at least one kind selected from the group consisting of graphite, graphitizable carbon, and non-graphitizable carbon.

67. A battery according to claim 66, wherein the anode contains non-graphitizable carbon.

68. A battery according to claim 66, wherein the anode contains graphite.

69. A battery according to claim 49, wherein the anode contains at least one kind selected from the group consisting of simple substances, alloys and compounds of metallic elements and semimetal elements which can form an alloy with lithium.

70. A battery according to claim 69, wherein the anode contains at least one kind selected from the group consisting of simple substances, alloys and compounds of tin (Sn), lead (Pb), aluminum (Al), indium (In), silicon (Si), zinc (Zn), copper (Cu), cobalt, antimony (Sb), bismuth (Bi), cadmium (Cd), magnesium (Mg), boron (B), gallium (Ga), germanium (Ge), arsenic (As), silver (Ag), hafnium (Hf), zirconium (Zr), and yttrium (Y).

71. A battery according to claim 49, wherein a capacity of the anode includes a capacity component by insertion and extraction of lithium and a capacity component by precipitation and dissolution of lithium and is expressed by the sum of the capacity components.

* * * * *